US007707604B2

(12) United States Patent
Kikkoji et al.

(10) Patent No.: US 7,707,604 B2
(45) Date of Patent: Apr. 27, 2010

(54) INFORMATION PROCESSING DEVICE, INFORMATION PROCESSING METHOD, AND INFORMATION PROCESSING PROGRAM

(75) Inventors: Hiroyuki Kikkoji, Tokyo (JP); Nozomu Okuzawa, Tokyo (JP); Shinsuke Yamashita, Kanagawa (JP); Jun Moriya, Tokyo (JP); Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 645 days.

(21) Appl. No.: 10/555,654

(22) PCT Filed: May 18, 2004

(86) PCT No.: PCT/JP2004/007019

§ 371 (c)(1),
(2), (4) Date: Nov. 4, 2005

(87) PCT Pub. No.: WO2005/006609

PCT Pub. Date: Jan. 20, 2005

(65) Prior Publication Data

US 2007/0006272 A1 Jan. 4, 2007

(30) Foreign Application Priority Data

| | | | |
|---|---|---|---|
| Jul. 14, 2003 | (JP) | ............................ | 2003-274302 |
| Aug. 11, 2003 | (JP) | ............................ | 2003-291741 |
| Sep. 4, 2003 | (JP) | ............................ | 2003-313167 |
| Sep. 29, 2003 | (JP) | ............................ | 2003-338813 |

(51) Int. Cl.
*G06F 3/00* (2006.01)
*G06F 13/00* (2006.01)
*H04N 5/445* (2006.01)

(52) U.S. Cl. ........................................ 725/40; 725/110

(58) Field of Classification Search .................. 725/40, 725/110
See application file for complete search history.

(56) References Cited

U.S. PATENT DOCUMENTS 6,240,555 B1 * 5/2001 Shoff et al. ................. 725/110

(Continued)

FOREIGN PATENT DOCUMENTS

JP 6-12728 1/1994

(Continued)

*Primary Examiner*—Christopher Kelley
*Assistant Examiner*—Charles N Hicks
(74) *Attorney, Agent, or Firm*—Oblon, Spivak, McClelland, Maier & Neustadt, L.L.P.

(57) ABSTRACT

A data-processing apparatus 1 that can provide information related to broadcast contents, whether it is receiving broadcast signals or not. In the data-processing apparatus 1, the setting means 13 sets the frequencies of broadcast signals the apparatus 1 can receive in the area where it is used, and allocates the receiving channels to the frequencies set. The information representing the relation between the frequencies and the receiving channels is recorded, as preset information, in the preset-information storing device 14. On the basis of the preset information, the broadcast-signal receiving means 11 receives a broadcast signal of a specific frequency that the user has selected. The broadcast-signal reproducing means 12 reproduces the broadcast signal the means 11 has received. The control means 15 causes the display means 17 to display a list of the broadcast stations that corresponds to the frequencies set in the preset information. When the user selects any one of the broadcast stations, the communications control means 16 acquires the information related to the broadcast contents that the broadcast station selected discloses on a network. The control means 15 makes the display means 17 display the information related to the broadcast contents.

10 Claims, 21 Drawing Sheets

U.S. PATENT DOCUMENTS

| | | | | |
|---|---|---|---|---|
| 6,650,877 | B1 * | 11/2003 | Tarbouriech et al. | 455/186.1 |
| 2002/0013950 | A1 * | 1/2002 | Tomsen | 725/109 |
| 2004/0133919 | A1 * | 7/2004 | Incentis | 725/112 |
| 2004/0237100 | A1 * | 11/2004 | Pinder et al. | 725/31 |
| 2005/0060701 | A1 | 3/2005 | Murase | |
| 2005/0091679 | A1 | 4/2005 | Tanaka et al. | |
| 2008/0046951 | A1 * | 2/2008 | Hrastar et al. | 725/122 |

FOREIGN PATENT DOCUMENTS

| | | | |
|---|---|---|---|
| JP | 10-177532 | | 6/1998 |
| JP | 10-257402 | | 9/1998 |
| JP | 10 257402 | | 9/1998 |
| JP | 2000-222360 | | 8/2000 |
| JP | 2001 125914 | | 5/2001 |
| JP | 2001-125914 | | 5/2001 |
| JP | 2001-157136 | | 6/2001 |
| JP | 2002-135671 | | 5/2002 |
| JP | 2002-142208 | | 5/2002 |
| JP | 2002-358283 | | 12/2002 |
| JP | 2003 67661 | | 3/2003 |
| WO | WO 01/22112 | A1 | 3/2001 |

* cited by examiner

| AREA BLOCK | RADIO STATION | | |
|---|---|---|---|
| | CALL SIGN | NAME | FREQUENCY |
| METROPOLITAN | JOA | FM TOKYO | 80.0 |
| METROPOLITAN | JOA | FM TOKYO | 76.7 |
| METROPOLITAN | JOA | FM TOKYO | 84.3 |
| METROPOLITAN | JOAV | J-WAVE | 81.3 |
| METROPOLITAN | JOTU | FM YOKOHAMA | 84.7 |
| METROPOLITAN | JOTU | FM YOKOHAMA | 80.2 |
| METROPOLITAN | . . . | . . . | . . . |
| METROPOLITAN | JOKG | NHK-YAMANASHI | 84.7 |
| . . . | . . . | . . . | . . . |

INFORMATION PROCESSING DEVICE, INFORMATION PROCESSING METHOD, AND INFORMATION PROCESSING PROGRAM

TECHNICAL FIELD

The present invention relates to a data-processing apparatus, a data-processing method and a data-processing program. More particularly, the invention relates to a data-processing apparatus to be connected to a network which receives broadcast signals and through which broadcast stations discloses the information about broadcast contents, a data-processing method for use in the apparatus, and a data-processing program for use in the apparatus.

BACKGROUND ART

Hitherto known are data-processing apparatuses that receive broadcast signals transmitted from radio stations and television stations. Each data-processing apparatus demodulates the broadcast signals, enabling a user to listen to a program such as music and to review the broadcast contents information that the broadcast station discloses on the Internet. Among the broadcast contents information are: the tile of the music broadcast in the program, the player of the music, the name or number of the compact disc (CD) in which the music is recorded.

The frequencies at which each broadcast station transmits signals are assigned to various receiving areas (in which the same program can be received on the same channel), one frequency to one receiving area. This is because signals transmitted at a specific frequency can be received in a limited area. In other words, the program broadcast at a frequency cannot be received in different areas. This is why any data-processing apparatus designed to receive the broadcast signals has a tuner-preset function (hereinafter referred to as “preset function”). Having this function, the data-processing apparatus can automatically set the receiving channel for the area in which it is located. A user of the data-processing apparatus activates the preset function when he or she starts using the data-processing apparatus or moves into a new receiving area. The receiving channel for the new area is thereby set.

Audio playback apparatuses are known, which are installed in moving bodies such as automobiles and which receive broadcast signals while moving from one receiving area to another. The audio playback apparatus identifies the receiving area on the basis of the position information it acquires from the global positioning system (GPS). Then, it automatically sets the receiving channel assigned to the receiving area. (Such an audio playback apparatus is disclosed in Jpn. Pat. Appln. Laid-Open Publication No. 8-5392, paragraphs [0006] to [0012], FIG. 1.)

The user of the data-processing apparatus may select the channel that the preset function has set. He or she can then listen to the program being presented by the desired broadcast station. At this time, the data-processing apparatus identifies the broadcast station from which it is receiving signals. The apparatus acquires the information about the contents being broadcast by the broadcast station through the Internet. The information about the broadcast contents may be displayed by a display. Then, the user can review the information about the contents broadcast by the broadcast station from which the apparatus is receiving signals, while listening to the program being broadcast.

With the conventional data-processing apparatus, however, the information that the user can review is limited to the information about the contents being broadcast from the broadcast station selected.

Hitherto, the data-processing apparatus acquires the information about the contents being broadcast, exclusively from the broadcast station that the user has selected. To acquire the information about the contents being broadcast, the apparatus detects the frequency of the broadcast signal it is receiving, refers to a table of broadcast stations against the frequency detected, thereby identifying the broadcast station. Since the broadcast station is thus automatically identified, the user need not select the broadcast station. However, the user must select any other broadcast station in order to review the information about the contents that the other station broadcasts. The user also needs to select a broadcast station when the apparatus is not receiving signals broadcast from this station, in order to review the information about the contents that the station broadcasts.

To enable the user to select a broadcast station to review the information about the contents broadcast by the broadcast station, no matter whether the apparatus is receiving or not receiving signals from the broadcast station, the display needs to display a list of all stations covering all areas. This list is so large that it is troublesome for the user much to find the station he or she wants. The more stations the list shows, the longer the time the user spends to find and select the desired station.

With the conventional data-processing apparatus, the user must take much trouble to select the broadcast station he or she wants. Thus, the user cannot review the information about the contents being broadcast from the broadcast stations other than the station that is transmitting the signals the data-processing apparatus is receiving. Therefore, the data-processing apparatus is not so useful.

DISCLOSURE OF THE INVENTION

This invention has been made in view of the foregoing. An object of the invention is to provide a data-processing apparatus that can easily provide information about the contents that a broadcast station broadcasts, no matter whether the apparatus is receiving signals from the broadcast station, and to provide a data-processing method and a data-processing program, both for use in the data-processing apparatus.

To achieve the object, the present invention provides a data-processing apparatus that enables the user to review the content-related information that any broadcast station that the user selects discloses on a network. The data-processing apparatus comprises: a receiving means for receiving broadcast signals; a reproducing means for reproducing broadcast signals; a setting means for setting a frequency for a broadcast signal that can be received and for recording frequency information about the frequency set, in a predetermined recording medium; a communications control means for controlling communication achieved via the network; a display means; and a control means for causing the display means to display a list of broadcast stations, in accordance with the frequency information, for acquiring the content-related information disclosed by the broadcast station selected, and for causing the display means to display the content-related information.

In the data-processing apparatus, the receiving means receives a broadcast signal of the specific frequency the user has selected. The reproducing means reproduces the broadcast signal the receiving means has received. The signal is reproduced in real time or after it has been stored in a storage device. Each broadcast signal has a specific frequency assigned to the area where it can be received. The setting means sets a frequency for any broadcast signal that can be received in the area where the data-processing apparatus is used. The setting means allocates a receiving channel to the frequency set. The information representing the frequency set is recorded in the predetermined recording medium. The receiving means selects the receiving channel in accordance with the information representing the frequency set, and receives the broadcast signal of the receiving channel thus selected. The control means causes the display means to display a list of broadcast stations that correspond to the frequency of at least one broadcast signal set by the setting means. When the user selects a broadcast station from the list, the communications control means acquires the information related to the broadcast contents that the broadcast station selected discloses on a network. The control means makes the display means display the information related to the broadcast contents. The content-related information displayed by the display means is not limited to the information about one broadcast station.

Thus, the user can review the information related to broadcast contents disclosed by any broadcast station from which the apparatus can receive signals, no matter whether the apparatus is receiving or not receiving signals from the broadcast station.

To achieve the object mentioned above, the invention provides a data-processing method that reproduces a specified broadcast signal and enables the user to review the information related to the broadcast contents that a broadcast station discloses on a network. The method can enable the user to review the information related to the broadcast contents disclosed by a broadcast station other than the broadcast station from which a broadcast signal is being received.

In this data-processing method, of the broadcast signals of frequencies assigned to broadcast stations, the frequency of any broadcast signal that can be received is set, and a receiving channel is allocated to the frequency set. The information representing the frequency set is recorded in the predetermined recording medium. A display means displays a list of broadcast stations including the station that corresponds to the frequency of at least one broadcast signal, no matter whether broadcast signals are being received. When a broadcast station is selected from the list, the information related to the broadcast contents that the broadcast station selected discloses on a network is acquired via the network. The display means displays the information related to the broadcast contents. The content-related information displayed by the display means is not limited to the information about one broadcast.

Thus, the user can review the information related to broadcast contents disclosed by any broadcast station from which the apparatus can receive signals, no matter whether the apparatus is receiving or not receiving signals from the broadcast station.

In the data-processing apparatus according to the present invention, a list of the broadcast stations existing in the receiving area is displayed on the basis of the frequencies of broadcast signals that the data-processing apparatus can receive. The information related to the broadcast contents that any given broadcast station shown in the list discloses on a network. The information is displayed and given to the user. The broadcast stations in the receiving area are limited in numbers. This renders it easy for the user to select a desired station. The user can specify the desired broadcast station with simple operation and review the information related to the contents broadcast by the station selected, no matter whether the data-processing apparatus is receiving the broadcast signal from the station selected.

Further, in the data-processing method according to the present invention, no matter whether the apparatus is receiving or not receiving signals, displaying a list of the broadcast stations corresponding to the frequencies of broadcast signals that the data-processing apparatus can receive, acquiring the information related to the broadcast contents that the selected broadcast station discloses on a network when the broadcast station is selected, and making the information to be reviewed. The broadcast stations in the receiving area are limited in numbers. This renders it easy for the user to select a desired station. The user can specify the desired broadcast station with simple operation and review the information related to the contents broadcast by the station selected, no matter whether the data-processing apparatus is receiving the broadcast signal from the station.

BEST MODE FOR CARRYING OUT THE INVENTION

Embodiments of the present invention will be described, with reference to the accompanying drawings.

(1) Fundamental Concept of the Invention

The concept of this invention applied to embodiments will first be explained. Then, the embodiments of the invention will be described in detail.

Figure 1:
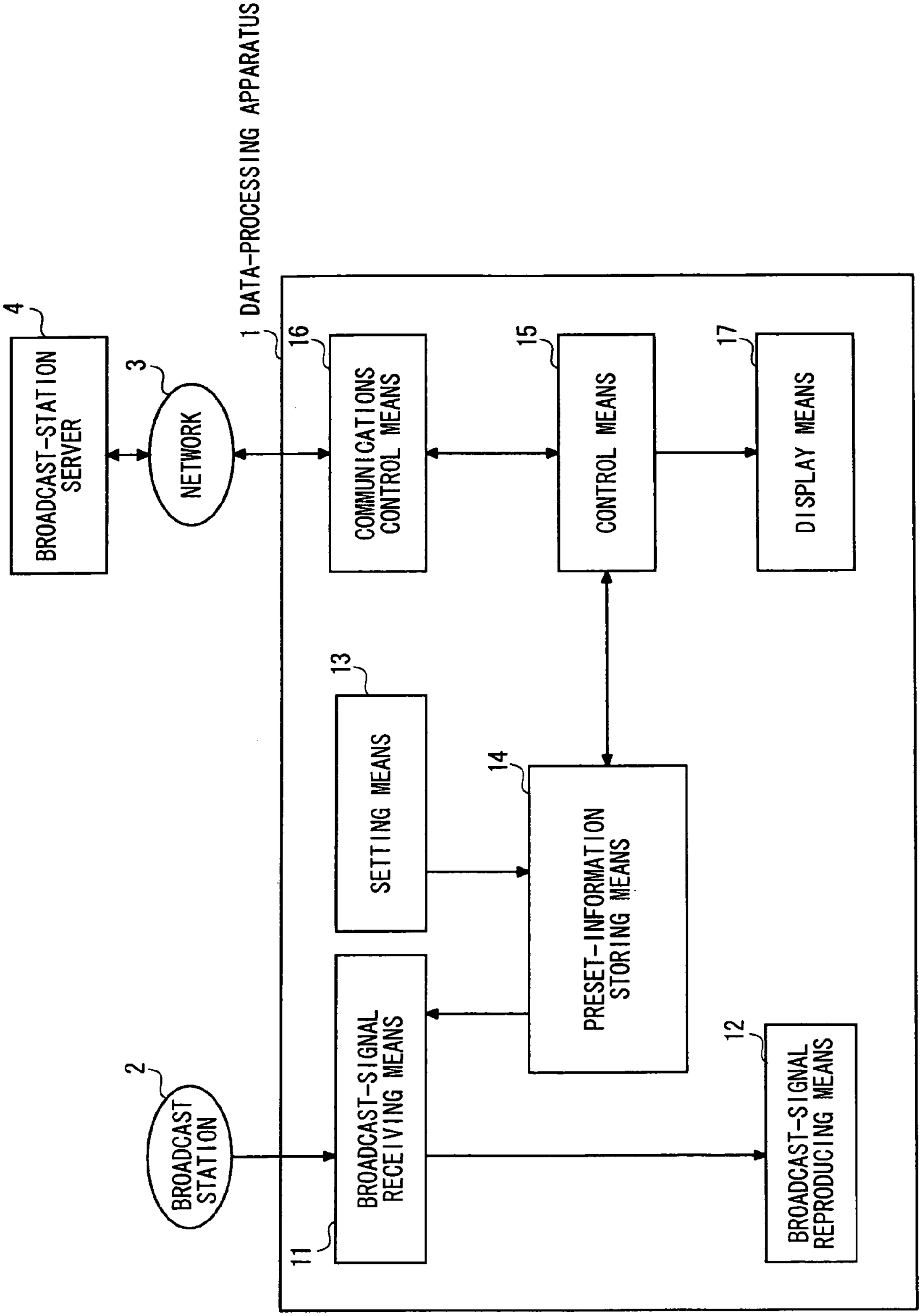
FIG. 1 is a diagram representing the concept of this invention, which is applied to embodiments.

FIG. 1 is a diagram representing the concept of the invention, which is applied to embodiments.

A data-processing apparatus 1 according to the present invention receives broadcast signals transmitted from a broadcast station 2 and is connected via a network 3 to a broadcast-station server 4. The broadcast-station server 4 is a server that the broadcast station 2 manages. It discloses the information related to the broadcast contents to be broadcast by the station 2, such as musical pieces.

Broadcast signals the data-processing apparatus 1 receives have frequencies that are preset in accordance with the broadcast-signal frequencies assigned to the broadcast stations located, for each receiving area. In the following description, the process of setting the frequencies of broadcast signals that the apparatus 1 can receive will be called "presetting process," and the information about the frequencies preset will be called "preset information".

The data-processing apparatus 1 has a broadcast-signal receiving means 11, a broadcast-signal reproducing means 12, a setting means 13, a preset-information storing device 14, a control means 15, a communications control means 16, and a display means 17. The broadcast-signal receiving means 11 receives a broadcast signal transmitted from the broadcast station 2. The broadcast-signal reproducing means 12 reproduces the broadcast signal. The setting means 13 performs the presetting process. The preset-information storing device 14 stores the preset information that the setting means 13 has set. The control means 15 controls the acquisition of the information related to the broadcast contents to be broadcast by the broadcast station 2, in accordance with the preset information. The communications control means 16 controls the communication that the apparatus 1 performs with the broadcast-station server 4 through the network 3. The display means 17 is used to display various items of information.

The broadcast-signal receiving means 11 acquires the data representing the broadcast frequency of the broadcast station 2 that the user has selected, from the preset-information storing device 14 that stores the data items representing the broadcast frequencies of the other stations, as well. The broadcast-signal receiving means 11 then receives the broadcast signal of the frequency represented by the data it has acquired. The broadcast signal received is supplied to the broadcast-signal reproducing means 12. The content data contained in the broadcast signal received may be stored in a storage device (not shown) in some cases.

The broadcast-signal reproducing means 12 reproduces the broadcast signal transmitted by a specific broadcast station 2 and received by the broadcast-signal receiving means 11. The means 12 may reproduce the signal input in real time from the broadcast-signal receiving means 11, or the content data stored in the storage device (not shown).

The setting means 13 performs the presetting process, setting the frequency of the broadcast signal from each broadcast station located in the area where the data-processing apparatus 1 is used. The setting means 13 then allocates one receiving channel to each frequency it has set. The presetting process can be performed by various methods known in the art. Therefore, the presetting process will not be described in detail here. The presetting process is initiated either automatically or at the user's request. The preset information is stored into the preset-information storing device 14 before the broadcast-signal receiving means 11 receives a specific broadcast signal and the control means 15 starts acquiring the information related to the broadcast contents, from the broadcast-station server 4. Note that the present information contains not only the frequencies of broadcast signals that can be received, but also the broadcast-station information concerning the broadcast stations that transmit broadcast signals of these frequencies. The broadcast-station information includes, for example, the names and identification data items of these broadcast stations.

The preset-information storing device 14 is constituted by a recording medium for storing the preset information set by the setting means 13. The recording medium is, for example, a hard disc drive (HDD). The preset information can be read from the broadcast-signal receiving means 11 and the control means 15.

In accordance with the present information stored in the preset-information storing device 14, the control means 15 controls the process that allows the user to review the information related to the broadcast contents to be broadcast by the broadcast station that the user wants. The information related to the broadcast contents is disclosed by the broadcast-station server 4 on the network 3. The control means 15 reads the preset information. Using the names of the broadcast stations, which are included in the preset information, the control means 15 causes the display means 17 to display various a list of the broadcast stations from which the data-processing apparatus 1 can receive signals. When the user selects one broadcast station from the list displayed, the control means 15 uses the communications control means 16, thus acquiring the information related to the broadcast contents, which the broadcast-station server 4 discloses on the network. The control means 15 then causes the display means 17 to display the information related to broadcast contents.

To acquire the information related to broadcast contents, from the broadcast-station server 4, the control means 15 uses the information about the source of the information related to broadcast contents. For example, the control means 15 uses the communications control means 16, thus transmitting the ID data (i.e., so-called call sign) of the broadcast station to an information-providing apparatus that provides the information about the source of the information related to broadcast contents the broadcast station releases by connecting to the network 3. The control means 15 therefore receives the information about the data-distributing source provided in the broadcast station, which distributes the information related to broadcast contents. The data-processing apparatus 1 may store a table of the data-distributing sources provided in the broadcast stations. In this case, the control means 15 searches the table of data-distributing sources and obtains the information about the data-distributing source provided in the broadcast station.

The control means 15 may use the communications control means 16 to automatically perform the process of acquiring, from the data-distributing source, the information related to broadcast contents, not after the user has selected the broadcast station, but after the preset information has been set, for all broadcast stations that have been registered in the presetting process. If this is the case, the control means 15 acquires the information about the data-distributing sources, which concerns all broadcast stations registered in the presetting process, by taking the same procedure as described above. On the basis of the information acquired, the control means 15 sequentially obtains the information related to broadcast contents the broadcast stations are to broadcast. This information is stored in the storage device. At the request of the user, if any, the control means 15 reads the information related to broadcast contents, from the storage device, so that the information related to broadcast contents may be displayed.

Controlled by the control means 15, the communications control means 16 transmits a request for the information related to broadcast contents, to the broadcast-station server 4 via the network 3. The communications control means 16 receives the information related to broadcast contents, from the broadcast-station server 4, and supplies the information to the control means 15.

Controlled by the control means 15, the display means 17 displays the list of broadcast stations, the information related to broadcast contents that each broadcast station will broadcast, and a menu of broadcast contents of the selected broadcast station. When the user selects one of the broadcast stations shown in the list displayed, the display means 17 displays a list of the information related to the broadcast-content items that the station selected will broadcast. When the user selects one of the broadcast-content items, the display means 17 displays the detailed information about the broadcast-content item selected by the user.

How the data-processing apparatus 1 described above operates will be described.

In the data-processing apparatus 1, the setting means 13 performs the presetting process, setting the frequency of the broadcast signal from each broadcast station located in the area where the data-processing apparatus 1 is used. The setting means 13 then allocates one receiving channel to each frequency it has set. The set-frequency information representing the frequency allocated to each receiving channel and the broadcast-station information including the name and ID data of the broadcast station corresponding to the frequency are recorded, as preset information, in the preset-information storing device 14.

Performing the above-mentioned processes, the data-processing apparatus 1 registers, as preset information, the broadcast-signal frequencies allocated to the receiving channels and the names and ID data items of the broadcast stations.

The broadcast-signal receiving means 11 receives a broadcast signal of the frequency corresponding to the receiving channel that has been selected. The broadcast signal received is reproduced by the broadcast-signal reproducing means 12.

In accordance with the preset information, the control means 15 causes the display means 17 to display the list of broadcast stations that correspond to the receiving channels. When the user selects one of the broadcast stations shown in the list displayed by the display means 17, the control means 15 acquires the information about the data-distributing source provided in the broadcast station selected. The information about the data-distributing source is information stored in the apparatus 1. Alternatively, this information may be obtained by connecting the communications control means 16 to the network 3. In this case, the information is acquired from the apparatus that provides the information concerning the sources of the information about the contents to be broadcast by the broadcast stations.

In accordance with the information about the data-distributing source provided in the broadcast station selected, the control means 15 transmits a request for the information related to broadcast contents, to the broadcast-station server 4 through the communications control means 16. The control means 15 receives the information related to the broadcast contents, which is a response from the broadcast-station server 4. The control means 15 then causes the display means 17 to display the information related to the broadcast contents. Thus, the apparatus 1 gives the user the information related to the broadcast contents that the broadcast station selected will broadcast.

The control means 15 acquires the information about the data-distributing sources provided in all broadcast stations registered in the preset information. In accordance with this information, the control means 15 obtains the information related to the broadcast contents that each broadcast station will distribute. The information related to the broadcast contents is stored into the storage device. When the user selects one of the broadcast stations shown in the list of the broadcast stations, which is displayed by the display means 17, the control means 15 reads, from the storage device, the information related to the broadcast contents that the station selected will broadcast. The control means 15 may cause the display means 17 to display this information.

In the data-processing apparatus 1 according to the present invention, the preset information prepared to receive broadcast signals is used to make the display means 17 display the list of the broadcast stations located in the receiving area. This enables the user to select a broadcast station that distributes the information related to broadcast contents. This process can be carried out, whichever receiving channel supplies broadcast signals to the broadcast-signal receiving means 11, or no matter whether the means 11 is receiving broadcast signals. The user can therefore review the information related to the broadcast contents, which is disclosed on the network 3 by the broadcast station that he or she has selected.

The list of broadcast stations, which the display means 17 displays to enable the user to select a broadcast station, shows only the broadcast stations that exist in the receiving area. That is, the list shows not so many broadcast stations. This renders it easy for the user to select a broadcast station. Note that the information related to the broadcast contents that each broadcast station discloses on the network is related to a broadcast program and contains the titles of musical pieces to be broadcast in the program and the names of artists who play the musical pieces. Therefore, the information related to the broadcast contents, disclosed by any broadcast station that is outside the receiving area, is most probably unnecessary to the user. Thus, the display means 17 needs to display the list of only the broadcast stations located in the receiving area, from which the data-processing apparatus 1 can receive signals.

The data-processing apparatus 1 may be so designed that an area-selecting button is displayed next to the list of broadcast stations, which is displayed to enable the user to select one broadcast station located in the receiving area. When the user selects the area-selecting button, the display means 17 displays a list of broadcast stations that exist outside the receiving area. Assume that the user selects one of these broadcast stations displayed. Then, the apparatus 1 performs the process of acquiring the information related to the broadcast contents that the broadcast station now selected will broadcast and displays this information. This enables the user to review the information related to the broadcast contents to be broadcast from a station located outside the receiving area.

(2) First Embodiment

A first embodiment of the invention will be described in detail, with reference to the accompanying drawings. This embodiment is a terminal apparatus that can receive the FM-broadcast signals and TV (television)-broadcast signals that represent musical pieces. In the following description, the process of saving the information about musical pieces or a set of musical pieces will be referred to as "clip."

Figure 2:
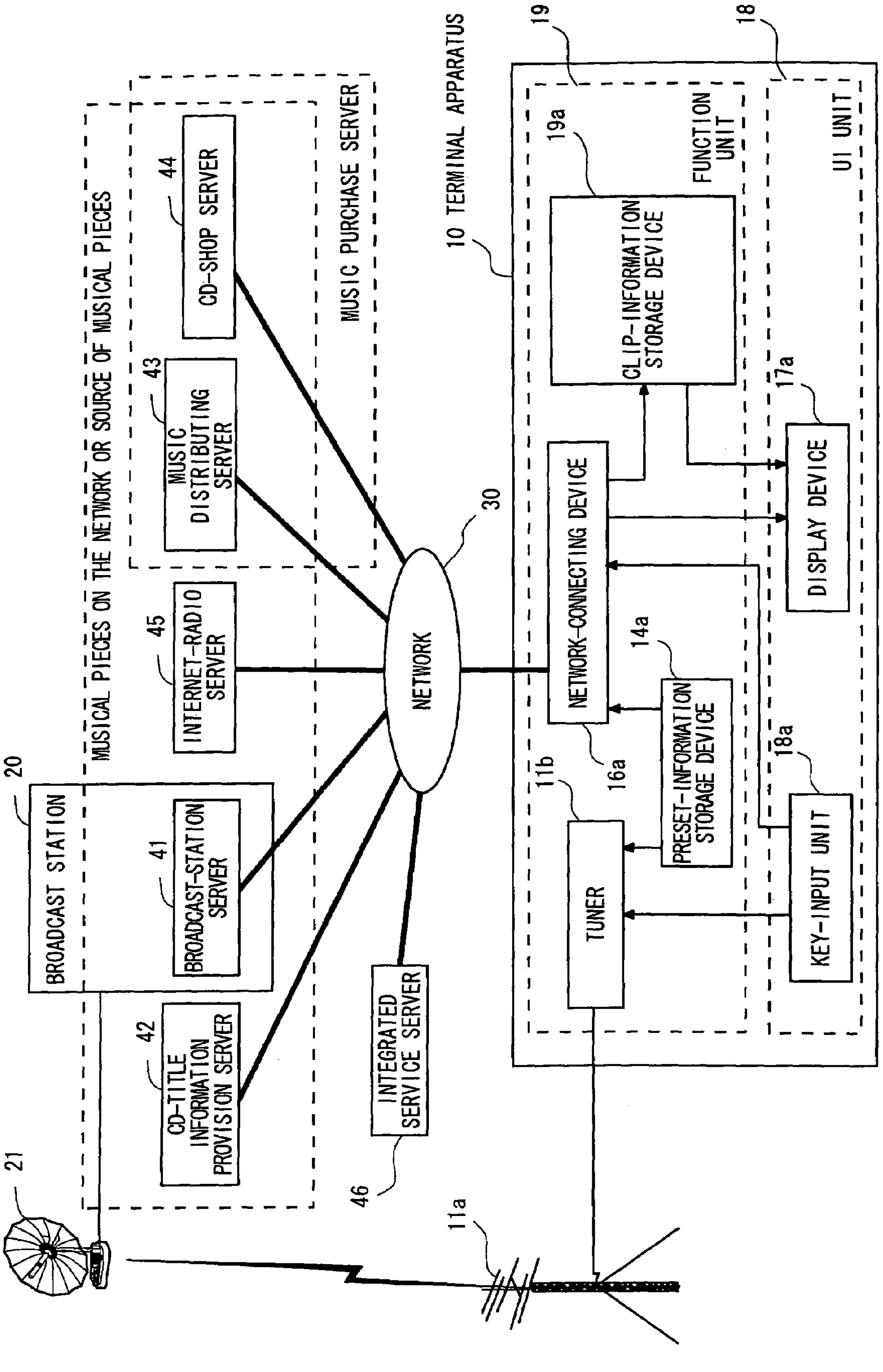
FIG. 2 is a block diagram of a network system according to a first embodiment of the invention.

FIG. 2 is a diagram depicting a network system related to the first embodiment. The network system comprises a terminal apparatus 10 and a network 30. The network 30 is, for example, the Internet. The network 30 connects the terminal apparatus 10 to various server servers. The servers are a broadcast-station server 41, a CD-title information provision server 42, a music distributing server 43, a CD-shop server 44, an Internet-radio server 45, and an integrated service server 46. The broadcast-station server 41 functions as a related-information provision server. The integrated service server 46 functions as an authentication server.

The broadcast-station server 41 is a server that is managed by a broadcast station 20 that broadcasts FM programs and TV programs. The broadcast station 20 has an antenna 21, which transmits radio signals. The broadcast-station server 41 performs the service of providing the information related to broadcast contents to be broadcast, which is, for example, the information related to musical pieces to be broadcast.

The broadcast-station server 41 provides the content information in, broadly speaking, two modes. The first mode is "now on-air," in which the server 41 provides the information about the musical piece being broadcast at present. In the second mode, the server 41 provides a list of musical pieces (or an on-air list) the station 40 has already broadcast upon request from the terminal apparatus. (The on-air list contains information about each musical piece that has been broadcast). The broadcast-station server 41 provides information about musical pieces broadcast on a program specified and also the information about musical pieces broadcast in a period specified.

The CD-title information provision server 42 distributes the information about the musical pieces recorded in CDs that are commercially available.

The music distributing server 43 distributes digital data representing musical pieces (music data items). It provides the music data items to the terminal apparatus 10 only if the user of the apparatus 10 has taken procedures to buy the musical pieces. The server 43 can provide the information about the musical pieces that the broadcast station 20 is to broadcast.

The CD-shop server 44 performs the service of receiving the order for CDs. The CD-shop server 44 also performs the service of distributing promotion audio data and providing the information about the musical pieces recorded in the CDs for sales.

The Internet-radio server 45 is a server that provides audio programs via a wide-area network such as the Internet.

The integrated service server 46 functions as a portal site where various types of services are given via the network 30. In other words, the server 46 conveys services. The server 46 distributes, for example, the information representing the sources of the information about musical pieces broadcast to the terminal apparatus 10. This information is, for example, URL (Uniform Resource Locator) that the broadcast-station server 41 discloses to the public.

Thus, a plurality of servers performs the service of providing the information about musical pieces or a set of musical pieces. That is, each server works as a source of the musical piece or a set of musical pieces on the network 30.

The music distributing server 43 and the CD-shop server 44 can distribute musical pieces for sale. If the user may operate the terminal apparatus 10, accessing these servers for distributing musical pieces for sale, he or she can buy musical pieces or a set of musical pieces via the network 30. The user of the terminal apparatus 10 may take procedures to the music distributing server 43 in order to buy musical pieces. In this case, the music data can be downloaded from the server 43 into the terminal apparatus 10. The user of the terminal apparatus 10 may also take procedures to the CD-shop server 44 in order to buy musical pieces. Then, the user can have the CD delivered to his or her home.

The terminal apparatus 10 comprises a function unit 19 and a user interface (UI) unit 18. The function unit 19 can receive and reproduce broadcast signals and accomplish communication between the terminal 10 and the network 30. The user interface unit 18 has a key-input unit 18*a* and a display device 17*a*. The key-input unit 18*a* inputs instructions when the user operates it. The display device 17*a* can display information to the user.

The function unit 19 of the terminal apparatus 10 has a broadcast-signal receiving unit, which has an antenna 11*a* and a tuner 11*b*. The function unit 19 can therefore receive the broadcast contents contained in the broadcast signals that antenna 11*a* has caught. The tuner 11*b* receives the broadcast signal from the antenna 11*a* and extracts the broadcast signal of the channel that the user has selected by operating the key-input unit 18*a*. The frequency of the broadcast signal to receive is determined from the preset information stored in the preset-information storage device 14*a*.

The function unit 19 of the terminal apparatus 10 has a network-connection device 16*a*. The device 16*a* controls the data communication between the terminal apparatus 10 and the various servers, which is achieved via the network 30. The device 16*a* clips the information about musical pieces, which the user wants to obtain from the broadcast-station server 41 of the broadcast station 20. In accordance with the preset information stored in the preset-information storage device 14*a*, the device 16*a* causes a display device 17*a* to display a list of the broadcast stations from which the terminal apparatus 10 can receive signals. The function unit 19 of the terminal apparatus 10 acquires, from the integrated service server 46, the information on the sources of the information about musical pieces broadcast by the broadcast stations that have been preset and registered. The function unit 19 then clips the information about musical pieces, which has been transmitted from the broadcast-station server 41 designated as source of this information.

The function unit 19 of the terminal apparatus 10 has a clip-information storage device 19*a*. The storage device 19*a* stores the related information clipped in the function unit 19. The information about musical pieces, which has been clipped from the broadcast-station server 4, is stored in the clip-information storage device 19*a*. The clip-information storage device 19*a* is a secondary storage device provided in the terminal apparatus 10. In the terminal apparatus 10, the clip-information storage device 19*a* can function as a part of the storage area of, for example, an HDD. The terminal apparatus 10 can clip not only musical pieces, but also a set of musical pieces. Hence, the terminal apparatus 10 can clip an FM program and a CD album, each containing a number of musical pieces. In other words, information related to a set of musical pieces interesting to the user can be clipped through a single operation.

The terminal apparatus 10 according to the first embodiment can work as an audio apparatus, as well, which can playback the musical pieces clipped.

Figure 3:
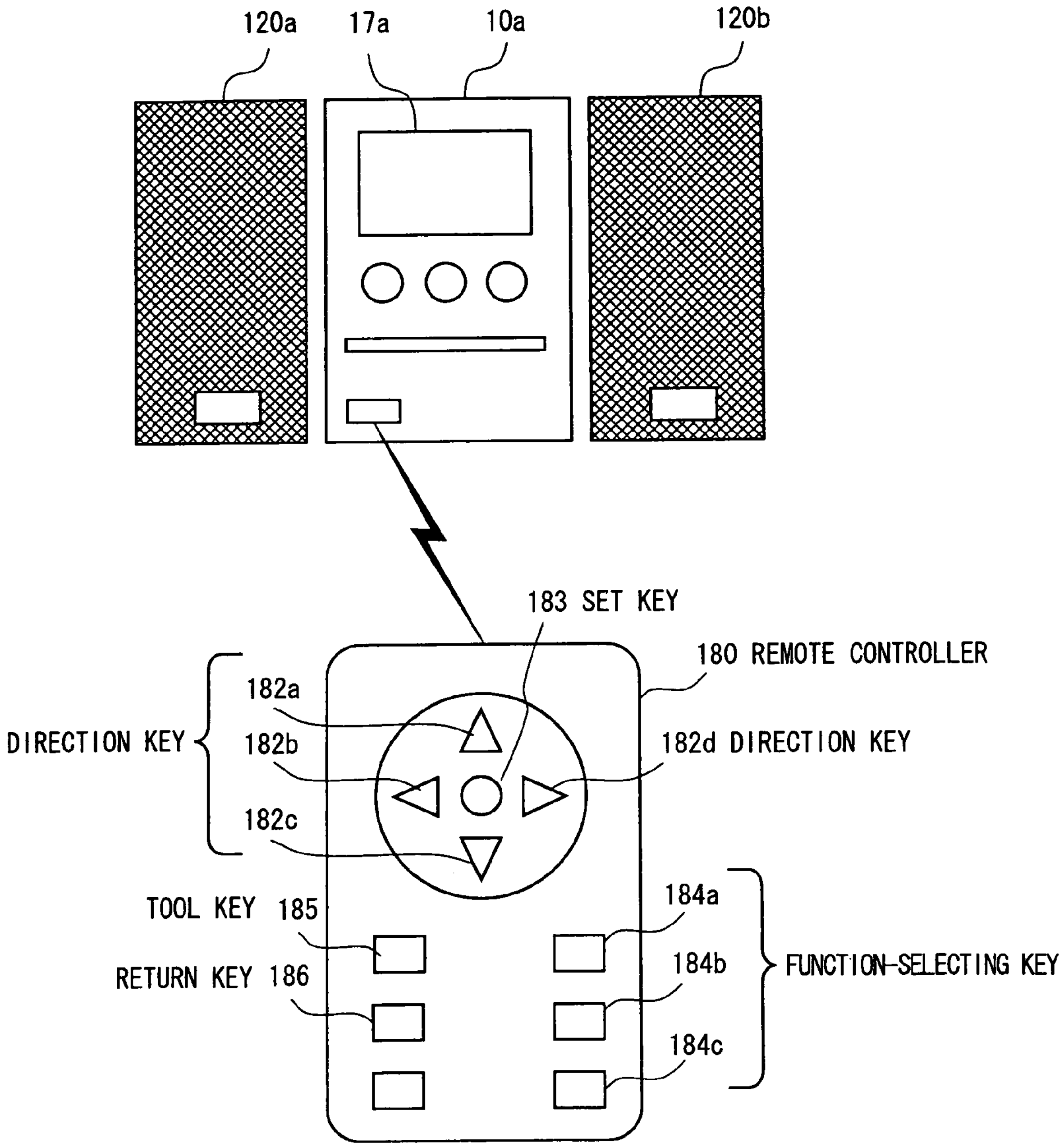
FIG. 3 is a diagram illustrating the outer appearance of a terminal apparatus.

FIG. 3 is a diagram illustrating the outer appearance of a terminal apparatus 10. As FIG. 3 shows, the terminal apparatus according to this embodiment looks like an audio system of the ordinary type. The terminal apparatus 10 has a main unit 10*a*, speakers 120*a* and 120*b*, and a remote controller 180. The main unit 10*a* can perform the function of playing back CDs and DVDs (Digital Versatile Discs), the function of recording data on and reproducing data from MDs, and the function of receiving FM programs and TV programs. The main unit 10*a* generates audio signals, which are supplied to the speakers 120*a* and 120*b*. The speakers 120*a* and 120*b* generate sound from the audio signals.

The main unit 10*a* incorporates the display device 17*a*. The display device 17*a* can display the information about the musical piece being played back or the related information clipped and stored.

The remote controller 180 is an input device. When operated, the controller 180 remote-controls the main unit 10*a*. The remote controller 180 has a plurality of operation keys. When the user depresses the operation keys, the remote controller 180 transmits signals to the main unit 10*a* by radio, for example by means of infrared-ray transmission.

Among the operation keys are directions keys 181*a* to 182*d*, a set key 183, function-selecting keys 184*a* to 184*c*, a tool key 185 and a return key 186.

The direction keys 182*a* to 182*d* are used to move the cursor on the screen of the display device 17*a* and to move a position where focusing should be achieved. The four direction keys 182*a* to 182*d* designate the upward, downward, leftward and rightward directions, respectively. When the keys 182*a* to 182*d* are depressed, the cursor or the like moves on the screen of the display device 17*a*, in the directions that the keys 182*a* to 182*d* designate.

When pushed, the set key 183 sets the information the display device 17*a* is displaying.

The function-selecting keys 184*a* to 184*c* are used to select functions. The three function-selecting keys 184*a* to 184*c* are allocated to the integrated-service use function, the tuner function and the local-content managing function, respectively. When any one of the function-selecting keys 184*a* to 184*c* is depressed, the main unit 10*a* is set to the operating mode associated with the function-selecting key depressed.

The tool key 185 is a button, which is pushed to cause the display device 17*a* to display a tool menu. The tool menu includes commands related to the contents displayed on the display device 17*a*, too. The user can select any command displayed, to make the terminal apparatus 10 perform the process designated by the command. Assume that the user selects a command and then depresses the set key 183 by operating direction keys 182*a* to 182*d*. Then, the terminal apparatus 10 carries out the process that the command designates.

The return key 186 is a button, which is pushed to change the information displayed on the display device 17*a*, back to the information previously displayed.

The remote controller 180 can have other keys, in addition to those illustrated in FIG. 3. For example, a volume control key, a playback key, a stop key, and the like. If the playback key is depressed, the terminal apparatus 10 will playback a CD or the like.

The internal structure of the terminal apparatus 10 will be described.

Figure 4:
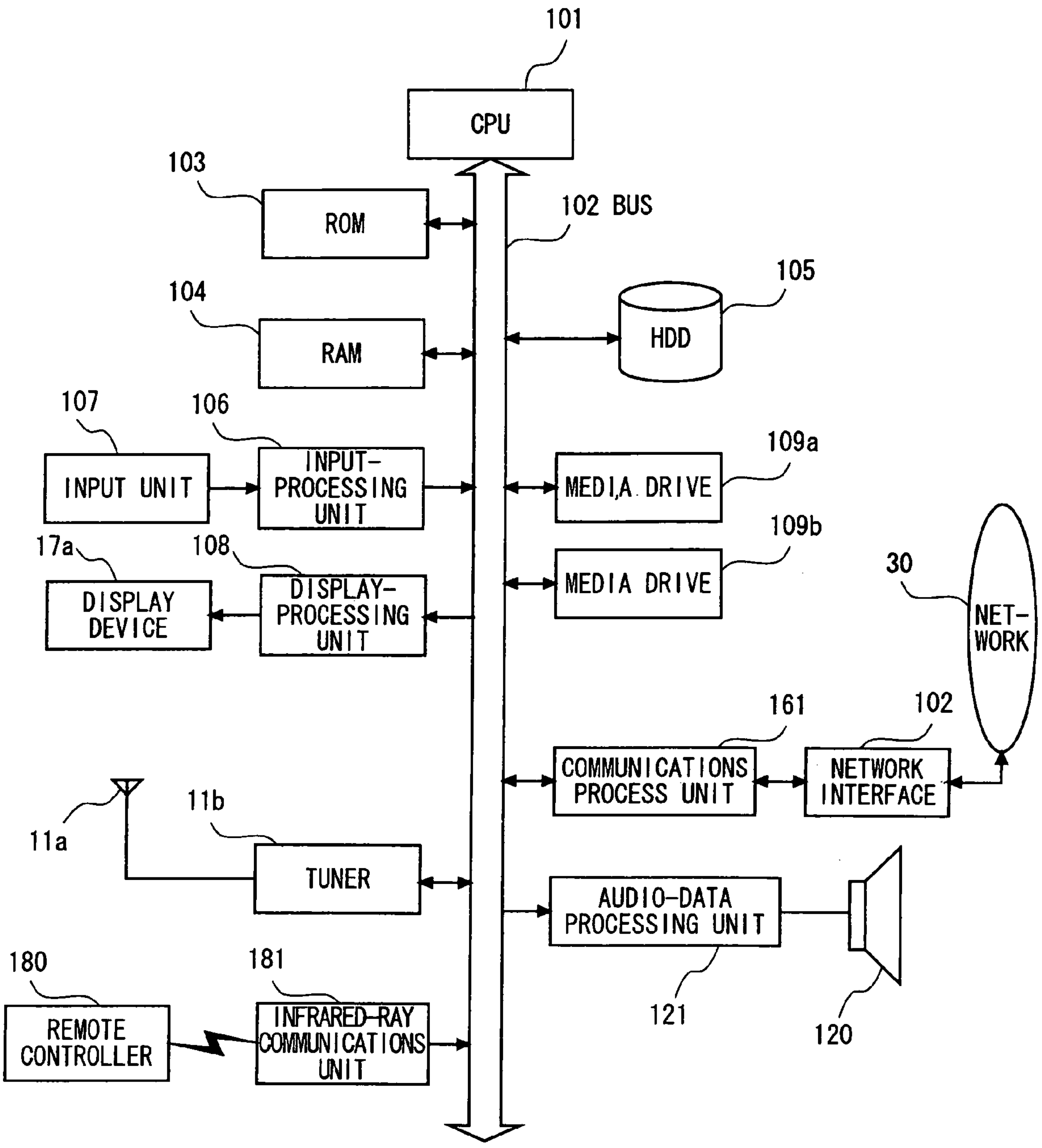
FIG. 4 is a block diagram illustrating the hardware configuration of the terminal apparatus.

FIG. 4 is a block diagram showing the hardware configuration of the terminal apparatus 10. So configured as shown in FIG. 4, the terminal apparatus 10 can manage, record and reproduce various sources, such as musical pieces, and can clip the information about musical pieces.

A CPU 101 controls the other components of the terminal apparatus 10 and performs various operations, in accordance with the program activated. For example, the CPU 101 carries out the communication via the network 30, receives and gives data from and to the user, reproduces and clips contents from media, stores contents into an HDD 105, manages the contents stored in the HDD 105, and retrieves information via the network 30 in accordance with clipping information or similar information. The terminal apparatus 10 can record and play back the audio content data and moving-picture content data. The CPU 101 exchanges control signals and data with the other circuits through a bus 102.

A ROM (Read Only Memory) 103 stores the application programs that the CPU 101 should execute. It stores a program loader, various operation coefficients, parameters for use in executing the programs, and the like. A RAM (Random Access Memory) 104 may store the programs the CPU 101 should execute. The RAM 104 can be used as a data region and a task region, which the CPU 101 needs when it executes various processes.

An input unit 107 has operation keys and various input devices, which are provided on the housing of the terminal apparatus 10. The input devices include a jog dial and a touch panel. The input unit 107 may have a keyboard and a mouse, which serve as GUIs (Graphical User Interfaces). The information input at the input unit 107 is supplied to an input-processing unit 106. The unit 106 performs a specific process on the information, generating an operation command. The command is supplied to the CPU 101. In response to the operation command, the CPU 101 carries out an operation or a control.

The display device 17*a* is, for example, a liquid crystal display and is connected to the function unit 19. It can display various kinds of information. When the CPU 101 supplies information to a display-processing unit 108 in accordance with various operating states, input states and communications states. The display-processing unit 108 causes the display device 17*a* to perform its function on the basis of the information supplied from the CPU 101. The display device 17*a* displays, for example, the contents of the related information distributed from the servers or the contents of the information clipped.

Media drives 109*a* and 109*b* can record and reproduce contents, such as musical pieces, on and from a portable recording medium. (They can only reproduce contents from a recording medium, depending upon the type of the medium.) The media drives 109*a* and 109*b* can record and reproduce data on and from different types of recording media, not on and from the same type of a recording medium. For instance, the media drive 109*a* reproduces data from CDs and DVDs, while the media drive 109*b* records and reproduces data on and from MDs.

The portable media in which contents such as musical pieces are recorded are not limited to optical recording media such as CDs, DVDs and the like. Rather, the media drives 109*a* and 109*b* can store contents in, for example, semiconductor memories such as flash memories. In this case, a flash memory reader/writer is connected to the bus 102 in the terminal apparatus 10.

The user may insert a recording medium (e.g., CD, DVD, MD, or the like) into the media drive 109*a* or 109*b* and operate the remote controller 180. Then, the user can enjoy listening to music. Assume that the user operates the remote controller 180, instructing that the media drive 109*a* should reproduce the contents of the recording medium inserted in the drive 109*a*. Then, the CPU 101 instructs the media drive 109*a* to reproduce the contents from the recording medium inserted in it. Thus, the media drive 109*a* accesses to the recording medium and reads a designated musical piece or pieces from the medium.

The contents thus read may be audio contents. In this case, the CPU 101 first decodes, if necessary, the audio contents and then transfers the contents to an audio-data processing unit 121. The audio-data processing unit 121 performs sound-field process such as equalizing, sound-volume adjustment, D/A conversion, amplification and the like on the audio contents. The audio contents, thus processed, are supplied to a speaker unit 120. The speaker unit 120 generates sound from the audio contents. The speaker unit 120 comprises the speaker 120*a* and 120*b* that are shown in FIG. 3. Thus, the speaker unit 120 can output stereophonic sound.

The CPU 101 can make the HDD 105 accumulate the contents reproduced by the media drives 109*a* and 109*b*, in the form of an audio-data file. The audio-data file can assume various formats. It may take the CD format. If this is the case, the contents are digital audio data obtained through 16-bit quantization at the sampling frequency of 44.1 KHz. Alternatively, the audio-data file may take the compressed-data format in order to save the storage capacity of the HDD 105. In this case, the data-compressing scheme is not limited to a particular one. ATRAC (Advanced Transform Acoustic Coding, trademark), MP3 (MPEG Audio Layer-3), or the like can be employed.

The tuner 11*b* is, for example, an AM-FM radio tuner. When controlled by the CPU 101, the tuner 11*b* decodes the broadcast signal that the antenna 11*a* has received. Needless to say, the tuner 11*b* can be a television tuner, a broadcast-satellite tuner, a digital-broadcast tuner, or an Internet-radio tuner. The broadcast signal thus decoded undergoes a specific process in the audio-data processing unit 121. The broadcast signal is output from the unit 121 to the speaker unit 120. The speaker unit 120 generates sound from the broadcast signal.

When controlled by the CPU 101, a communications process unit 161 encodes the data to be transmitted and decodes the data received. A network interface 160 receives the data encoded by the communications process unit 161 and transmits the data to external apparatuses via the network 30. The network interface 160 also receives signals transmitted from the external apparatuses via the network 30 and transfers this data to the communications process unit 161. The communications process unit 161 transfers the signals it has received, to the CPU 101. The information the terminal apparatus 10 receives through the network 30 includes, for example, the information related to the FM programs being broadcast and the tiles of the musical pieces contained in a CD or the like.

An infrared-ray communications unit 181 achieves wireless communications, such as infrared-ray communications, with the remote controller 180. The infrared-ray communications unit 181 performs a particular process on the signal sent from the remote controller 180, generating an operation command. This command is supplied to the CPU 101. In response to the operation command, the CPU 101 performs an operation or a control so that the apparatus 10 may operate in accordance with the command input to it.

The configuration of the terminal apparatus 10 is not limited to the one illustrated in FIG. 4. The apparatus 10 can have various configurations. For example, the apparatus 10 may have an interface that accomplishes communication with the peripheral apparatuses. The interface may be a USB (Universal Serial Bus) interface, an IEEE 1394 interface, a Bluetooth interface, or the like. In the terminal apparatus 10, the HDD 105 can store the contents of the audio data downloaded by the network interface 160 via the network 30, and the contents of the audio data transferred through the interface such as the USB interface, IEEE 1394 interface or Bluetooth interface. The terminal apparatus 10 may have a terminal for connecting a microphone or an external headphone, a video-output terminal for use in reproducing data from a DVD, a line-connecting terminal, a terminal for transferring optical digital data, and the like. Further, the terminal apparatus 10 may have a PCMCIA slot, memory-card slots, and the like. Hence, the terminal apparatus 10 can exchange data with external data-processing apparatuses and audio apparatuses.

The program modules incorporated in the system according to the present embodiment will be described. The program modules describe the various processes that the terminal apparatus 10 carries out. That is, the terminal apparatus 10 can perform the processes in accordance with the program modules, respectively. Hereinafter, the functions that the apparatus 10 performs in accordance with the program modules shall be distinguished by using the names of the program modules.

Figure 5:
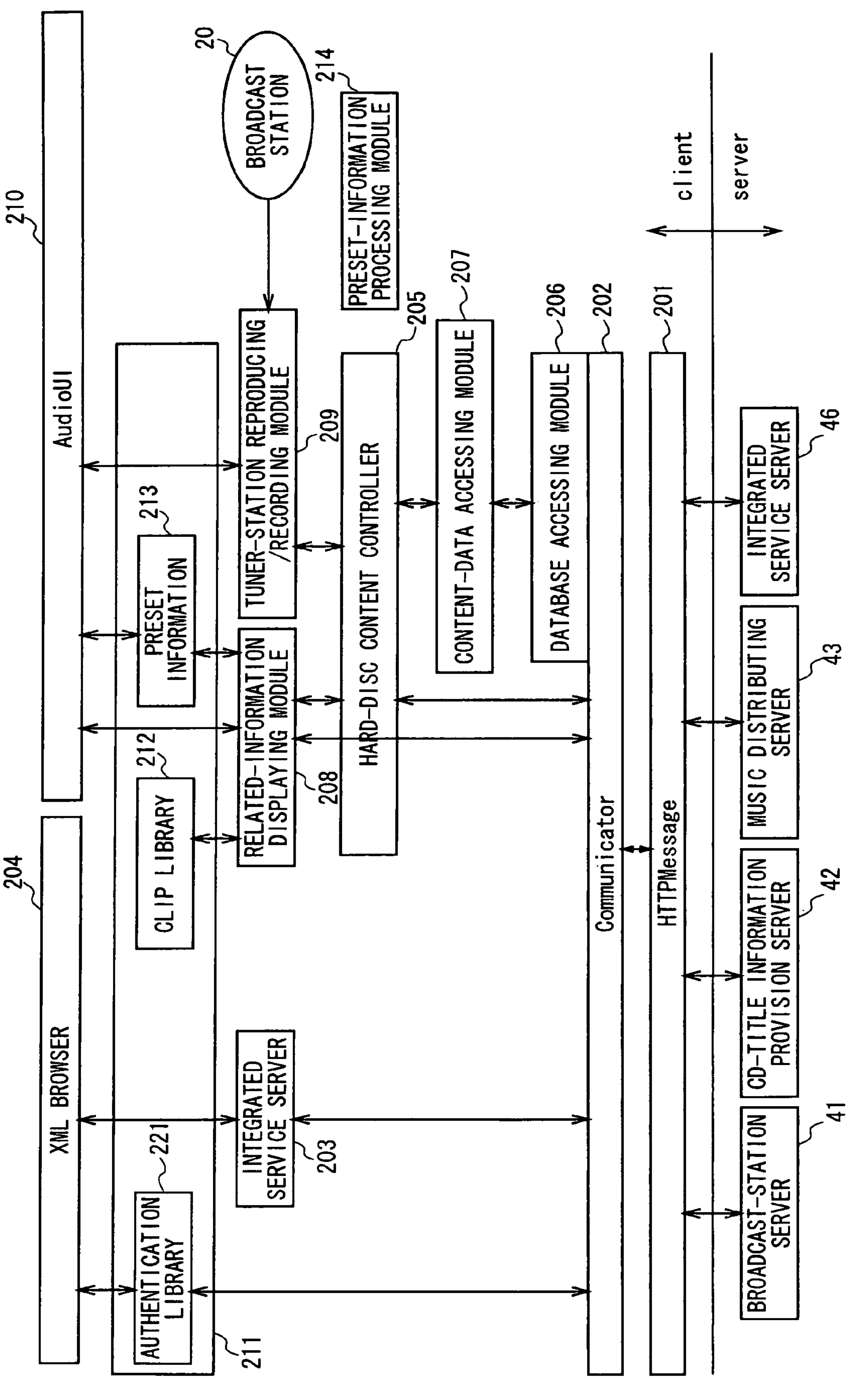
FIG. 5 is a diagram showing the program module configuration of the terminal apparatus.

FIG. 5 is a diagram showing the program module configuration of the terminal apparatus. As seen from FIG. 5, the program modules for the terminal apparatus 10 are designed to work on the OS. Using the program modules, the terminal apparatus 10 can perform data communication with the broadcast-station server 41, the CD-title information provision server 42, the music distributing server 43, the integrated service server 46 and some other servers.

The terminal apparatus 10 uses a HTTP (Hyper Text Transfer Protocol) message program 201 and a communicator program 202. The HTTP message program 201 accomplishes HTTP communication between the terminal apparatus 10 and the various servers, such as the broadcast-station server 41, the CD-title information provision server 42, the music distributing server 43, the integrated service server 46. The communicator program 202 is a communications module that performs data communication with the integrated service server 46, etc.

A music-purchase playback module 203 is provided as a higher-order module (functioning like a user interface) to the communicator program 202. The user uses this module 203 to buy musical pieces or playback promotion musical pieces. As a higher order module to the music-purchase playback module 203, an XML (eXtensible Markup Language) browser 204 is provided. The XML browser 204 interprets the XML files sent from various servers and causes the display device 17*a* to display information. The XML browser 204 interprets the data the user inputs by operating the terminal apparatus 10 while the apparatus 10 remains in the integrated-service using mode. An process request corresponding to the data input is transferred from the XML browser 204 to other modules. For example, the music data representing a musical piece selected by the user is supplied via the XML browser 204 to the music-purchase playback module 203. The music-purchase playback module 203 processes the music data so that the user may buy the musical piece. The music data is written into the HDD 105 via a hard-disc content controller 205.

A library 211 comprises an authentication library 221, which is connected to the communicator program 202. The authentication library 221 performs the process of authenticating the integrated service server 46 and the other servers.

There are three other higher-order modules to the communicator program 202. They are the hard-disc content controller 205, a database accessing module 206, and a content-data accessing module 207. The database accessing module 206 can access the various databases provided in the HDD 105. The content-data accessing module 207 can access the contents stored in the HDD 105. The hard-disc content controller 205 manages the contents stored in the HDD 105.

There are three higher-order modules to the hard-disc content controller 205. They are the music-purchase playback module 203, a related-information displaying module 208, and a tuner-station reproducing/recording module 209. The related-information displaying module 208 makes the display device 17*a* display the titles of the musical pieces broadcast by radio stations and the names of the artists who play the musical pieces.

The tuner-station reproducing/recording module 209 selects radio stations and causes the HDD 105 to record the contents of the musical pieces broadcast by any radio-station selected. The musical pieces, which have been received from the radio station selected, via an audio-user interface (AudioUI) 210, is written into the HDD 105 trough the content-data accessing module 207.

The related-information displaying module 208 receives information related to musical pieces via the HTTP message program 201 from the CD-title information provision server 42 and the broadcast-station server 41. The music-related information represents the titles of the musical pieces being broadcast from the radio station and the names of the artists who play the these musical pieces. The module 208 supplies this information via the audio-user interface 210 to the display device 17*a*, which displays the tiles of the musical pieces and the names of the artists. The related-information displaying module 208 can make the display device 17*a* display the information about the musical pieces, no matter whether the terminal apparatus 10 is receiving from any radio station, provided that the broadcast station is located in the receiving area. In this case, the related-information displaying module 208 uses the preset information 213 stored in the library 211. Thus, the related-information displaying module 208 acquires, from the integrated service server 46, the URLs of the broadcast-station servers 41 incorporated in all broadcast stations located in the receiving area. Using the URLs acquired, the module 208 obtains the information about musical pieces, from the broadcast-station servers 41. The information related to musical pieces that the module 208 has obtained is temporarily stored, as clip information, in a clip library 212.

The related-information displaying module 208 causes the display device 17*a* to display a list of broadcast stations, prompting the user to select any broadcast station he or she wants. When the user selects a station, the module 208 reads the clip information about the broadcast station selected, from the clip library 212. The clip information thus read is supplied via the audio-user interface 210 to the display device 17*a*. The device 17*a* displays the clip information. Note that a preset-information processing module 214 sets the preset information 213 when the initialization is carried out or when a preset request is input through the audio-user interface 210.

The information related to musical pieces received via the audio-user interface 210 can be supplied via the database accessing module 206 to the HDD 105 and stored in the HDD 105 after it has been displayed by the display device 17*a*.

The terminal apparatus 10 can acquire the information related to musical pieces from a server and clip this information. The terminal apparatus 10 can retrieve or purchase musical pieces at the same time it clips the information.

How the terminal apparatus described above operates will be explained.

After the initialization, the preset-information processing module 214 sets frequencies at which the terminal apparatus 10 can receive signals. The frequencies thus set are allocated to receiving channels and are registered as preset information. The preset-information processing module 214 then supplies data via the audio-user interface 210 to the display device 17*a*. The display device 17*a* displays an area-selection menu that shows the areas, prompting the user to select the area where the terminal apparatus 10 is used.

The user operates the remote controller 180, selecting the area in which the apparatus 10 is used. The data representing the area selected is input via the audio-user interface 210 to the preset-information processing module 214. The preset-information processing module 214 selects the receiving area represented by the data input to it, and then allocates the broadcast-signal frequencies to receiving channels. At this time, the module 214 also allocates the names and ID data items of the broadcast stations, too, to the receiving channels.

Figures 6, 7:
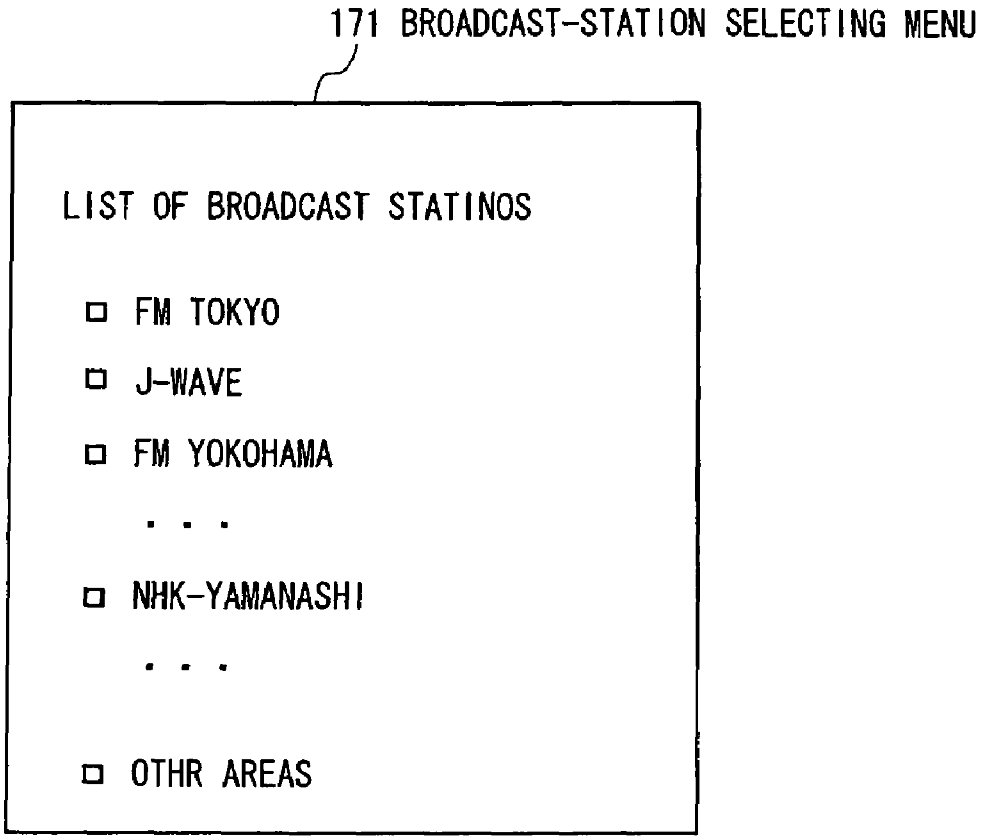
FIG. 6 is a table showing the relation between various frequencies, on the one hand, and broadcast stations, on the other hand.
FIG. 7 is a diagram illustrating a broadcast station-selection menu displayed.

Some broadcast-signal frequencies are assigned to one area, and other broadcast-signal frequencies to another area. The terminal apparatus 10 stores a table that shows the relation between the broadcast stations and the frequencies assigned to the stations, respectively. FIG. 6 shows such a table, showing the relation between the broadcast stations existing in the metropolitan area and the frequencies assigned to these stations. The area block shows an area where the same programs can be received by the same frequency. The call signs are ID data items for the broadcast stations. They are codes that are uniquely allocated to the broadcast stations. Using the call signs, the preset-information processing module 214 can identify the broadcast stations. The station name associated with each call sign is character data that represents the name of the broadcast station to which the call sign is allocated. The display device 17*a* displays the broadcast station name associated with a receiving channel.

Assume that the user selects Tokyo as receiving area. Then, the preset-information processing module 214 refers to the table and selects the area block "metropolitan area." The module 214 then allocates the frequencies, call signs and names of the broadcast stations in the "metropolitan area" to receiving channels. The frequencies, call signs and names of the broadcast stations, thus allocated to the receiving channels, are registered in the preset information 213 stored in the library 211.

If the terminal apparatus 10 is connected to the network 30 at all times, the integrated service server 46, for example, may manage the table showing the relation between the frequencies and the broadcast stations. In this case, the terminal apparatus 10 can read this table, whenever necessary, through the network 30.

After the preset information 213 is thus set, the tuner-station reproducing/recording module 209 selects a radio station on the basis of the preset information 213. Then, the module 209 reproduces the contents of a musical piece received from the radio station or records the contents in the HDD 105.

The related-information displaying module 208 may be receiving the signal broadcast from the radio station selected. In this case, the module 208 receives the title of the musical pieces that the radio station is broadcasting and the name of the artist who plays the musical piece, via the HTTP message program 201 from the CD-title information provision server 42, the broadcast-station server 41 or the like, unless the user has designated the information related to any other musical piece. The related-information displaying module 208 then supplies the tile and the artist's name, as information related to musical pieces, to the display device 17*a*. The display device 17*a* displays the related information via the audio-user interface 210.

The module 208 receives no broadcast signals from a radio station, or may receive a request for designating a source of information related to musical pieces, from the key-input unit 18*a* via the audio-user interface 210. If this is the case, the module 208 supplies the list of the broadcast stations, which is registered in the preset information 213, to the display device 17*a*. The display unit 17*a* displays this list, prompting the user to select a broadcast station or stations.

FIG. 7 illustrates an example of a broadcast station-selection menu 171. The menu 171 is a list of the names of all broadcast stations that are registered in the preset information 213. The user can select one of the stations shown in the menu. The menu 171 contains the names of only the broadcast stations located in the receiving area that is registered in the preset information 213. This renders it easy for the user to select a desired station.

When the user selects one of the broadcast station names displayed, the related-information displaying module 208 reads the call sign corresponding to the broadcast station selected, from the preset information 213. The call sign is transmitted to the integrated service server 46 via the HTTP message program 201. The module 208 acquires, as response from the server 46, the URL that distributes the information related to musical pieces. Then, the module 208 receives information about the broadcast station selected, from the broadcast-station server 41 of the URL via the HTTP message program 201. This information is supplied via the audio-user interface 210 to the display device 17*a*, which displays the information.

The display device 17*a* displays a list of the data items about the station broadcasts that have been preset and registered via the audio-user interface 210. This list is, for example, an on-air list. The broadcast station may distribute any other information about broadcast contents. In this case, the display device 17*a* displays a table of items about the broadcast contents. When the user operates a remote controller 180, selecting one of these items displayed, the audio-user interface 210 transmits the item about the broadcast content selected, to the related-information displaying module 208. The related-information displaying module 208 acquires the detailed information about the item selected and supplies this information to the display device 17*a*. The display device 17*a* displays the information.

Upon receiving the call sign of the broadcast station preset and registered, the related-information displaying module 208 transmits this call sign to the integrated service server 46 via the HTTP message program 201, no matter whether the terminal apparatus 10 is receiving broadcast signals. The module 208 acquires, as response from the server 46, the URLs that distribute the information related to musical pieces. Then, the module 208 receives information related to musical pieces from the broadcast-station servers 41 of the URLs of the broadcast station via the HTTP message program 201. At this time, the related-information displaying module 208 may store the music-related information in the clip library 212.

The information related to musical pieces, if clipped in the clip library 212, are updated at regular intervals. In this case, the related-information displaying module 208 causes the display device 17*a* to display the clip information about the radio station from which the terminal apparatus 10 is receiving signals, unless the apparatus 20 receives instructions concerning the information about musical pieces. If any broadcast station that should display the information about musical pieces is designated, the display device 17*a* displays the clip information about the station designated.

As the above-mentioned processes are carried out, the terminal apparatus 10 can acquire the information related to the broadcast contents distributed by any desired broadcast station, whether or not it is receiving signals.

Moreover, the terminal apparatus 10 can enable the user to buy any musical pieces he or she wants, from the music distributing server 43, in accordance with the related information displayed by the display device 17*a*.

As indicated above, the information related to the broadcast stations present and registered is automatically acquired and displayed by the display device 17*a*. Nonetheless, the display device 17*a* may display the information related to the broadcast stations of any other areas.

Figure 8:
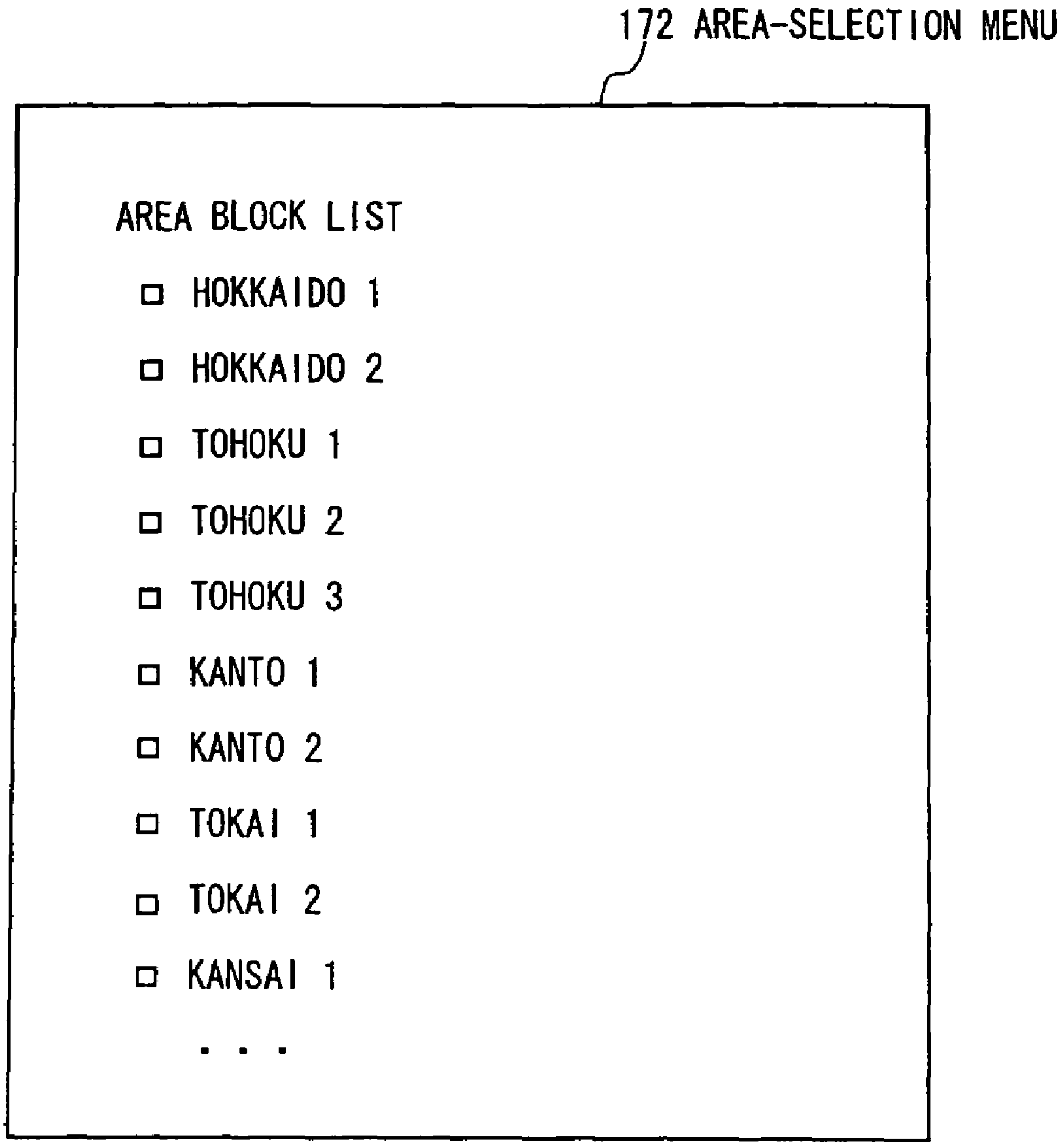
FIG. 8 is a diagram depicting an area listing menu of all areas of the country.

In this case, an item of data, i.e., "Other Areas" is displayed at the end of the list of the broadcast stations, which is illustrated in FIG. 7. This enables the user to select any stations located in any other areas. That is, when the user operates the remote controller 180, designating "Other Areas," the display device 17*a* of the terminal apparatus 10 displays a list of all area blocks of the country. FIG. 8 shows an example of such an area-block list. When the user selects a desired one of the area blocks shown in the area-block list 172, the display device 17*a* of the terminal apparatus 10 displays a list of the broadcast stations existing in the area selected. When the user selects one of the broadcast stations displayed, the terminal apparatus 10 acquires the URL of the broadcast station selected, from the integrated service server 46. The apparatus 10 receives the information related to musical pieces broadcast from the broadcast-station server of the URL, in the same manner as described above. The display device 17*a* displays this information. In the terminal apparatus 10, the display device 17*a* may display a list of all broadcast stations of the country, not the area-block list 172. If this is the case, the user can select any broadcast station from which he or she wishes to receive signals, from the list showing all broadcast stations of the country.

As the processes described above are carried out, the terminal apparatus 10 can display the information related to the broadcast contents distributed by any broadcast station outside the receiving area.

Figure 9:
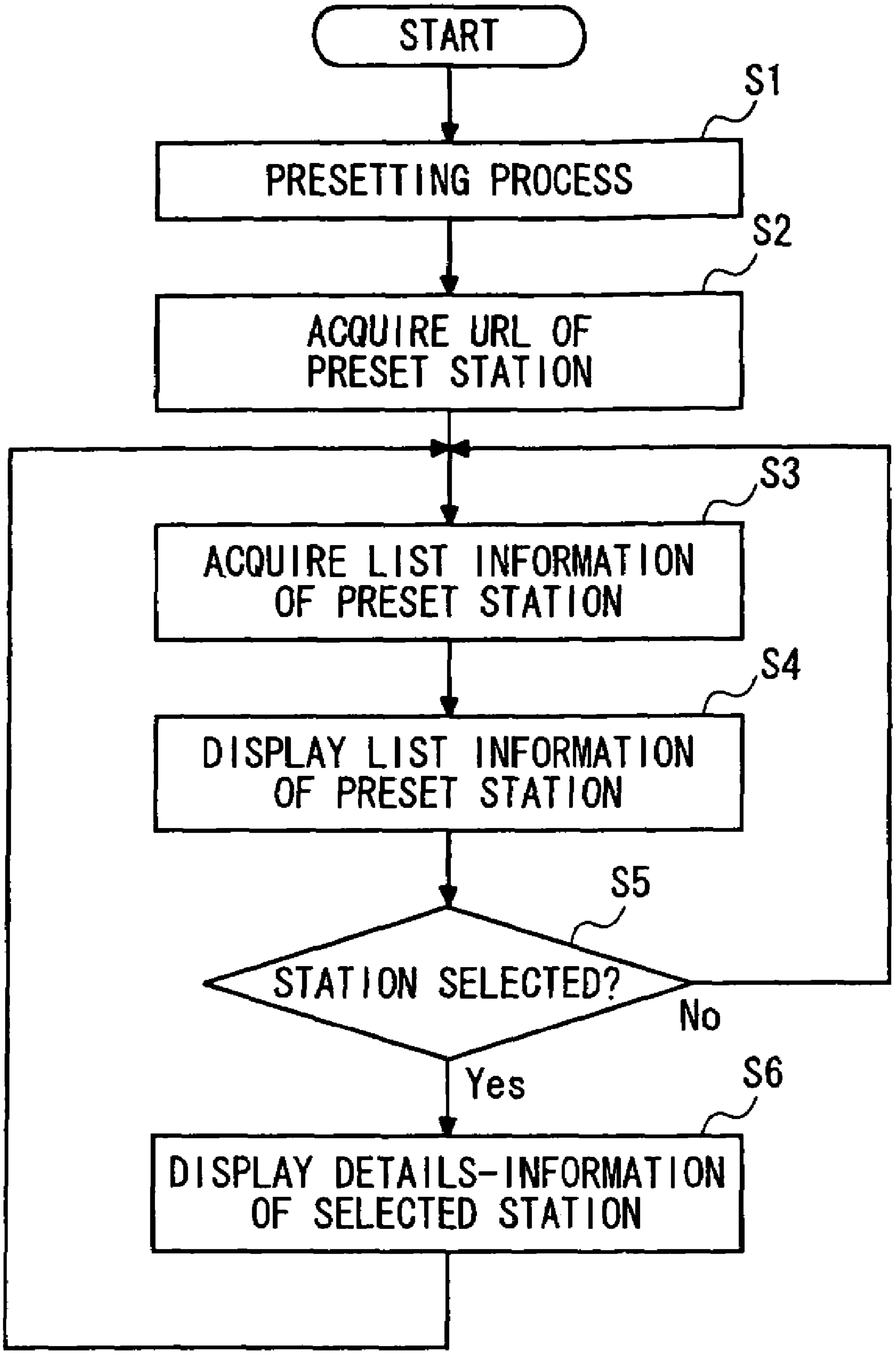
FIG. 9 is a flowchart explaining the sequence of displaying related information.

How the sequence of causing the display device 17*a* to display the preset information related to each broadcast station will be described. FIG. 9 is a flowchart explaining the sequence of displaying the related information.

After performing the prescribed initialization, the CPC 101 goes from the start step to Step S1.

[Step S1] The CPU 101 carries out the presetting process, setting the frequencies for the broadcast signals that can be received in the receiving area. The CPU 101 allocates these frequencies to the receiving channels. Further, the CPU 101 sets the names of broadcast stations and the ID data items (call signs) of the broadcast stations, each broadcast station name and the ID data item of the broadcast station being associated with one frequency. The broadcast station names and the broadcast-station ID data items are stored, as preset information, in the HDD 105.

[Step S2] The CPU 101 acquires the URL of the broadcast-station server of each broadcast station (i.e., preset station) that distributes the information related to broadcast contents on the network. Note that the broadcast contents are registered by in the preset information. More precisely, the CPU 101 transmits, for example, the call sign of the preset station to the integrated service server 46 that provides the various service information, and then receives, as a response, the URL associated with the call sign. The URL thus acquired is temporarily stored in the RAM 104.

[Step S3] Using the URL of each preset station, acquired from the integrated service server 46, the CPU 101 receives the information related to the broadcast contents distributed by the preset station. Then, the CPU 101 transmits a request for the information related to the broadcast contents to the URL of the preset station (i.e., broadcast-station servers 41). The CPU 101 acquires, as a response, the information related to the broadcast contents. The information related to broadcast contents, thus acquired, is temporarily stored in the RAM 104, as clip information. The CPU 101 repeatedly acquires the information related to the broadcast contents at regular intervals (e.g., 30 seconds). The information related to the broadcast contents is therefore updated at the regular intervals.

[Step S4] The CPU 101 makes the display device 17*a* display the list of the preset stations, prompting the user to select the broadcast station so that the display device 17*a* may display the information related to the contents broadcast by the station.

[Step S5] The CPU 101 determines whether the user has operated the terminal apparatus 10 to select the broadcast station. If NO, the process returns to Step S3. In this case, the CPU 101 acquires the information related to the broadcast contents and do nothing until the user selects a broadcast station.

[Step S6] When the user selects a broadcast station, the CPU 101 reads from the HDD 105 the information related to the contents broadcast by the station selected. The CPU 101 supplies the information to the display device 17*a*, which displays the information. Thereafter, the process returns to Step S3, in which the CPU 101 acquires the information related to the broadcast contents. Thus, the display device 17*a* keeps displaying the information related to the broadcast contents.

Thus, the terminal apparatus 10 can enable the user to review the information related to the broadcast contents distributed by any broadcast station in the receiving area, no matter whether the terminal apparatus 10 is receiving signals from the broadcast station.

(3) Second Embodiment

The second embodiment of this invention is a service-providing system. In this system, one of the service servers can provide the user with a now-on-air service of the broadcast station registered in the preset information described above. This system has a single-sign-on function.

(3-1) Configuration of the System

Figure 10:
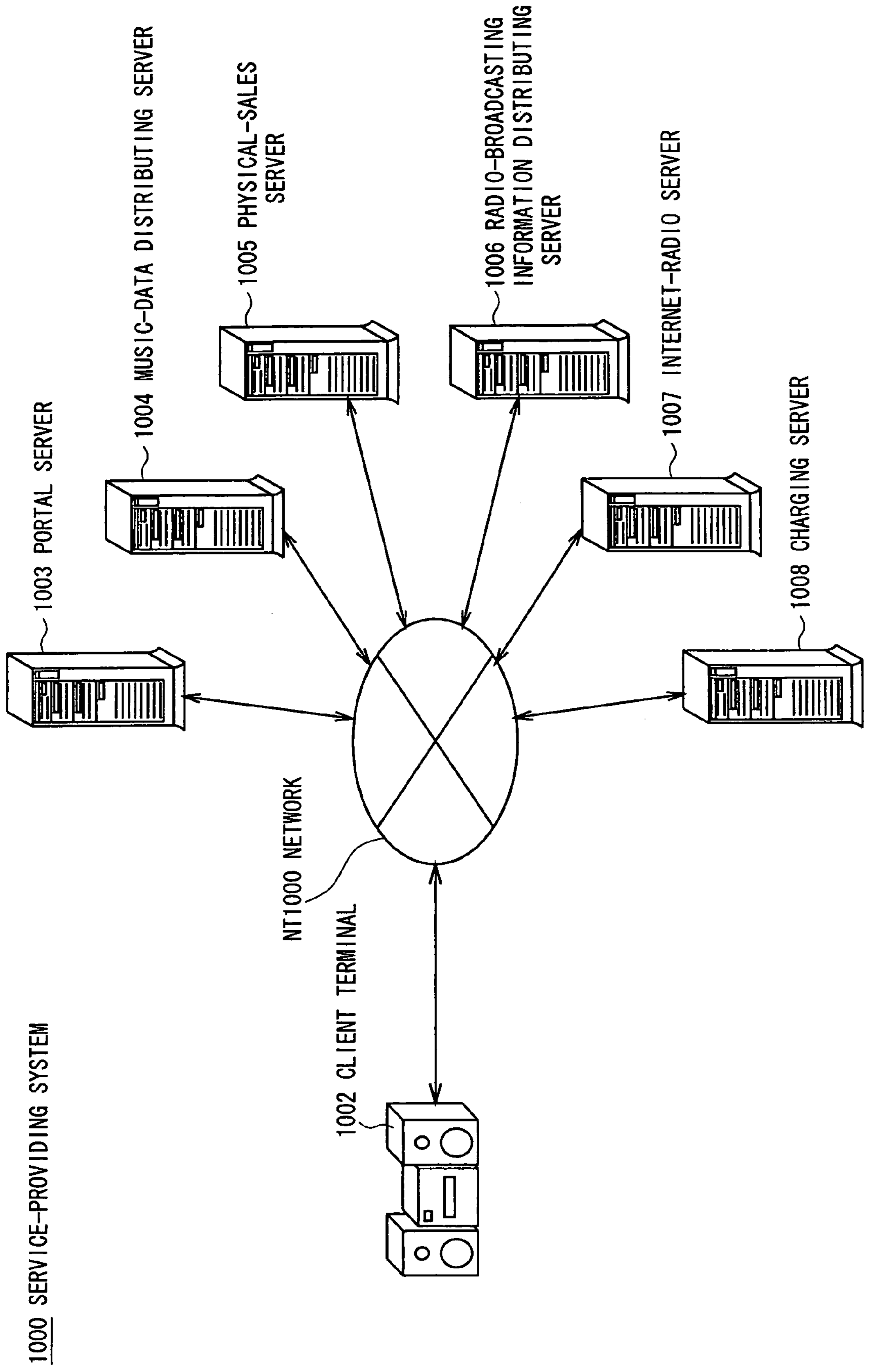
FIG. 10 is a diagram showing the over-all configuration of a music-related service-providing system, which is a second embodiment of this invention.

FIG. 10 shows this service-providing system 1000 that offers service relating to music. As FIG. 10 depicts, the system 1000 comprises a client terminal 1002, a portal server 1003, and a plurality of servers 1004 to 1008. The client terminal 1002 is property of a user who has entered a contract with the provider that runs the service-providing system 1000. The portal server 1003 works as service server that controls the client terminal 1002. The servers 1004 to 1008 can give the client terminal 1002 various types of services relating to music.

The server 1004 is a music-data distributing server in this embodiment. It can distribute music data to the client terminal 1002. The music data is transmitted in, for example, ATRAC3 (Adaptive Transform Acoustic Coding 3) format, AAC (Advanced Audio Coding) format, WMA (Windows Media Audio) format, RealAUDIO G2 Music Codec format, or MP3 (MPEG Audio Layer-3) format.

The server 1005 is a physical-sales server. This server 1005 can sell CDs (Compact Discs), DVDs (Digital Versatile Discs), and the like to the user to fulfill the order the user has placed through the client terminal 1002.

The server 1006 is a radio-broadcasting information distributing server. It provides a radio-broadcasting information distributing service distributed to the client terminal 1002 the radio programs, music programs and the like that any radio station broadcasts.

The server 1007 is an Internet-radio server. This server 1007 performs the Internet radio-broadcasting service of transmitting the radio-broadcast data in the data-streaming mode to the client terminal 1002 via a network NT1000 that is equivalent to the Internet.

The server 1008 is a charging server that collects from the user the charge for the use of the system, in response to the request made by the portal server 1003 or the like.

The client terminal 1002 in the second embodiment is equivalent to the terminal apparatus 10 that is used in the first embodiment. The portal server 1003 corresponds to the integrated service server 46. The music-data distributing server 1004 corresponds to the music distributing server 43. The radio-broadcasting information distributing server 1006 is equivalent to the broadcast-station server 41. The network NT1000 corresponds to the network 30.

(3-2) Configuration of the Client Terminal 1002

(3-2-1) Hardware Configuration of Client Terminal 1002

Figure 11:
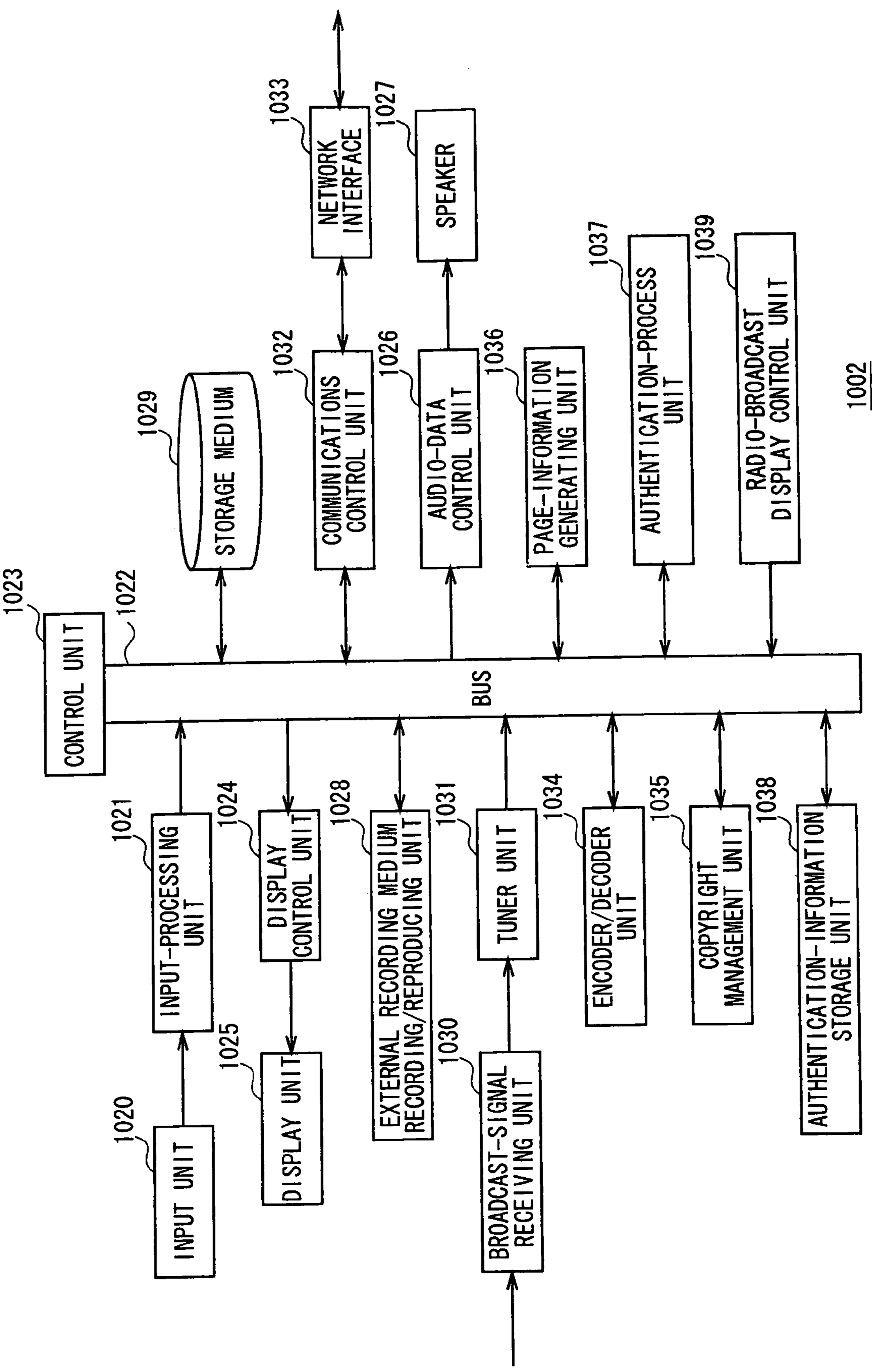
FIG. 11 is a block diagram of the hardware configuration of a client terminal, illustrating the function circuits of the terminal.

The hardware configuration of the client terminal 1002 as a data-processing apparatus will be described, with reference to the block diagram of FIG. 11. As FIG. 11 shows, the client terminal 1002 has an input unit 1020. The input unit 1020 has various buttons that are provided on the housing of the client terminal 1002 or on a remote controller (not shown). When the user operates the buttons, the input unit 1020 detects the operation, generating operation-input signals. These signals are supplied to an input-processing unit 1021.

The input-processing unit 1021 converts the operation-input signals supplied from the input unit 1020 to operation commands. The operation commands are sent through a bus 1022 to a control unit 1023.

The control unit 1023 controls some of the other components of the client terminal 1002 in accordance with the operation commands and the control signals supplied from some other components of the client terminal 1002 via the bus 1022.

A display control unit 1024 performs digital-to-analog conversion on the video data supplied to it through the bus 1022, thus generating an analog video signal. The analog video signal is supplied to a display unit 1025.

The display unit 1025 is, for example, a display such as a liquid crystal display. It is provided on the housing of the client terminal 1002 or externally connected thereto.

The display unit 1025 receives the processing result generated by the control unit 1023 and various video data as the analog video signal via the display control unit 1024. The display unit 1025 displays images represented by the analog video signal.

An audio-data control unit 1026 receives the audio data supplied via the bus 1022 and converts it to an analog audio signal, which is supplied to a speaker 1027. The speaker 1027 generates sound from the analog audio signal supplied from the audio-data control unit 1026.

An external recording medium recording/reproducing unit 1028 is configured to reproduce content data from an external recording medium such as a CD, a memory stick (trademark), or the like and to record content data on the external recording medium. Note that a memory stick comprises a flash memory and a case containing the flash memory.

The recording/reproducing unit 1028 may read video data, as content data, from the external recording medium. In this case, the video data is supplied via the bus 1022 to the display control unit 1024.

The display control unit 1024 converts the video data (i.e., content data) read by the recording/reproducing unit 1028 from the external recording medium, to an analog video signal. The analog video signal is supplied to the display unit 1025.

The recording/reproducing unit 1028 may read audio data, as content data, from the external recording medium. If this is the case, the audio data is supplied via the bus 1022 to the audio-data control unit 1026.

The audio-data control unit 1026 converts the audio data (i.e., content data) read by the recording/reproducing unit 1028 from the external recording medium, to an analog audio signal. The analog audio signal is supplied to the speaker 1027.

The control unit 1023 causes the recording/reproducing unit 1028 to supply the content data read from the external recording medium, to the storage medium 1029 incorporated in the client terminal 1002 via the bus 1022. The content data is thereby stored in the storage medium 1029. (Hereinafter, this process of storing content data in the storage medium 1029 will be referred to as "clipping".)

The control unit 1023 may read video data (image data), as content data, from the storage medium 1029. In this event, the video data is supplied to the display control unit 1024 via the bus 1022.

The control unit 1023 may read audio data, as content data, from the storage medium 1029. In this event, the audio data is supplied to the audio-data control unit 1026 via the bus 1022.

In addition, the control unit 1023 can read music data from the storage medium 1029. The music data is transferred to the recording/reproducing unit 1028. Then, the recording/reproducing unit 1028 can record the music data on the external recording medium.

A broadcast-signal receiving unit 1030 receives radio waves transmitted from radio stations. The radio waves are supplied from the unit 1030 to a tuner unit 1031.

Controlled by the control unit 1023, the tuner unit 1031 extracts a radio broadcast signal from the radio waves received by the broadcast-signal receiving unit 1030, said signal having the frequency allocated to the radio station that the user has selected by operating the input unit 1020. The audio data obtained from the radio broadcast signal is supplied to the audio-data control unit 1026 through the bus 1022.

The audio-data control unit 1026 receives the audio data from the tuner unit 1031 and converts it to analog audio signal. The analog audio signal is sent to the speaker 1027. The speaker 1027 generates sound for the radio program broadcast from the radio station from the analog audio signal. The user can therefore listen to the radio program.

The control unit 1023 can supply the audio data obtained in the tuner unit 1031, to the storage medium 1029. Hence, the storage medium 1029 can store the audio data representing the radio program.

A control unit 1023 is connected to the network NT1000 first by a communications control unit 1032 and then by a network interface 1033. Thus, the control unit 1023 can access the portal server 1003 and other servers 1004 to 1007 that are provided on the network NT1000. The control unit 1023 can exchange various data items and data items with the portal server 1003 and the other servers 1004 to 1007.

The encoder/decoder unit 1034 receives the content data from the network NT1000 through the network interface 1033 and communications control unit 1032. The unit 1034 also receives the content data read from the storage medium 1029 or the external recording medium. The content data from the network NT1000 and the content data from the storage medium 1029 or the external recording medium are encoded and compressed. The encoder/decoder unit 1034 decodes the content data and supplies them to the display control unit 1024 and the audio-data control unit 1026.

The content data read from the external recording medium may be one not compressed or encoded. In this case, the encoder/decoder unit 1034 compresses and encodes the content data. The encoder/decoder unit 1034 compresses and encodes the audio data and the like supplied from the tuner unit 1031, too. The content data, thus compressed and encoded, is sent to the storage medium 1029.

The content data compressed and encoded by the encoder/decoder unit 1034 is stored in the storage medium 1029 under the control of the control unit 1023.

A copyright management unit 1035 generates copyright management information about the content data downloaded from the network NT1000 via the network interface 1033 and communications control unit 1032. The unit 1035 also generates copyright management information about the content data the recording/reproducing unit 1028 has read from the external recording medium.

The control unit 1023 registers the copyright management information generated by the copyright management unit 1035, on the storage medium 1029. The copyright management information is registered, in association with the content data.

The copyright management unit 1035 may appropriately update the copyright management information to check out the content data associated with the copyright management information, between the storage medium 1029 and the external recording medium specified. Alternatively, the unit 1035 may appropriately update the copyright management information in order to check in the content data between the specified external recording medium and the storage medium 1029. In either case, the copy right to the content data is protected.

A page-information generating unit 1036 receives page information such as an XML (eXtensible Markup Language) file or an HTML (Hyper Text Markup Language) file from the network NT1000 via the network interface 1033 and communications control unit 1032. The unit 1036 interprets the page information and generates video data to be displayed by the display unit 1025. The video data is supplied to the display control unit 1024.

An authentication-process unit 1037 performs the process of transmitting authentication information to the portal server 1003 and the other servers 1004 to 1007 through the communications control unit 1032 and the network interface 1033. Note that the portal server 1003 and the other servers 1004 to 1007 are provided on the network NT1000 and are connected by the network interface 1033.

An authentication-information storage unit 1038 stores the authentication information that the authentication-process unit 1037 necessarily uses in order to access the portal server 1003 and the other servers 1004 to 1007.

A radio-broadcast display control unit 1039 transmits a request signal via the communications control unit 1032 and network interface 1033 to the radio-broadcasting information distributing server 1006 of the radio station that is broadcasting the radio program the client terminal 1002 is receiving at present. The request signal requests that the server 1006 should give the user the information about the radio program that the client terminal 1002 is receiving.

As a result, the radio-broadcasting information distributing server 1006 provided on the network NT1000 transmits the radio-program information. The radio-broadcast display control unit 1039 receives the radio-program information through the network interface 1033 and communications control unit 1032. Then, the unit 1039 transmits this information to the display control unit 1024. The display control unit 1024 conveys the information to the display unit 1025. The display unit 1025 displays the radio-program information. This information consists of the name of the radio program that the client terminal 1002 is receiving, the title of the musical piece the terminal 1002 is receiving, the name of the artist who plays the music, and the like. Note that the radio-program information is equivalent to the related information that is used in the first embodiment.

Of the program modules (FIG. 5) incorporated in the terminal apparatus 10 according to the first embodiment, the HTTP message program 201 and a communicator program 202 are program modules that can perform functions that are similar to those of the communications control unit 1032 (FIG. 11) provided in the client terminal 1002 in the second embodiment.

The music-purchase playback module 203 (FIG. 5) is a program module that can perform functions similar to those of the control unit 1023 and audio-data control unit 1026 (both shown in FIG. 11) incorporated in the client terminal 1002.

The XML browser 204 (FIG. 5) is a program module that can perform functions similar to those of the input-processing unit 1021 and page-information generating unit 1036 (both shown in FIG. 11) used in the client terminal 1002.

The hard-disc content controller 205, database accessing module 206 and content-data accessing module 207 (all shown in FIG. 5) are program modules that can perform functions similar to that of the control unit 1023 (FIG. 11) incorporated in the client terminal 1002.

The authentication library 221 (FIG. 5) provided in the library 211 is a program module that can perform a function similar to those of the authentication-process unit 1037 and authentication-information storage unit 1038 (both shown in FIG. 11) used in the client terminal 1002.

The clip library 212 (FIG. 5) provided in the library 211 is a program module that can perform a function similar to that of the control unit 1023 provided in the client terminal 1002.

The preset information 213 (FIG. 5) provided in the library 211 is a program module that can perform a function similar to that of the control unit 1023 that is incorporated in the client terminal 1002.

The preset-information processing module 214 (FIG. 5) is a program module that can perform a function similar to that of the control unit 1023 (FIG. 11) used in the client terminal 1002.

The related-information displaying module 208 (FIG. 5) is a program module that can perform a function similar to that of the radio-broadcast display control unit 1039 (FIG. 11) incorporated in the client terminal 1002.

The tuner-station reproducing/recording module 209 (FIG. 5) is a program module that can perform a function similar to those of the control unit 1023, audio-data control unit 1026 and tuner unit 1031 (all shown in FIG. 11) that are incorporated in the client terminal 1002.

The audio-user interface 210 (FIG. 5) is a program module that can perform a function similar to those of the input-processing unit 1021, control unit 1023 and display control unit 1024 (all shown in FIG. 11) that are incorporated in the client terminal 1002.

Hence, the terminal apparatus 10 with hardware configuration according to the first embodiment can carry out the same process as the client terminal 1002 according to the second embodiment, by using the various program modules described above.

(3-2-2) Directory Management

Figure 12:
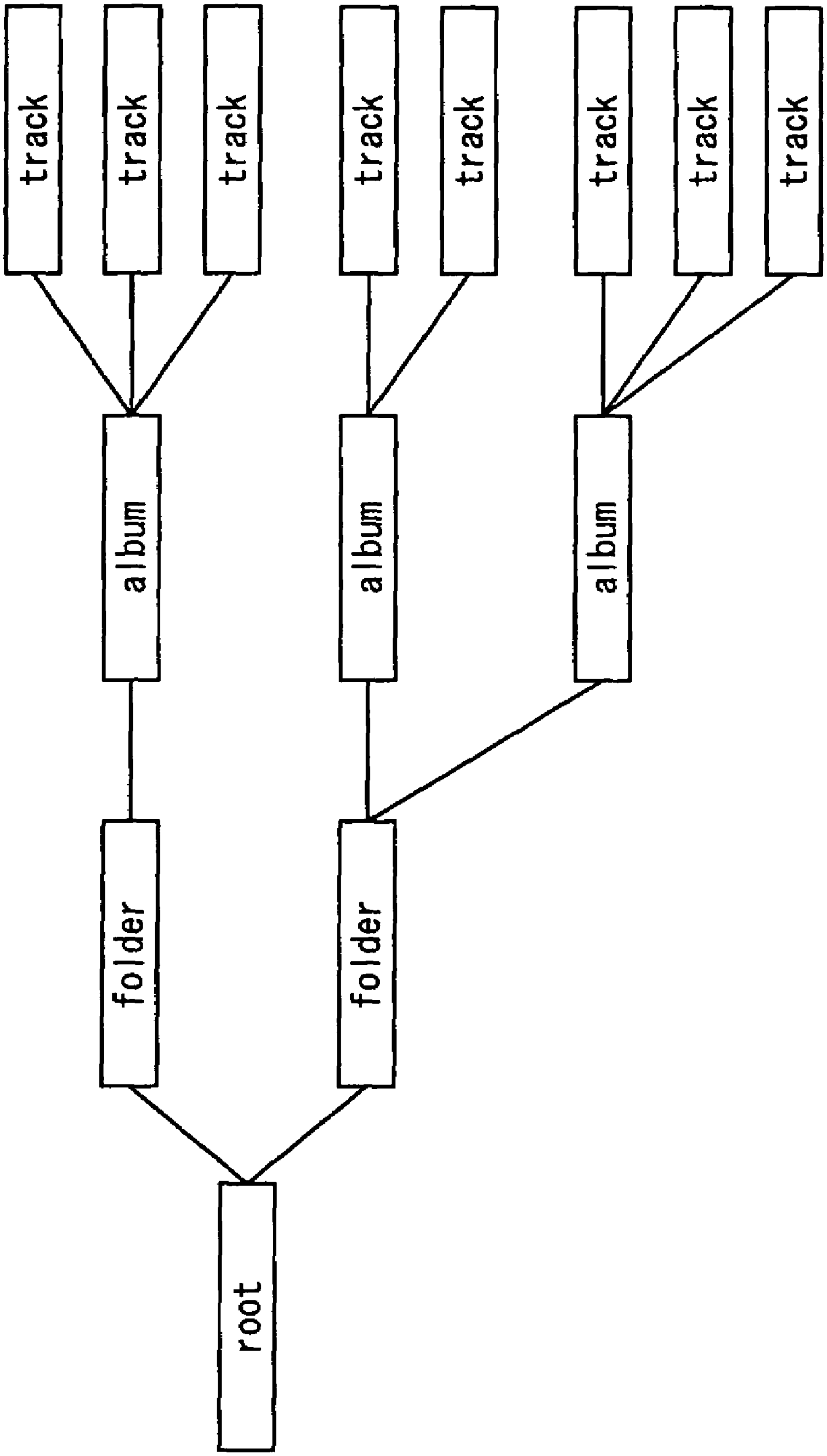
FIG. 12 is a diagram representing a directory configuration.

In the client terminal 1002, the control unit 1023 controls the content data to be stored in the storage medium 1029, in the form of such a directory configuration as is illustrated in FIG. 12. A given number of "folder" directories are prepared, constituting a layer immediately lower than "root" directories. The "folder" directories thus prepared correspond to the genres of contents or the users who may own the client terminal 1002.

"Album" directories are prepared, forming a layer immediately lower than "folder" directories. They are provided in numbers falling within a prescribed range. The "album" directories correspond to, for example, each album title. At least one "track" files are prepared, constituting a layer immediately lower than "album" directories. Several track files may belong to each album directory. Each track file is one musical piece, i.e., contents.

The content data of this directory configuration is managed by the database file that is stored in the storage medium 1029.

(3-3) Configuration of the Portal Server 1003

Figure 13:
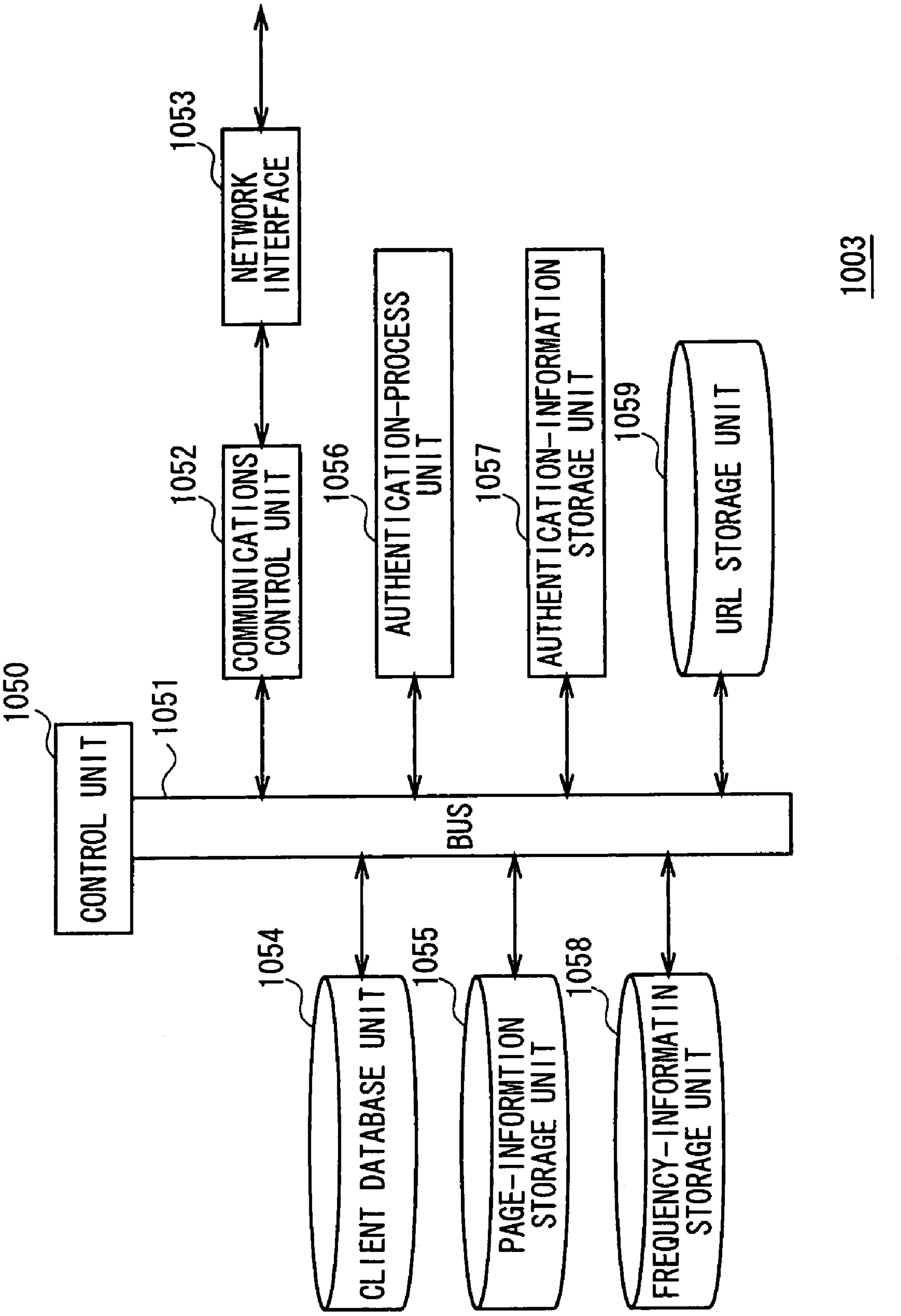
FIG. 13 is a block diagram of the hardware configuration of a portal server, depicting the function circuits constituting this server.

The hardware configuration of the portal server 1003, which functions as authentication server, will be described with reference to FIG. 13. The portal server 1003 incorporates a control unit 1050 and a bus 1051. The control unit 1050 controls the other components of the portal server 1003, which are connected to the unit 1050 by the bus 1051.

Controlled by the control unit 1050, a communications control unit 1052 receives various data items from, and transmits various data items to, the client terminal 1002 and the other servers 1004 to 1008 through a network interface 1053.

A client database unit 1054 contains the ID (Identification) code and password of any user who has entered contract with the provider that runs the service-providing system 1000 that offers service relating to music. The ID code and the password are registered, one associated with the other, forming an item of client information.

A page-information storage unit 1055 stores page information and the like, which are managed by the provider that runs the service-providing system 1000 that offers service relating to music.

The page information is described in a specific language such as an XML. It contains URL (Uniform Resource Locator) information the portal server 1003 uses to access the music-data distributing server 1004, physical-sales server 1005, radio-broadcasting information distributing server 1006, Internet-radio server 1007, etc.

An authentication-process unit 1056 can receive the user ID code and the user password from the client terminal 1002 through the network interface 1053 and communications control unit 1052. Upon receiving the user ID code and the user password, the unit 1056 determines whether the ID code and the password are registered as client information in the client database unit 1054.

Upon finishing the process of authenticating the user, the authentication-process unit 1056 issues portal-authentication result data (i.e., authentication-cession ID data, later described). The portal-authentication result data, which indicates the result of the process of authenticating the user, is temporarily stored in an authentication-information storage unit 1057.

As the result of the process of authenticating the user, the authentication-process unit 1056 may determine that the user is an authenticated one. In this case, the control unit 1050 reads the page information for a contracting part, from the page-information storage unit 1055. The control unit 1050 transmits the page information, together with the portal-authentication result data, to the client terminal 1002, first through the communications control unit 1052 and then through the network interface 1053.

As the result of the process of authenticating the user, the authentication-process unit 1056 may determine that the user is not an authenticated one. In this case, the control unit 1050 reads authentication-error notifying page information from the page-information storage unit 1055. The control unit 1050 transmits authentication-error information, together with the authentication-error-notifying page information, to the client terminal 1002, first through the communications control unit 1052 and then through the network interface 1053. The authentication-error-notifying page information indicates that the user is not an authenticated one.

Portal-authentication result data (i.e., authentication ticket, later described) is transmitted from the client terminal 1002 when the music-data distributing server 1004, physical-sales server 1005 and radio-broadcasting information distributing server 1006 finish the authentication process on the user of the client terminal 1002. The authentication-process unit 1056 receives the portal-authentication result data via the network interface 1053 and communications control unit 1052. The unit 1056 then compares this portal-authentication result data with the portal-authentication result data temporarily stored in the authentication-information storage unit 1057.

The authentication-process unit 1056 determines whether portal-authentication result data from the music-data distributing server 1004, physical-sales server 1005 and radio-broadcasting information distributing server 1006 is normal one or not. The result of this decision is sent to the music-data distributing server 1004, physical-sales server 1005 and radio-broadcasting information distributing server 1006, first through the communications control unit 1052 and then through the network interface 1053.

A frequency-information storage unit 1058 stores broadcast station information. The broadcast station information contains area code, frequency data items, names of radio stations, and call signs, each stored in association with any other data item. The area codes are, for example, postal codes assigned to the areas, respectively. The frequency data items represent the frequencies assigned to the radio stations from which the client terminal 1002 can receive signals. The names of radio stations (hereinafter referred to as "radio-station names") pertain to the radio stations that broadcast radio programs that the terminal 1002 can receive. The call signs are ID data items that are uniquely assigned to the radio stations, respectively.

The URL storage unit 1059 stores the call signs for each radio station and URL data items associated with the call signs, respectively. The URL data items represent. URLs that can acquire the radio-broadcast data items (hereinafter called "now-on-air data items") about the radio programs that the radio stations are broadcasting at present. Each now-on-air data item is the name of a radio program being broadcast, the title of the musical piece being broadcast, and the like.

(3-4) Configuration of the Music-Data Distributing Server 1004

Figure 14:
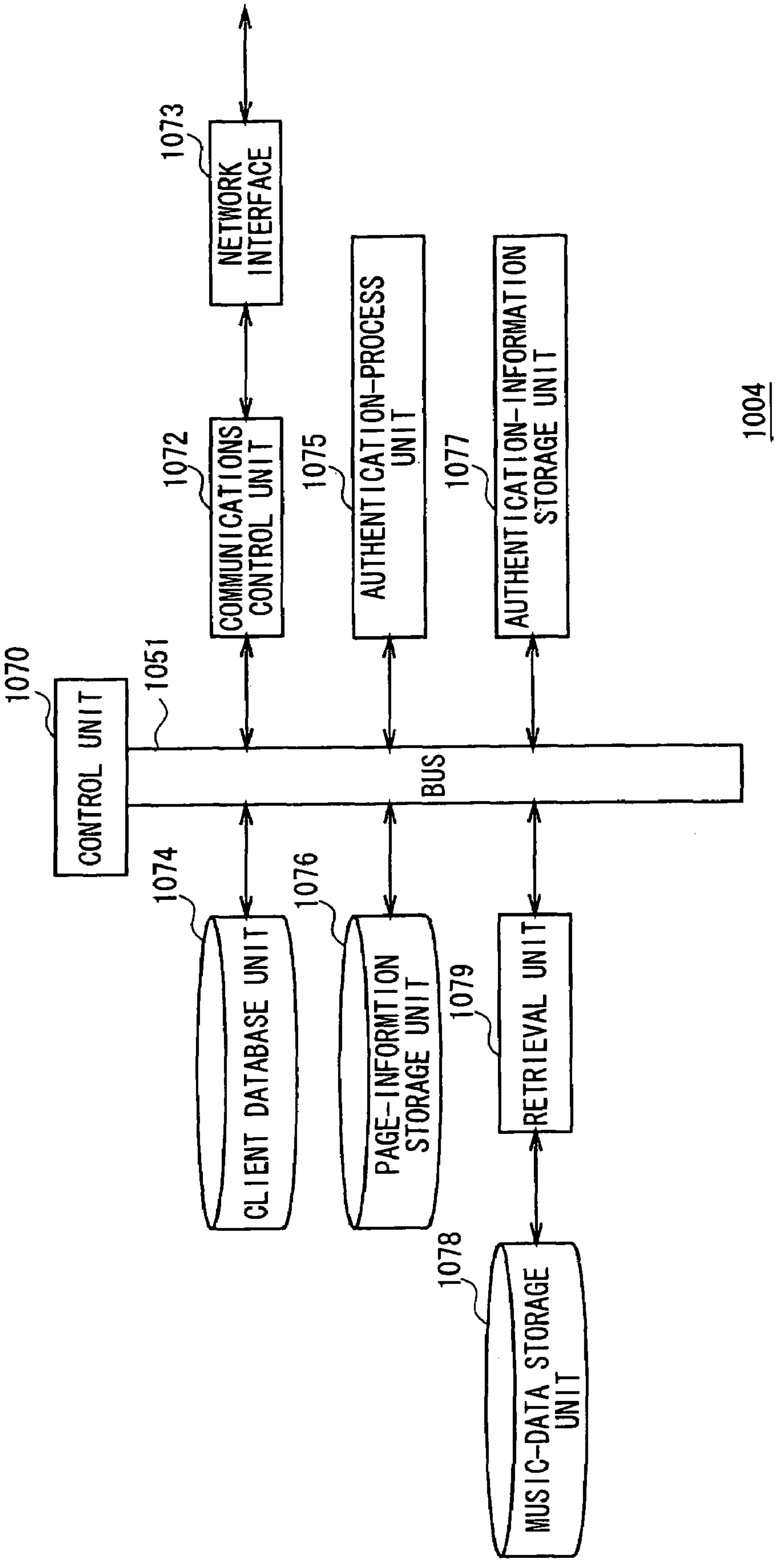
FIG. 14 is a block diagram of the hardware configuration of a music-data distributing server, showing the function circuits constituting this server.

The hardware configuration of the music-data distributing server 1004 will be described, with reference to FIG. 14. The server 1004 incorporates a control unit 1070 and a bus 1071. The control unit 1070 controls the other components of the server 1004 connected to it by the bus 1071.

Controlled by the control unit 1070, a communications control unit 1072 receives various data items or various data items from, and transmits various data items to, the client terminal 1002, the portal server 1003 and the like through a network interface 1073. The various data items are, for example, content data.

A client database unit 1074 contains the user ID code and password of any user who has entered contract with the provider that runs the music-data distributing server 1004. The user ID code and the password are registered, one associated with the other, forming an item of client information. The client database unit 1074 need not be used if an authentication-process unit 1075 can authenticate the user on the basis of the portal-authentication result data that has transmitted from the client terminal 1002 and that the portal server 1003 has issued.

A page-information storage unit 1076 stores page information and the like, which are managed in the music-data distributing server 1004. This page information introduces the music data items that can be downloaded.

The page information for use in distributing music data items is described in a specific language such as an XML. The page information helps the user of the client terminal 1002 to select any music data items that he or she wants to have downloaded.

The control unit 1070 may receive a request signal from the client terminal 1002 via the network interface 1073 and the communications control unit 1072. The request signal requests for the page information for distributing music data, which should be transmitted to the client terminal 1002. Upon receiving the request signal, the control unit 1070 supplies the page information for distributing the music data, which is stored in the page-information storage unit 1076, to the client terminal 1002 through the communications control unit 1072 and a network interface 1073.

The authentication-process unit 1075 receives the user ID code and password of the user from the client terminal 1002, first through the network interface 1073 and then through the communications control unit 1072. Then, it is determined whether the user ID code and the password have been registered, as client information, in the client database unit 1074. Thus, the authentication-process unit 1075 authenticates the user of the client terminal 1002.

The authentication-process unit 1075 may authenticate the user by a different method that uses neither the user ID code nor the user password. That is, the unit 1075 receives portal-authentication result data (i.e., authentication ticket, later described) issued by the portal server 1003 and transmitted from the client terminal 1002, first through the network interface 1073 and then through the communications control unit 1072. The authentication-process unit 1075 then transmits the portal-authentication result data to the portal server 1003, first through the communications control unit 1072 and then through the network interface 1073.

The portal server 1003 receives the portal-authentication result data and confirms the receipt of this data. The server 1003 transmits the data indicating the receipt of the portal-authentication result data. The authentication-process unit 1075 receives this data from the portal server 1003, first through the network interface 1073 and then through the communications control unit 1072. From this data, the authentication-process unit 1075 determines whether the user is an authenticated user who has entered a contract with the provider that runs the service-providing system 1000 in order to receive the service relating to music.

Thus, the authentication-process unit 1075 issues server-authentication result data (i.e., service-cession ID data, later described) that shows the result of the authentication of the user.

The authentication-process unit 1075 may thus determine that the user is an authenticated one, as it finishes the process of authenticating the user. If this is the case, the control unit 1070 supplies the page information to the client terminal 1002, together with the server-authentication result data, through the communications control unit 1072 and the network interface 1073. The page information, which will be used to distribute the music data, is stored in the page-information storage unit 1076.

Conversely, the authentication-process unit 1075 may not determine that the user is an authenticated one, as it finishes the process of authenticating the user. In this case, the control unit 1070 supplies an authentication-error information to the client terminal 1002, together with the page information, through the communications control unit 1072 and the network interface 1073. The page information, which indicates the authentication failure, is stored in the page-information storage unit 1076.

An authentication-information storage unit 1077 temporarily stores the server-authentication result data issued by the authentication-process unit 1075. The storage unit 1077 stores various authentication data items, too. The authentication-process unit 1075 must use these authentication data items to authenticate the user of the client terminal 1002.

A music-data storage unit 1078 stores a plurality of music data items that have been compressed and encoded in the above-mentioned ATRAC3 format or the above-mentioned MP3 format. In the unit 1078, the music data items are recorded, each associated with a retrieval key such as content ID code.

A retrieval unit 1079 can receive a download request signal from the client terminal 1002 through the network interface 1073 and the communications control unit 1072. Note that the client terminal 1002 transmits the download request signal when it receives the page information for distributing music data items. The download request signal requests that any music data item that the user wants should be downloaded into the client terminal 1002. This signal contains a key for retrieving the music data. Upon receiving the download request signal, the retrieval unit 1079 extracts the retrieval key from the download request signal.

In accordance with the retrieval key, the retrieval unit 1079 retrieves the music data item the user wants to have downloaded, from the music-data storage unit 1078.

The control unit 1070 transmits the music data item thus retrieved, to the client terminal 1002, first through the communications control unit 1072 and then through the network interface 1073.

The control unit 1070 transmits charge information to the charging server 1008, first through the communications control unit 1072 and then through the network interface 1073. The charge information will be used to collect from the user the charge for downloading the music data item. On the basis of the charge information, the charging server 1008 performs the process of charging the user for the music data item downloaded by the user.

(3-5) Configuration of the Physical-Sales Server 1005

Figure 15:
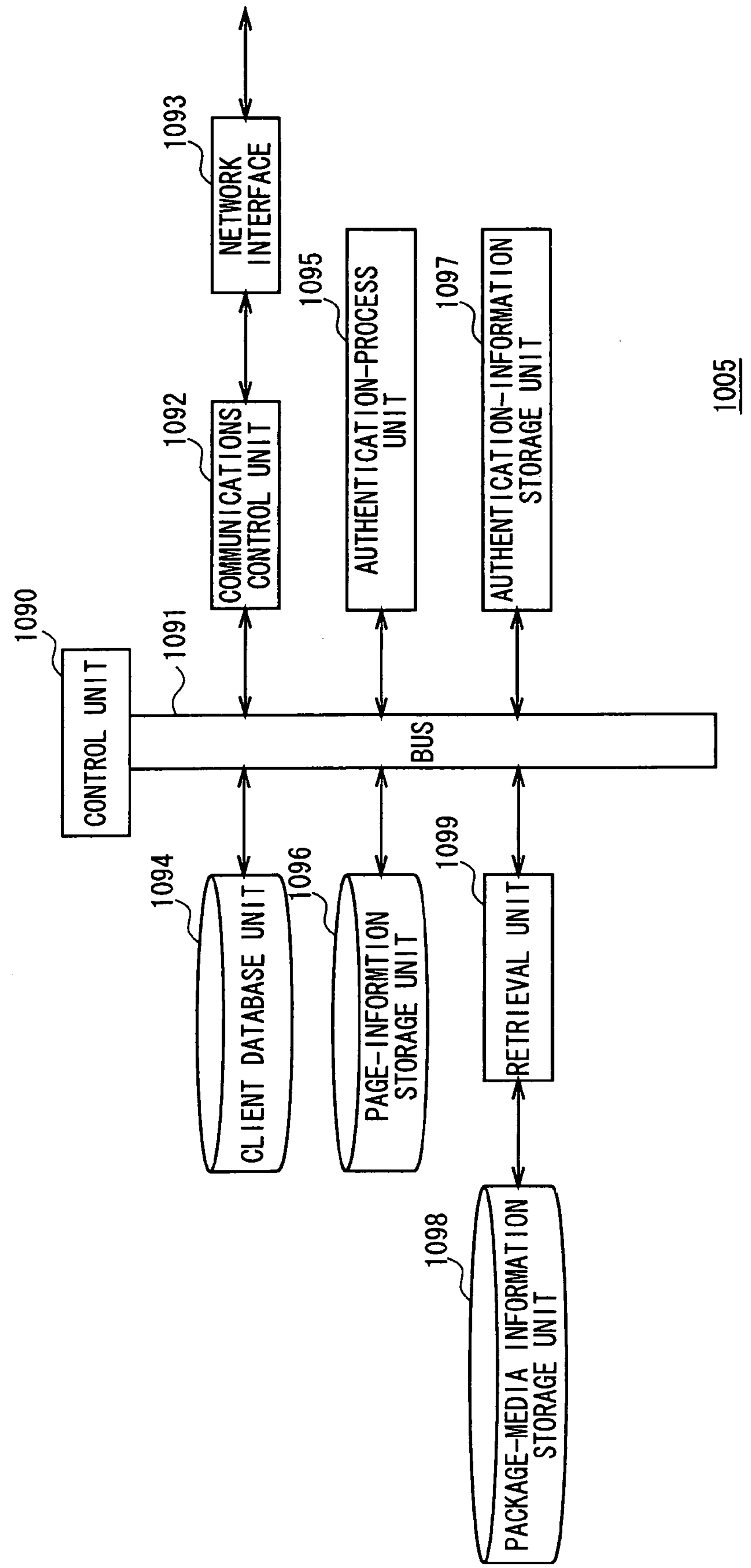
FIG. 15 is a block diagram of the hardware configuration of a physical-sales server, showing the function circuits constituting the physical-sales server.

The hardware configuration of the physical-sales server 1005 will be described, with reference to FIG. 15. The physical-sales server 1005 incorporates a control unit 1090 and a bus 1091. The control unit 1090 controls the other components of the physical-sales server 1005, which are connected to it by the bus 1091.

When controlled by the control unit 1090, a communications control unit 1092 receives various data items from, and transmits various data items to, the client terminal 1002, the portal server 1003 and the like through a network interface 1093.

A client database unit 1094 stores the user ID codes and passwords of the users who have already entered a contract with the provider that runs the physical-sales server 1005. The user ID codes and the user passwords are registered in one-to-one association, in the client database unit 1094. An authentication-process unit 1095 may have the function of authenticate the user of the client terminal 1002 in accordance with the portal-authentication result data issued by the portal server 1003 and transmitted from the client terminal 1002. In this case, the client database unit 1094 need not be provided.

A page-information storage unit 1096 stores page information and the like controlled by the physical-sales server 1005. The page information is used for the sale of package media such as CDS and DVDS for sale. More precisely, the page information introduces the package media.

The page information for promoting the sale of the package media is described in a specific language such as an XML. The page information helps the user of the client terminal 1002 to select any package media (e.g., CDs or DVDS) that he or she wants to buy.

The control unit 1090 can receive a page-information acquisition request signal from the client terminal 1002, which requests for the page information for the sale of package media. Upon receipt of the page-information acquisition request signal, first through the network interface 1093 and then through the communications control unit 1092, the control unit 1090 transmits the page information for the sale of package media to the client terminal 1002, first through the communications control unit 1092 and then through the network interface 1093. It should be recalled that the page information is stored in the page-information storage unit 1096.

The authentication-process unit 1095 receives the user ID code and the password, both assigned to the user of the client terminal 1002, from the client terminal 1002 through the network interface 1093 and the communications control unit 1092. The unit 1095 then determines whether the user ID code and the user password are registered as client information in the client database unit 1094, in order to authenticate the user.

The authentication-process unit 1095 may authenticate the user by a different method that uses neither the user ID code nor the user password. In this method, the unit 1095 receives the portal-authentication result data (i.e., authentication ticket, later described) issued by the portal server 1003 and transmitted from the client terminal 1002, first through the network interface 1093 and then through the communications control unit 1092. The portal-authentication result data, thus received, is transmitted to the portal server 1003, first through the communications control unit 1092 and then through the network interface 1093.

When the portal-authentication result data is transmitted to the portal server 1003, the authentication-process unit 1095 receives confirmation result data from the portal server 1003 through the network interface 1093 and the communications control unit 1092. The confirmation result data shows that the portal server 1003 has performed an authentication process (i.e., the confirmation process described above) on the basis of the portal-authentication result data. Then, the authentication-process unit 1095 determines, from the confirmation result data, whether the user of the client terminal 1002 is an authenticated one who has entered a contract with the provider that runs the service-providing system 1000 that offers service relating a music.

When the authentication-process unit 1095 finishes the process of authenticating the user, it generates server-authentication result data (i.e., service-cession ID data, later described) that indicates the result of the process of authenticating the user.

If the authentication-process unit 1095 authenticates the user as the result of the process of user authetication, the control unit 1090 transmits the page information, together with the server-authentication result data, to the client terminal 1002, first through the communications control unit 1092 and then through the network interface 1093. Note that the page information is stored in the page-information storage unit 1096 and is used to promote the sale of package media.

The authentication-process unit 1095 may not authenticate the user, as the result of the process of user authentication. If this is the case, the control unit 1090 transmits authentication-error information, together with authentication-error-notifying page information, to the client terminal 1002, first through the communications control unit 1092 and then through the network interface 1093. The authentication-error-notifying page information, which indicates the authentication failure, is stored in the page-information storage unit 1096.

An authentication-information storage unit 1097 temporarily stores the server-authentication result data issued by the authentication-process unit 1095. The storage unit 1097 stores various authentication data items, too. The authentication-process unit 1095 must use these authentication data items to authenticate the user of the client terminal 1002.

The package-media-information storage unit 1098 stores data items about a plurality of package media such as CDs and DVDs for sale. (Hereinafter, these data items will be referred to as "package-media information items.") In the unit 1098, the package-media information items are recorded, each associated with a retrieval key such as package-medium ID code.

The retrieval unit 1099 can receive a media-information request signal from the client terminal 1002 through the network interface 1093 and the communications control unit 1092. Note that the client terminal 1002 transmits the media-information request signal when it receives the page information for the sale of package media. The media-information request signal requests for the package media information about the specific package medium such as CD or DVD. Upon receiving the media-information request signal, the retrieval unit 1099 extracts the retrieval key for retrieving the specific package media.

On the basis of the retrieval key, the retrieval unit 1099 retrieves the package-media information item about the specific package medium that corresponds to the retrieval condition designated by the retrieval key from a plurality of package-media information items in the package-media-information storage unit 1098.

The control unit 1090 transmits the package-media information item thus retrieved, to the client terminal 1002, first through the communications control unit 1092 and then through the network interface 1093. The client terminal 1002 displays the package-media information item about the specific package medium.

The control unit 1090 may receive a purchase request signal from the client terminal 1002, through the network interface 1093 and the communications control unit 1092. Note that the purchase request signal indicates that the user wants to buy the specific package medium. Upon receiving the purchase request signal, the control unit 1090 performs the process of buying and delivering the package medium specified by the user of the client terminal 1002.

The control unit 1090 transmits charge information to the charging server 1008, first through the communications control unit 1092 and then through the network interface 1093. The charge information will be used to collect from the user the money for package medium. On the basis of the charge information, the charging server 1008 performs the process of charging the user for the specific package medium.

Upon finishing the process of causing the charging server 1008 to charge the user, the control unit 1090 transmits purchase-completion page information to the client terminal 1002, first through the communications control unit 1092 and then through the network interface 1093. The purchase-completion page information shows that the user has bought the package medium.

(3-6) Configuration of the Radio-Broadcasting Information Distributing Server 1006

Figure 16:
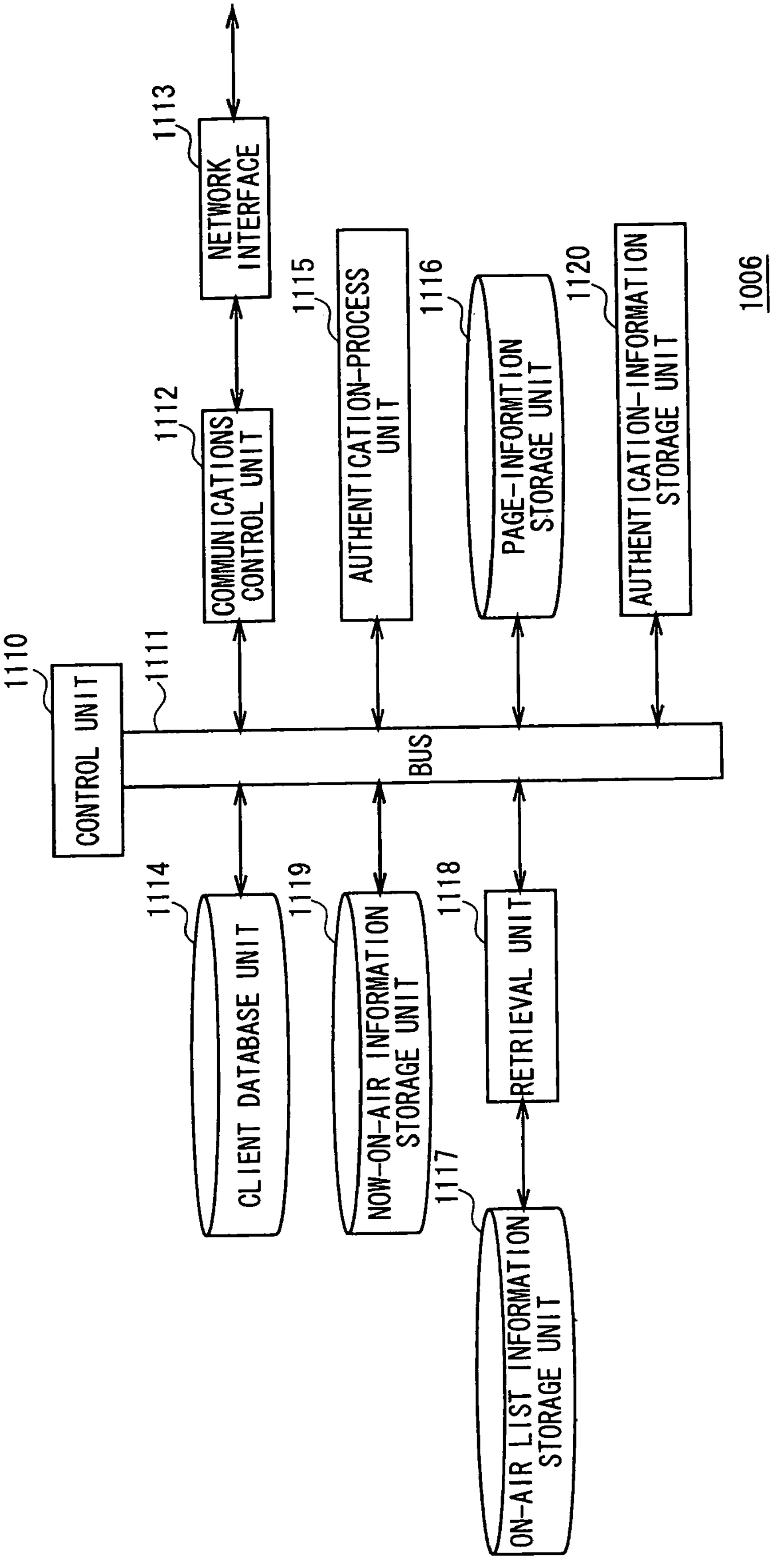
FIG. 16 is a block diagram of the hardware configuration of a radio-broadcasting information distributing server, showing the function circuits constituting this server.

The radio-broadcasting information distributing server 1006 that operates as server for providing related information will be described, with reference to FIG. 16. The radio-broadcasting information distributing server 1006 incorporates a control unit 1110 and a bus 1111. The control unit 1110 controls the other components of the radio-broadcasting information distributing server 1006, which are connected to it by the bus 1111.

Controlled by the control unit 1110, a communications control unit 1112 receives various data items from, and transmits various data items to, the client terminal 1002, the portal server 1003 and the like through a network interface 1113.

A client database unit 1114 stores client information. The client information contains the user ID (Identification) code and password of any user who has entered contract with the provider that runs the radio-broadcasting information distributing server 1006. The user ID code and the password are registered, one associated with the other, forming an item of client information. The client database unit 1114 need not be used if an authentication-process unit 1115 can authenticate the user on the basis of the portal-authentication result data that has transmitted from the client terminal 1002 and that the portal server 1003 has issued.

A page information storage unit 1116 stores page information and the like, which will be used to acquire radio broadcast information (hereinafter called "on-air list information"). The on-air list information is managed by the radio-broadcasting information distributing server 1006 and concerns with the radio programs that have been broadcast by the radio stations that are linked to the radio-broadcasting information distributing server 1006.

The page-information for distributing the on-air list information is described in a specific language such as an XML. It contains an input box or the like. The input box is used to input the name and broadcast date of any radio program that the user wishes to have, which will be used as a key for retrieving the on-air list information.

An on-air list information storage unit 1117 stores the name, on-air start time and on-air end time of each radio program that any radio station linked to the radio-broadcasting information distributing server 1006 has already broadcast. The unit 1117 stores on-air list information, too. The on-air list information represents a list of the titles of the musical pieces broadcast in the radio program, the names of the artists who play the musical pieces, the on-air start time of each of these musical pieces, and the like.

The control unit 1110 receives a page-information acquisition request signal requesting the page information for distributing the on-air list information, from the client terminal 1002, first through the network interface 1113 and then through the communications control unit 1112. In response to the page-information acquisition request signal, the control unit 1110 transmits the page information for distributing the on-air list information, to the client terminal 1002, first through the communications control unit 1112 and then through the network interface 1113. Note that this page information is stored in the page-information storage unit 1116.

A retrieval unit 1118 can receive an on-air list information request signal from the client terminal 1002 through the network interface 1113 and the communications control unit 1112. Note that the on-air list information request signal contains a key for retrieving the desired on-air list information input on the page information for distributing the on-air list information. Upon receiving the on-air list information request signal, the retrieval unit 1118 extracts the retrieval key from the on-air list information request signal.

In accordance with the retrieval key, the retrieval unit 1118 retrieves, from the on-air list information storage unit 1117, that part of the on-air list information which meets the retrieval condition defined by the retrieval key. This part of the on-air list information, thus extracted, is the on-air list information desired.

The control unit 1110 transmits the on-air list information thus retrieved, to the client terminal 1002, first through the communications control unit 1112 and then through the network interface 1113.

A now-on-air information storage unit 1119 stores the now-on-air information that represents the name, on-air start time and on-air end time of the radio program being broadcast from the radio station linked to the radio-broadcasting information distributing server 1006. The now-on-air list information represents the titles of the musical pieces, the names of the artists who play the musical pieces, the on-air start time of each of these musical pieces being broadcast, and the like, too.

The authentication-process unit 1115 receives the user ID code and password of the user of the client terminal 1002, along with the now-on-air information request signal, from the client terminal 1002 through the network interface 1113 and the communications control unit 1112. Upon receiving the user ID code and password of the user, the unit 1115 determines whether the user ID code and user password have been registered as client information in the client database unit 1114, in order to authenticate the user.

The authentication-process unit 1115 may authenticate the user by a different method that uses neither the user ID code nor the user password. In this method, the unit 1115 receives the portal-authentication result data (i.e., authentication ticket, later described) issued by the portal server 1003 and transmitted from the client terminal 1002, first through the network interface 1113 and then through the communications control unit 1112. The portal-authentication result data, thus received, is transmitted to the portal server 1003, first through the communications control unit 1112 and then through the network interface 1113.

When the portal-authentication result data is transmitted to the portal server 1003, the authentication-process unit 1115 receives confirmation result data from the portal server 1003 through the network interface 1113 and the communications control unit 1112. The confirmation result data shows that the portal server 1003 has performed an authentication process (i.e., the confirmation process described above) on the basis of the portal-authentication result data. Then, the authentication-process unit 1115 determines, from the confirmation result data, whether the user is an authenticated one who has entered a contract with the provider that runs the service-providing system 1000 that offers service relating to music.

When the authentication-process unit 1115 finishes the process of authenticating the user, it generates server-authentication result data (i.e., service-cession ID data, later described) that indicates the result of the process of authenticating the user.

If the authentication-process unit 1115 authenticates the user as the result of the process of user authentication, the control unit 1110 transmits the now-on-air information, together with the server-authentication result data, to the client terminal 1002, first through the communications control unit 1112 and then through the network interface 1113. Note that the now-on-air information is stored in the now-on-air information storage unit 1119.

The authentication-process unit 1115 may not authenticate the user, as the result of the process of user authentication. If this is the case, the control unit 1110 transmits authentication-error information, together with authentication-error-notifying page information, which is stored in the page-information storage unit 1116 and indicates the authentication failure, to the client terminal 1002, first through the communications control unit 1112 and then through the network interface 1113.

Thus, the control unit 1110 distributes the now-on-air information at the request of the user if the user is authenticated. If the user cannot be authenticated, the control unit 1110 disables the user from receiving the radio broadcast information distribution service, such as the now-on-air information, which (the radio-broadcasting information distributing server 1006 provides.

An authentication-information storage unit 1120 temporarily stores the server-authentication result data issued by the authentication-process unit 1115. The unit 1120 stores various authentication data items, too. The authentication-process unit 1115 must use these authentication data items to authenticate the user of the client terminal 1002.

(3-7) Processes Performed by the Servers

The process carried out between the client terminal 1002 and the portal server 1003, and the processes accomplished between the client terminal 1002, on the one hand, and the music-data distributing server 1004, physical-sales server 1005 and radio-broadcasting information distributing server 1006, on the other hand, will be described, with reference to the sequence charts of FIGS. 17 to 22.

(3-7-1) Sequence of the User Authentication between the Client Terminal 1002 and the Portal Server 1003

The process of authenticating the user, which is achieved between the client terminal 1002 and the portal server 1003 will be explained, with reference to FIG. 17.

Assume that the power switch on the client terminal 1002 of the user who has entered a contract with the provider that runs the service-providing system 1000 is turned on, or the user depresses an operation button of the input unit 1020. Then, an operation signal is generated. The input-processing unit 1021 converts the operation-input signal to an operation command. Upon receiving this operation command, the control unit 1023 starts the authentication request process.

When the client terminal 1002 starts the authentication request process. First, in Step SP1000, the control unit 1023 generates a connection request signal. The connection request signal contains the authentication-cession ID data and the like, which are temporarily stored in the authentication-information storage unit 1038. The connection request signal is transmitted to the portal server 1003, first through the communications control unit 1032 and then through the network interface 1033.

Note that the portal server 1003 issues authentication-cession ID data every time the client terminal 1002 is connected to the portal server 1003. That is, the authentication-cession ID data identifies the communication connection condition (i.e., cession) between the client terminal 1002 and the portal server 1003.

The authentication-cession ID data used for user authentication or the like is valid for a predetermined term, from the time the portal server 1003 issues it. (The validation term is, for example, about one minute.)

Therefore, the client terminal 1002 that has received the authentication-cession ID data from the portal server 1003 is considered to be disconnected from the portal server 1003 if it fails to transmit the ID data back to the portal server 1003 within the validation term.

Since the authentication-cession ID data is valid for a specific time only, the portal sever 1003 prevents any user who has entered a contract with the provider that runs the service-providing system 1000 from using any authentication-cession ID data issued in the past to identify himself or herself as an authenticated user.

The authentication-information storage unit 1038 temporarily stores the authentication-cession ID data. This ID data is data that the portal server 1003 issued when the client terminal 1002 was connected to the portal server 1003 to have its user authenticated.

In Step SP1001, the control unit 1050 of the portal server 1003 receives the connection request signal from the client terminal 1002 through the network interface 1053 and the communications control unit 1052. The control unit 1050 supplies the authentication-cession ID data and the like, which are contained in the connection request signal, to the authentication-process unit 1056.

Controlled by the control unit 1050, the authentication-process unit 1056 performs the process of authenticating the user on the basis of the authentication-cession ID data received as connection request signal from the client terminal 1002.

The authentication-process unit 1056 may not authenticate the user of the client terminal 1002 because the authentication-cession ID data is no longer valid. In this case, the control unit 1050 transmits authentication-error data indicating that the user is not authenticated, to the client terminal 1002, first through the communications control unit 1052 and then through the network interface 1053.

In Step SP1002, the control unit 1023 of the client terminal 1002 receives the authentication-error data from the portal server 1003, first through the network interface 1033 and then through the communications control unit 1032. In response to the authentication-error data, the control unit 1023 reads the user ID code, the user password, and the like, stored in the authentication-information storage unit 1038. Then, the control unit 1023 transmits the user ID code, the user password and the like to the portal server 1003 through the communications control unit 1032 and the network interface 1033.

In Step SP1003, the control unit 1050 of the portal server 1003 receives the user ID code, the user password and the like from the client terminal 1002, first through the network interface 1053 and then through the communications control unit 1052. The control unit 1050 supplies the user ID code, the user password and the like to the authentication-process unit 1056.

Controlled by the control unit 1050, the authentication-process unit 1056 performs the process of authenticating the user. That is, the unit 1050 determines whether the user ID code, the user password and the like, received from the client terminal 1002, are included in the client information registered in the client database unit 1054.

As the result, the authentication-process unit 1056 may determine that the user of the client terminal 1002 is authenticated. If this is the case, the control unit 1050 controls the authentication-process unit 1056, causing the unit 1056 to issue authentication-cession ID data that shows the condition of communication between the client terminal 1002 and the portal server 1003. The authentication-cession ID data is transmitted to the client terminal 1002. At the same time, the authentication-cession ID data is temporarily stored in the authentication-information storage unit 1057.

The control unit 1050 transmits the authentication-cession ID data and the like, issued by the authentication-process unit 1056, to the client terminal 1002, first through the communications control unit 1052 and then through the network interface 1053.

In Step SP1004, the control unit 1023 of the client terminal 1002 receives the authentication-cession ID data and the like, transmitted from the portal server 1003, first through the network interface 1033 and then through the communications control unit 1032. The control unit 1023 supplies the authentication-cession ID data and the like to the authentication-process unit 1037.

Controlled by the control unit 1023, the authentication-information storage unit 1038 temporarily stores the authentication-cession ID data and the like that have been received from the portal server 1003.

The control unit 1023 transmits a page-information acquisition request signal to the portal server 1003, first through the communications control unit 1032 and then through the network interface 1033. The page-information acquisition request signal demands that the portal server 1003 should give page information to the terminal 1002. The control unit 1023 transmits this signal, together with the authentication-cession ID data and the like that have been received from the portal server 1003 and temporarily stored in the authentication-information storage unit 1038.

In Step SP1005, the control unit 1050 of the portal server 1003 receives the page-information acquisition request signal, the authentication-cession ID data, and the like, transmitted from the client terminal 1002, first through the network interface 1053 and then through the communications control unit 1052. The control unit 1050 supplies the authentication-cession ID data and the like to the authentication-process unit 1056.

The authentication-process unit 1056 carries out the process of authenticating the user of the client terminal 1002, under the control of the control unit 1050. More precisely, the unit 1056 compares the authentication-cession ID data and the like, which have been transmitted from the client terminal 1002, with the authentication-cession ID data and the like, which have been issued to the client terminal 1002 in Step SP1003 and temporarily stored in the authentication-information storage unit 1057.

If the user of the client terminal 1002 is found to be an authenticated one in Step SP1006, the authentication-process unit 1056 determines that the request for page information made by the client terminal 1002 is justifiable. Then, the validation term of the authentication-cession ID data and the like issued to the client terminal 1002 is extended.

In Step SP1006, the control unit 1050 reads the page information requested for by the user, from the page-information storage unit 1055. The control unit 1050 then transmits the page information to the client terminal 1002, first through the communications control unit 1052 and then through the network interface 1053, together with the authentication-cession ID data and the like, the validation term of which has been extended from the authentication-process unit 1056.

In Step SP1007, the control unit 1023 of the client terminal 1002 receives the page information, the authentication-cession ID data, and the like, all transmitted from the portal server 1003, first through the network interface 1033 and then through the communications control unit 1032. The page information is supplied to the page-information generating unit 1036. The authentication-cession ID data and the like, the validation term of which has been extended, are supplied to the authentication-process unit 1037.

The page-information generating unit 1036 generates video data from the page information supplied from the control unit 1023. The video data represents a page that contains data items showing the links to the music-data distributing server 1004, physical-sales server 1005 and radio-broadcasting information distributing server 1006. The generated video data is sent to the display control unit 1024.

The display control unit 1024 performs digital-to-analog conversion on the video data supplied from the page-information generating unit 1036. Thus, the unit 1024 generates an analog video signal. The analog video signal is supplied to the display unit 1025. The display unit 1025 displays the page information about the portal server 1003, which is represented by the analog video signal.

The authentication-process unit 1037 updates the authentication-cession ID data and the like, which are temporarily stored in Step SP1004, to new authentication-cession ID data and the like whose validation term has been extended. More specifically, the unit 1037 receives the authentication-cession ID data and the like, whose validation term has been extended, from the portal server 1003, and writes them over the authentication-cession ID data and the like, whose validation term has not been extended, in the authentication-information storage unit 1038.

(3-7-2) Sequence of the User Authentication between the Client Terminal 1002 and the Servers 1004 to 1006

The process of authenticating the user, which is achieved between the client terminal 1002, on the one hand, and the music-data distributing server 1004, physical-sales server 1005 and radio-broadcasting information distributing server 1006, on the other hand, will be explained, with reference to the sequence chart of FIG. 18.

Figure 17:
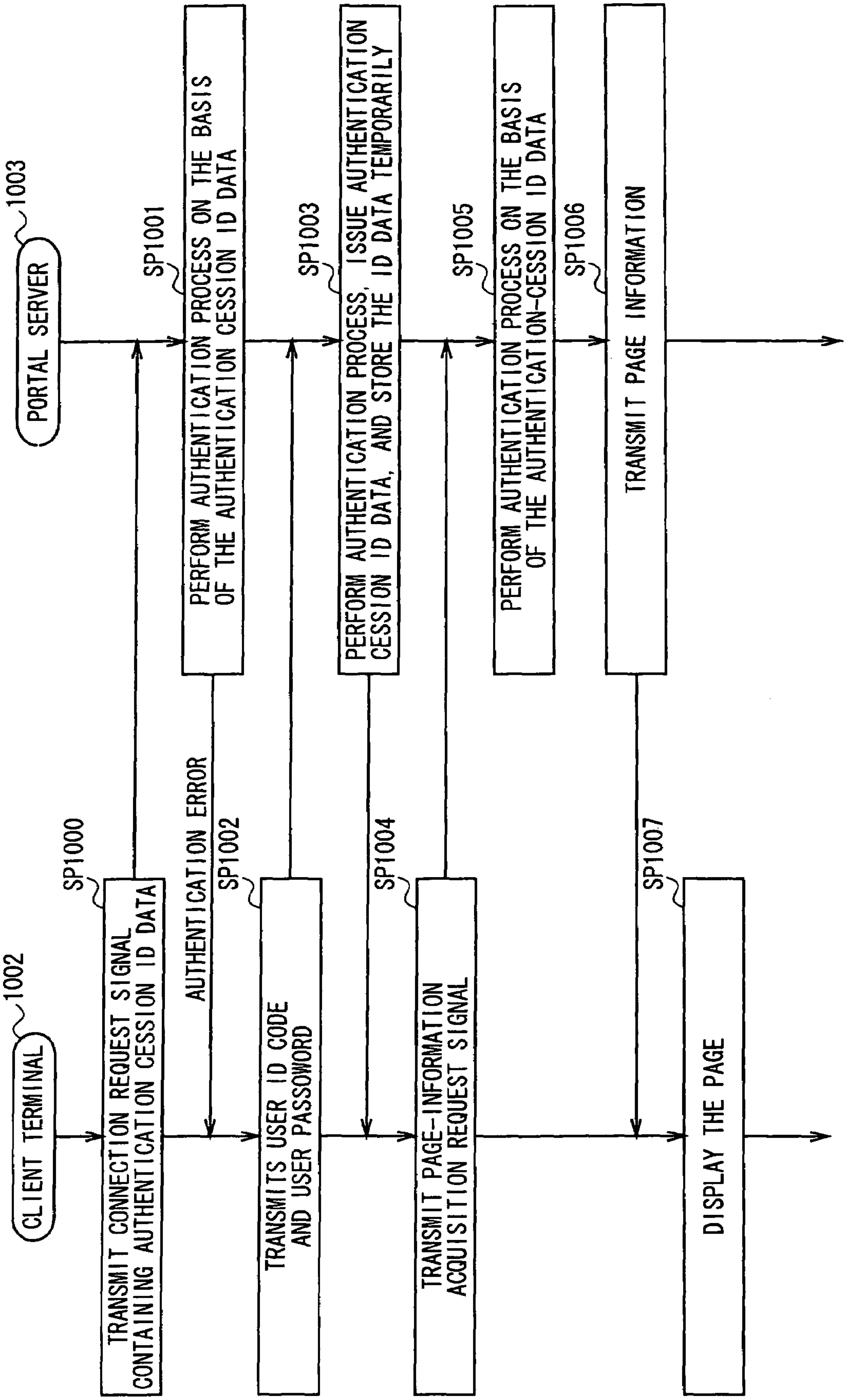
FIG. 17 is a sequence chart illustrating the sequence of authenticating the user, which is achieved between the client terminal and the portal server.

The user may be authenticated as illustrated in FIG. 17. That is, the client terminal 1002 may first acquire the page information from the portal server 1003 and then access the music-data distributing server 1004, physical-sales server 1005 and radio-broadcasting information distributing server 1006 by using the link contained in the page information. (Hereinafter, the method of authenticating the user will be called "indirect-access authentication process.")

The user may be authenticated by another method. In this method, the client terminal 1002 uses URL information and the like, which are registered as book marks. Thus, the client terminal 1002 directly accesses the music-data distributing server 1004, physical-sales server 1005 and radio-broadcasting information distributing server 1006, without acquiring the page information about the portal server 1003. (Hereinafter, this method of authenticating the user will be referred to as "direct-access authentication process").

In the indirect-access authentication process, the steps are performed in the same sequence, no matter whether the client terminal 1002 exchange data with the music-data distributing server 1004, physical-sales server 1005 or radio-broadcasting information distributing server 1006.

In the direct-access authentication process, too, the steps are carried out in the same sequence, whether the client terminal 1002 exchange data with the music-data distributing server 1004, physical-sales server 1005 or radio-broadcasting information distributing server 1006.

That is, the direct-access authentication process and the indirect-access authentication process are different only in the way in which the client terminal 1002 acquires the URL information it uses to access to the music-data distributing server 1004, physical-sales server 1005 or radio-broadcasting information distributing server 1006. In both processes, the steps are performed in the same order.

Therefore, the direct-access authentication process and the indirect-access authentication process will be explained hereinafter as one method of authenticating the user. For simplification of description, it will be described how the music-data distributing server 1004 is accessed in order to authenticate the user of the client terminal 1002.

First, in Step SP1010, the control unit 1023 of the client terminal 1002 transmits the service-cession ID data to the music-data distributing server 1004 through the communications control unit 1032 and the network interface 1033, in accordance with the URL information contained as a link in the page information or the URL information registered as book mark. The service-cession ID data is transmitted to the server 1004, together with a page-information acquisition request signal. This request signal requests for the page information about the music data distribution. (If the client terminal 1002 must access the physical-sales server 1005, the request signal will be one that requests for the page information about the package media for sale. If the client terminal 1002 must access the radio-broadcasting information distributing server 1006, the request signal will be one that requests for the page information about on-air list information.)

The service-cession ID data is identification data that the server (i.e., music-data distributing server 1004, physical-sales server 1005 or radio-broadcasting information distributing server 1006) accessed by the client terminal 1002 issues every time it communicates with the client terminal 1002 to perform any process such as the authentication of the user. Namely, the service-cession ID data identifies the communication connection condition (i.e., cession) between the client terminal 1002 and the server (i.e., music-data distributing server 1004, physical-sales server 1005 or radio-broadcasting information distributing server 1006).

Like the authentication-cession ID data described above, the service-cession ID data is valid for a predetermined term (e.g., about one minute), from the time the music-data distributing server 1004, physical-sales server 1005 or radio-broadcasting information distributing server 1006 issues it. This measure is taken to accomplish reliable user authentication.

Thus, the client terminal 1002 will be considered to have been disconnected from the music-data distributing server 1004, physical-sales server 1005 or radio-broadcasting information distributing server 1006 if it cannot give the service-cession ID data back to one of these servers within the validation term. In other words, the music-data distributing server 1004, physical-sales server 1005 or radio-broadcasting information distributing server 1006, which has issued the service-cession ID data, will regard the client terminal 1002 as having been disconnected unless it receives the ID data returned from the terminal 1002 within that validation term.

Hence, the music-data distributing server 1004, physical-sales server 1005 and radio-broadcasting information distributing server 1006 are prevented from being used by anyone who has not entered a contract with the provider that runs the service-providing system 1000 that offers service relating to music.

The authentication-information storage unit 1038 temporarily stores the service-cession ID data. Note that the service-cession ID data is the data that the music-data distributing server 1004, physical-sales server 1005 or radio-broadcasting information distributing server 1006 issued when it was connected to the client terminal 1002 in the past for user authentication or the like.

In Step SP1011, the control unit 1070 of the music-data distributing server 1004 receives the page-information acquisition request signal, the service-cession ID data and the like that have been transmitted from the client terminal 1002, first through the network interface 1073 and then through the communications control unit 1072. The control unit 1070 supplies the service-cession ID data and the like to the authentication-process unit 1075.

Controlled by the control unit 1070, the authentication-process unit 1075 compares the service-cession ID data and the like transmitted from the client terminal 1002, with the service-cession ID data and the like temporarily stored in the authentication-information storage unit 1077. Thus, the unit 1075 carries out the process of authenticating the user.

The authentication-process unit 1075 may not authenticate the user of the client terminal 1002 as a legal one, because the service-cession ID data received from the client terminal 1002 is no longer valid. In this case, the unit 1075 determines that the requests for the page information for distributing music data transmitted from the client terminal 1002 is an illegal one.

If the authentication-process unit 1075 does not authenticate the user of the terminal 1002 as a legal one, the control unit 1070 transmits authentication-error data and a shop code to the client terminal 1002, first through the communications control unit 1072 and then through the network interface 1073. The authentication-error data indicates that the user has not been authenticated. The shop code identifies the music-data distributing server 1004.

In Step SP1012, the control unit 1023 of the client terminal 1002 receives the authentication-error data and the shop code, both transmitted from the music-data distributing server 1004, first through the network interface 1033 and then through the communications control unit 1032. From the authentication-error data, the control unit 1023 determines that the user has not been authenticated in the music-data distributing server 1004. The authentication-information storage unit 1038 temporarily stores the shop code received from the music-data distributing server 1004.

The portal server 1003 generates an authentication-ticket issuance request signal, requesting for an authentication ticket that the client terminal 1002 will use to access the music-data distributing server 1004. The control unit 1023 transmits the authentication-ticket issuance request signal, along with the shop code of the server 1004, the authentication-cession ID data temporarily stored in the authentication-information storage unit 1038, and the like, to the portal server 1003, first through the communications control unit 1032 and then through the network interface 1033.

In Step SP1013, the control unit 1050 of the portal server 1003 receives the authentication-ticket issuance request signal, the shop code, the authentication-cession ID data, and the like, all transmitted from the client terminal 1002, through the network interface 1053 and the communications control unit 1052. The control unit 1050 supplies these data items to the authentication-process unit 1056.

Controlled by the control unit 1050, the authentication-process unit 1056 compares the authentication-cession ID data and the like, received from the client terminal 1002, with the authentication-cession ID data and the like, temporarily stored in the authentication-information storage unit 1057. Thus, the authentication-process unit 1056 carries out the process of authenticating the user.

The authentication-cession ID data transmitted from the client terminal 1002 may no longer be valid, the authentication-process unit 1056 cannot determine whether the user is a legal user of the client terminal 1002 or not. If this is the case, the authentication-process unit 1056 determines that the requests for issuing the authentication ticket from the client terminal 1002 is an illegal one.

The authentication-process unit 1056 may not authenticate the user of the client terminal 1002. In this case, the control unit 1050 generates authentication-error information indicating the user cannot be authenticated. The control unit 1050 transmits the authentication-error information to the client terminal 1002, first through the communications control unit 1052 and then through the network interface 1053.

The authentication-process unit 1056 may authenticate the user of the client terminal 1002. Then, it is determined that the authentication-cession ID data received from the client terminal 1002 remains valid. The user of the client terminal 1002 is authenticated as a legal one. The requests for issuing the authentication ticket transmitted from the client terminal 1002 is therefore considered to be a legal one.

If the authentication-process unit 1056 authenticates the user of the client terminal 1002, the control unit 1050 goes to Step SP1018.

In Step SP1014, the control unit 1023 of the client terminal 1002 receives the authentication-error information from the portal server 1003, first through the network interface 1033 and then through the communications control unit 1032. Then, the control unit 1023 reads the user ID code, the user password and the like, which are stored in the authentication-information storage unit 1038. The user ID code, the user password and the like are transmitted to the portal server 1003 through the communications control unit 1032 and the network interface 1033.

In Step SP1015, the control unit 1050 of the portal server 1003 receives the user ID code, the user password and the like from the client terminal 1002, through the network interface 1053 and the communications control unit 1052. The control unit 1050 supplies the user ID code, the user password and the like to the authentication-process unit 1056.

Controlled by the control unit 1050, the authentication-process unit 1056 performs the process of authenticating the user. More precisely, the unit 1056 determines whether the user ID code, the user password and the like it has received from the client terminal 1002 are contained in the client information that is registered in the client database unit 1054.

The authentication-process unit 1056 may determine that the user of the client terminal 1002 is a legal one. In this case, the unit 1056 issues authentication-cession ID data and the like, under the control of the control unit 1050. The authentication-cession ID data identifies the communication connection condition between the client terminal 1002 and the portal server 1003. The authentication-cession ID data and the like, thus issued for the client terminal 1002, are temporarily stored in the authentication-information storage unit 1057.

The control unit 1050 then transmits the authentication-cession ID data and the like, which have been issued for the client terminal 1002, to the client terminal 1002 by the authentication-process unit 1056, first through the communications control unit 1052 and then through the network interface 1053.

In Step SP1016, the control unit 1023 of the client terminal 1002 receives the authentication-cession ID data and the like from the portal server 1003, first through the network interface 1033 and then through the communications control unit 1032. The authentication-process unit 1037 writes the authentication-cession ID data and the like into the authentication-information storage unit 1038. The unit 1038 temporarily stores the authentication-cession ID data and the like.

The control unit 1023 generates an authentication-ticket issuance request signal, requesting that the portal server 1003 should issue an authentication ticket again. The authentication-ticket issuance request signal is transmitted to the portal server 1003 through the communications control unit 1032 and the network interface 1033, together with the shop code, the authentication-cession ID data, and the like, all temporarily stored in the authentication-information storage unit 1038.

In the present embodiment, the shop code is temporarily stored in the authentication-information storage unit 1038 of the client terminal 1002. Nonetheless, the shop code can be transferred between the client terminal 1002 and the portal server 1003 to perform Steps SP1012 to SP1016. Thus, the shop code can be transmitted to the portal server 1003 in Step SP1016, without the necessity of temporarily storing the shop code in the authentication-information storage unit 1038 of the client terminal 1002.

In Step SP1017, the control unit 1050 of the portal server 1003 receives the authentication-ticket issuance request signal, the shop code, the authentication-cession ID data, and the like, from the client terminal 1002, first through the network interface 1053 and then through the communications control unit 1052. The control unit 1050 supplies them to the authentication-process unit 1056.

Controlled by the control unit 1050, the authentication-process unit 1056 performs the process of authenticating the user. To be more specific, the unit 1056 compares the authentication-cession ID data and the like it has just received from the client terminal 1002, with the authentication-cession ID data and the like that are temporarily stored in the authentication-information storage unit 1057.

The authentication-process unit 1056 may authenticate the user as a legal user of the client terminal 1002 because the authentication-cession ID data and the like, received from the client terminal 1002, are still valid. If this is the case, the unit 1056 determines that the request for issuing the authentication ticket transmitted from the client terminal 1002 is justifiable.

When the authentication-process unit 1056 authenticates the user as a legal user of the client terminal 1002, the control unit 1050 goes to the next step, Step SP1018.

In Step SP1018, controlled by the control unit 1050, the authentication-process unit 1056 issues an authentication ticket and the like in accordance with the shop code and authentication-ticket issuance request signal it has received from the client terminal 1002 in Step SP1017. The authentication ticket and the like enable the client terminal 1002 to access the music-data distributing server 1004 indicated by the shop code.

Controlled by the control unit 1050, the authentication-process unit 1056 writes the authentication ticket and the like into the authentication-information storage unit 1057, thus temporarily storing them in this storage unit 1057. At the same time, the unit 1056 extends the validation term of the authentication-cession ID data and the like that have been issued to the client terminal 1002.

The control unit 1050 transmits the authentication ticket and the like to the client terminal 1002, first through the communications control unit 1052 and then through the network interface 1053 together with the authentication-cession ID data and the like, whose validation term has been extended by the authentication-process unit 1056.

In Step SP1019, the control unit 1023 of the client terminal 1002 receives the authentication ticket, the authentication-cession ID data, and the like, from the portal server 1003, first through the network interface 1033 and then through the communications control unit 1032. The control unit 1023 supplies the authentication-cession ID data to the authentication-process unit 1037.

The control unit 1023 transmits the authentication ticket and the like it has received from the portal server 1003, together with an authentication request signal, to the music-data distributing server 1004, through the communications control unit 1032 and the network interface 1033.

Controlled by the control unit 1023, the authentication-process unit 1037 writes the authentication-cession ID data and the like which have been transmitted from the portal server 1003 and whose validation term has been extended, over the authentication-cession ID data and the like that are stored in the authentication-information storage unit 1038. In other words, the authentication-process unit 1037 updates, in the storage unit 1038, the authentication-cession ID data and the like temporarily stored in Step SP1016 to those the validation term of which has been extended.

In Step SP1020, the control unit 1070 of the music-data distributing server 1004 receives the authentication request signal, the authentication ticket, and the like, from the client terminal 1002, first through the network interface 1073 and then through the communications control unit 1072.

The control unit 1070 transmits the authentication ticket, and the like received from the client terminal 1002 to the portal server 1003 through the communication control unit 1072 and the network interface 1073, together with an authentication-ticket confirmation request signal requesting the confirmation of the authentication ticket.

In Step SP1021, the control unit 1050 of the portal server 1003 receives the authentication-ticket confirmation request signal, the authentication ticket and the like from the music-data distributing server 1004, first through the network interface 1053 and then through the communications control unit 1052. The control unit 1050 supplies the authentication-ticket confirmation request signal, the authentication ticket and the like to the authentication-process unit 1056.

Controlled by the control unit 1050, the authentication-process unit 1056 performs the process of confirming the authentication ticket transmitted from the music-data distributing server 1004, in response to the authentication-ticket confirmation request signal. More correctly, the unit 1056 compares the authentication ticket and the like it has received from the music-data distributing server 1004, with the authentication ticket and the like, which are stored in the authentication-information storage unit 1057.

The authentication-process unit 1056 may confirm that the authentication ticket and the like, which have been received from the music-data distributing server 1004, is a legal one. In this case, the control unit 1050 generates confirmation-result information indicating that the authentication ticket is a legal one. The confirmation-result information is transmitted to the music-data distributing server 1004, first through the communications control unit 1052 and then through the network interface 1053.

In Step SP1022, the control unit 1070 of the music-data distributing server 1004 receives the confirmation-result information from the portal server 1003, first through the network interface 1073 and then through the communications control unit 1072. The control unit 1070 supplies the confirmation-result information to the authentication-process unit 1075.

Controlled by the control unit 1070, the authentication-process unit 1075 issues a service-cession ID data and the like in response to the confirmation-result information. The service-cession ID data identifies the communication connection condition between the client terminal 1002 and the music-data distributing server 1004 as server-authentication result information. The authentication-process unit 1075 writes the service-cession ID data and the like into the authentication-information storage unit 1077, thus temporarily storing them in the authentication-information storage unit 1077.

Further, the control unit 1070 transmits the service-cession ID data and the like issued by the authentication-process unit 1075 to the client terminal 1002 through the communications control unit 1072 and the network interface 1073. Note that the service-cession ID data and the like have been issued for the client terminal 1002.

In Step SP1023, the control unit 1023 of the client terminal 1002 receives the service-cession ID data and the like from the music-data distributing server 1004, first through the network interface 1033 and then through the communications control unit 1032. The authentication-process unit 1037 writes the service-cession ID data and the like into the authentication-information storage unit 1038, temporarily storing them in the storage unit 1038.

The control unit 1023 then receives a page-information acquisition request signal from the music-data distributing server 1004. The page-information acquisition request signal requests for page information that will be used to have music-data distributed from the music-data distributing server 1004. The control unit 1023 transmits the page-information acquisition request signal to the music-data distributing server 1004 through the communication control unit 1032 and the network interface 1033, together with the service-cession ID data and the like which are temporarily stored in the authentication-information storage unit 1038.

In Step SP1024, the control unit 1070 of the music-data distributing server 1004 receives the page-information acquisition request signal, the service-cession ID data and the like from the client terminal 1002, first through the network interface 1073 and then through the communications control unit 1072. The control unit 1070 then supplies the service-cession ID data and the like to the authentication-process unit 1075.

Controlled by the control unit 1070, the authentication-process unit 1075 compares the service-cession ID data and the like received from the client terminal 2002 with the service-cession ID data and the like that have been issued for the client terminal 1002 in Step SP1022 and temporarily stored into the authentication-information storage unit 1077. Thus, the control unit 1070 performs the process of authenticating the user.

The authentication-process unit 1075 may authenticate the user as a legal user of the client terminal 1002 because the service-cession ID data and the like received from the client terminal 1002 are still valid. If this is the case, the unit 1075 determines that the request for acquiring the page information that has been transmitted from the client terminal 1002 and will be used to distribute music data is justifiable.

When the authentication-process unit 1075 authenticates the user of the client terminal 1002 is a legal one, the control unit 1070 goes to the next step, Step SP1025.

In Step SP1025, the control unit 1070 reads the page information from the page-information storage unit 1076, so that music data may be distributed to the user. Further, the control unit 1070 causes the authentication-process unit 1075 to extend the validation term of the service-cession ID data and the like issued to the client terminal 1002.

Then, the control unit 1070 transmits the page information for use in distributing music data from the page-information storage unit 1076, to the client terminal 1002 through the communications control unit 1072 and the network interface 1073. The page information is transmitted to the client terminal 1002, together with the service-cession ID data and the like whose validation term has been extended by the authentication-process unit 1075.

In Step SP1026, the control unit 1023 of the client terminal 1002 receives, through the network interface 1033 and communications control unit 1032, the page information for use in distributing music data transmitted from the music-data distributing server 1004 and also the service-cession ID data and the like whose validation term has been extended. The control unit 1023 supplies the page information for use in distributing music data, to the page-information generating unit 1036. At the same time, the control unit 1023 transmits the service-cession ID data and the like to the authentication-process unit 1037. Note that the service-cession ID data and the like have been received from the music-data distributing server 1004.

Controlled by the control unit 1023, the authentication-process unit 1037 writes the service-cession ID data and the like which have been transmitted from the music-data distributing server 1004 and whose validation term has been extended, over the service-cession ID data and the like that are stored in the authentication-information storage unit 1038. In other words, the authentication-process unit 1037 updates, in the storage unit 1038, the service-cession ID data and the like temporarily stored in above-described Step SP1023 to those the validation term of which has been extended.

The page-information generating unit 1036 generates video data from the page information for use in distributing music data. The video data thus generated is supplied to the display control unit 1024.

The display control unit 1024 performs digital-to-analog conversion on the video data supplied from the page-information generating unit 1036, generating an analog video signal. The analog video signal is supplied to the display unit 1025. The display unit 1025 displays a music-data distributing page that is represented by the analog video signal.

(3-7-3) Process of Providing the Music-Related Service

As described above with reference to FIG. 18, the process of authenticating the user is achieved between the client terminal 1002, on the one hand, and the music-data distributing server 1004, physical-sales server 1005 and radio-broadcasting information distributing server 1006, on the other hand. This process is followed by the process of providing a music-related service. In the process of providing a music-related service, the client terminal 1002 receives the music-data distributing service, the physical sales service, and the radio-broadcasting information distribution service, by using the page information for distribution of music data, the page information for selling package media and the page information for distributing on-air list information that the client terminal 1002 has acquired from the music-data distributing server 1004, physical-sales server 1005 and radio-broadcasting information distributing server 1006, respectively. The process of providing a music-related service will be explained, with reference to FIGS. 19 to 22.

(3-7-3-1) Sequence of Process of Providing the Music-Data Distributing Service

Figure 19:
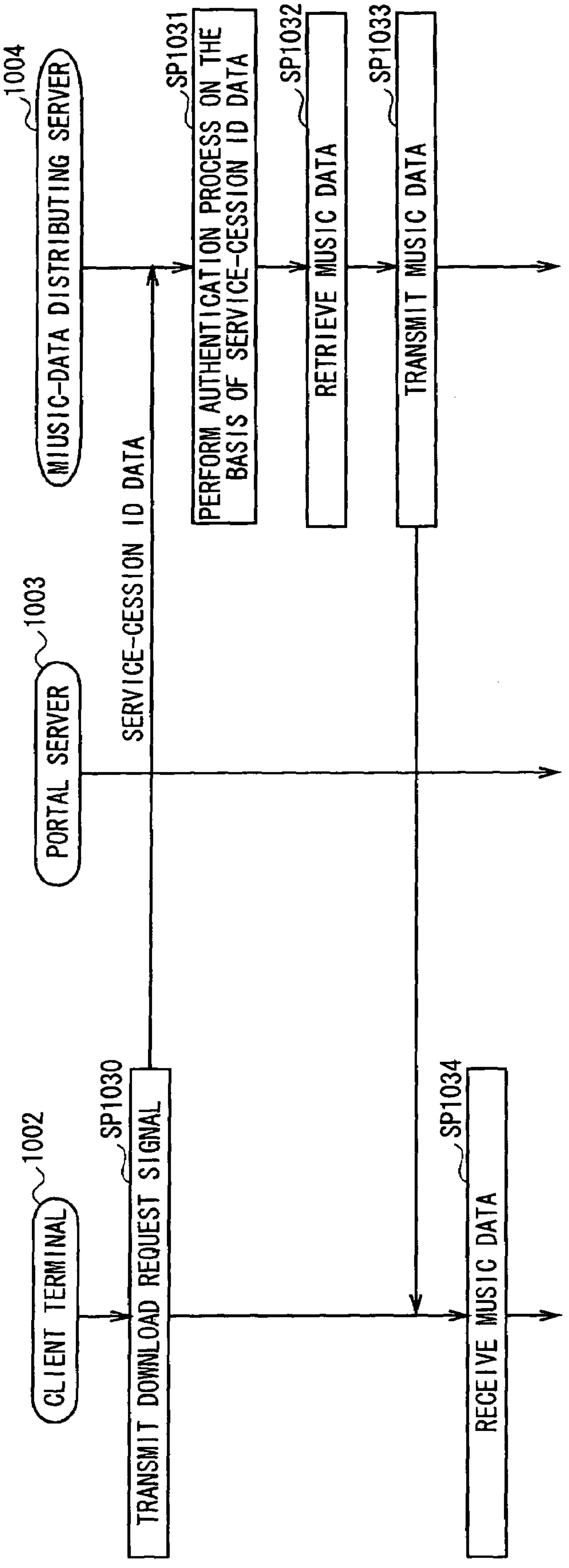
FIG. 19 is a sequence-chart representing the sequence of the service of providing the music data distributing service.

With reference to FIG. 19, the music-data distributing service will be described first, in which the client terminal 1002 receives music data distributed from the music-data distributing server 1004.

In Step SP1030, the control unit 1023 of the client terminal 1002 receives a control command input at the input-processing unit 1021 to select a part of the music-data distributing page displayed by the display unit 1025. In response to the control command, the control unit 1023 generates a download request signal that requests for the downloading of the music data the user wants.

The control unit 1023 transmits the download request signal to the music-data distributing server 1004 through the communication control unit 1032 and network interface 1033, together with the service-cession ID data and the like, which have been issued by the music-data distributing server 1004 and which are temporarily stored in the authentication-information storage unit 1038.

In Step SP1031, the control unit 1070 of the music-data distributing server 1004 receives the download request signal, the service-cession ID data and the like from the client terminal 1002, first through the network interface 1073 and then through the communications control unit 1072. The control unit 1070 supplies the service-cession ID data and the like to the authentication-process unit 1075.

Controlled by the control unit 1070, the authentication-process unit 1075 compares the service-cession ID data and the like, which have been transmitted from the client terminal 1002, with the service-cession ID data and the like that are temporarily stored in the authentication-information storage unit 1077. Thus, the authentication-process unit 1075 carries out the process of authenticating the user.

The authentication-process unit 1075 may determine that the user who has operated the client terminal 1002, demanding that the music data be downloaded into the client terminal 1002, is a legal user. In this case, the control unit 1070 goes to the next step, Step SP1032.

In Step SP1032, the retrieval unit 1079 retrieves the music data item the user desires, from the music data items that are stored in the music-data storage unit 1078, in accordance with the retrieval key contained in the download request signal. It should be noted that the music data item retrieved accords with the retrieval condition the retrieval key describes.

When the retrieval unit 1079 retrieves the music data item the user desires, the control unit 1070 causes the authentication-process unit 1075 to extend the validation term of the service-cession ID data and the like issued to the client terminal 1002. The control unit 1070 then goes to the next step, i.e., Step SP1033.

In Step SP1033, the control unit 1070 reads from the music-data storage unit 1078 the music data that has been retrieved by the retrieval unit 1079 and that should be downloaded into the client terminal 1002. Further, the control unit 1070 transmits the music data thus read from the storage unit 1078 to the client terminal 1002, first through the communications control unit 1072 and then through the network interface 1073, along with the service-cession ID data and the like whose validation term has been extended by the authentication-process unit 1075.

In Step SP1034, the control unit 1023 of the client terminal 1002 receives the music data from the music-data distributing server 1004, together with the service-cession ID data and the like whose validation term has been extended, first through the network interface 1033 and then through the communications control unit 1032. The control unit 1023 writes the music data into the storage medium 1029. At the same time, the control unit 1023 supplies the service-cession ID data and the like, which have been received from the music-data distributing server 1004, to the authentication-process unit 1037.

Controlled by the control unit 1023, the authentication-process unit 1037 writes the service-cession ID data and the like which have been transmitted from the music-data distributing server 1004 and whose validation term has been extended, over the service-cession ID data and the like that are stored in the authentication-information storage unit 1038. The authentication-process unit 1037 therefore updates, in the storage unit 1038, the service-cession ID data and the like to those the validation term of which has been extended.

Thus, the client terminal 1002 can download the music data desired by the user, utilizing the music-data distributing service the music-data distributing server 1004 provides.

(3-7-3-2) Sequence of Process of Providing the Physical Sales Service

Figure 20:
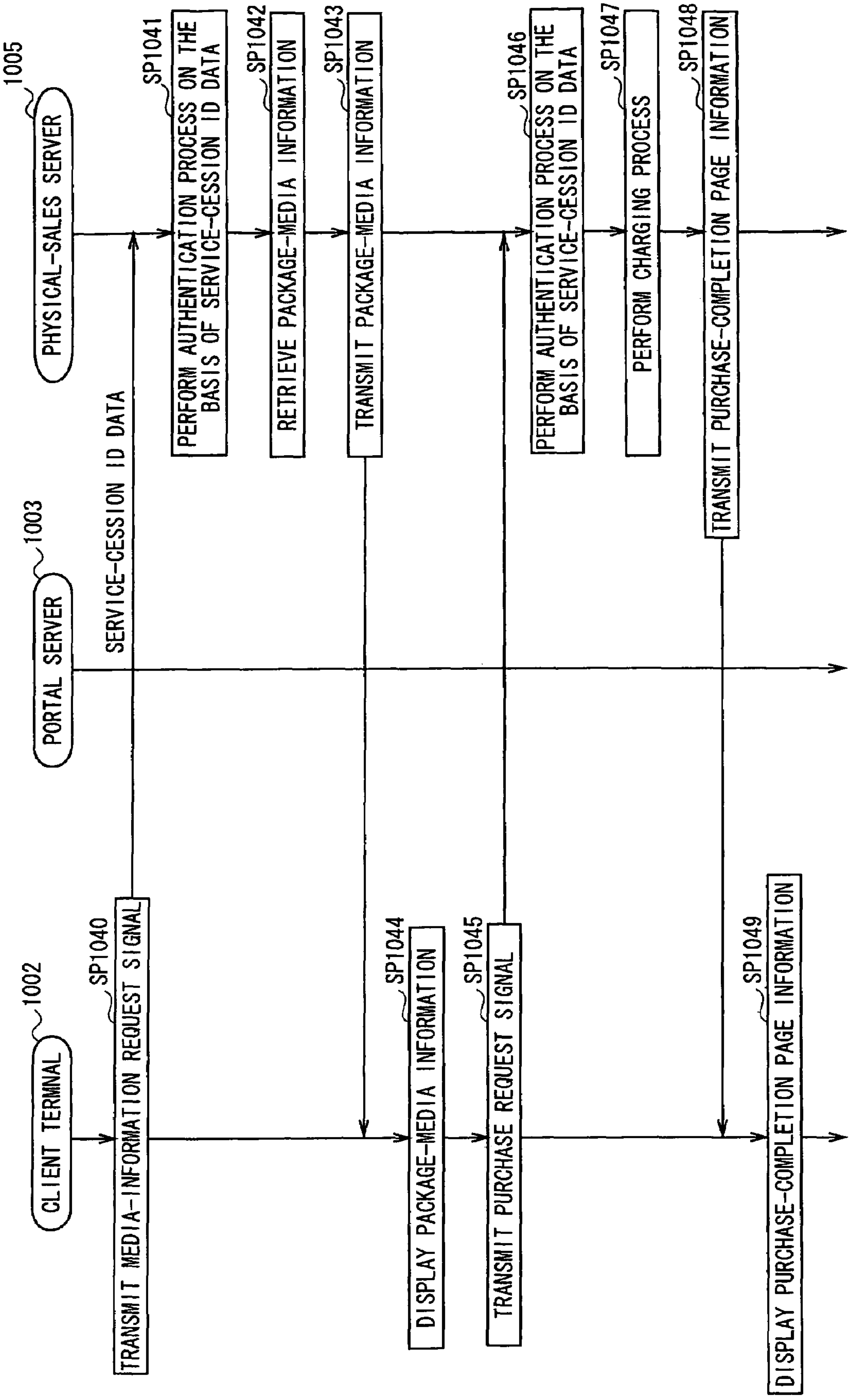
FIG. 20 is a sequence chart representing the sequence of the service of providing the physical-sales service.

The sequence of providing the physical sales service will be described, in which the client terminal 1002 receives a physical sales service from the physical-sales server 1005, with reference to FIG. 20.

In Step SP1040, the control unit 1023 of the client terminal 1002 receives a control command input at the input-processing unit 1021 to select a part of the package-media sales page displayed by the display unit 1025. In response to the control command, the control unit 1023 generates a media-information request signal that requests for the package-media information about the package medium designated by the control command input.

The control unit 1023 transmits the media-information request signal to the physical-sales server 1005 through the communication control unit 1032 and network interface 1033, together with the service-cession ID data and the like, which have been issued by the physical-sales server 1005 and which are temporarily stored in the authentication-information storage unit 1038.

In Step SP1041, the control unit 1090 of the physical-sales server 1005 receives the media-information request signal, the service-cession ID data and the like from the client terminal 1002, first through the network interface 1093 and then through the communications control unit 1092. The control unit 1090 supplies the thus received service-cession ID data and the like to the authentication-process unit 1095.

Controlled by the control unit 1090, the authentication-process unit 1095 compares the service-cession ID data and the like, which have been transmitted from the client terminal 1002, with the service-cession ID data and the like that are temporarily stored in the authentication-information storage unit 1097. Thus, the authentication-process unit 1095 carries out the process of authenticating the user.

The authentication-process unit 1095 may determine that the user who has operated the client terminal 1002, demanding that the package-media information be downloaded into the client terminal 1002, is a legal user. In this case, the control unit 1090 goes to the next step, Step SP1042.

In Step SP1042, the retrieval unit 1099 retrieves one of the package-media information item the user desires, from the package-media information item the package-media-information storage unit 1098, in accordance with the retrieval key contained in the media-information request signal. It should be noted that the package-media information item retrieved accords with the retrieval condition the retrieval key describes.

When the retrieval unit 1099 retrieves the package-media information item the user desires, the control unit 1090 causes the authentication-process unit 1095 to extend the validation term of the service-cession ID data and the like issued to the client terminal 1002. The control unit 1090 then goes to the next step, i.e., Step SP1043.

In Step SP1043, the control unit 1090 reads from the package-media-information storage unit 1098 the package-media information item that has been retrieved by the retrieval unit 1099. Further, the control unit 1090 transmits the package-media information item thus read from the storage unit 1098 to the client terminal 1002, first through the communications control unit 1092 and then through the network interface 1093, along with the service-cession ID data and the like whose validation term has been extended by the authentication-process unit 1095.

In Step SP1044, the control unit 1023 of the client terminal 1002 receives the package-media information from the physical-sales server 1005, together with the service-cession ID data and the like whose validation term has been extended, first through the network interface 1033 and then through the communications control unit 1032. The control unit 1023 supplies the thus received package-media information to the page-information generating unit 1036. Further, the control unit 1023 supplies the service-cession ID data and the like, which have been received from the physical-sales server 1005, to the authentication-process unit 1037.

Controlled by the control unit 1023, the authentication-process unit 1037 writes the service-cession ID data and the like which have been transmitted from the physical-sales server 1005 and whose validation term has been extended, over the service-cession ID data and the like that are stored in the authentication-information storage unit 1038. Therefore, the authentication-process unit 1037 updates, in the storage unit 1038, the service-cession ID data and the like to those the validation term of which has been extended.

The page-information generating unit 1036 generates video data from the package-media information supplied to it from the control unit 1023. The generated video data is supplied to the display control unit 1024. The display control unit 1024 converts the video data, generating an analog video signal. The analog video signal is supplied to the display unit 1025.

Thus, the control unit 1023 causes the display unit 1025 to display package-media information that is represented by the analog video signal. Then, the control unit 1023 goes to the next step, i.e., Step SP1045.

In Step SP1045, the control unit 1023 receives a control command input at the input-processing unit 1021, to buy the package medium identified by the package-media information displayed by the display unit 1025. In response to the control command, the control unit 1023 generates a purchase request signal that requests for buying the package medium identified by the package-media information.

The control unit 1023 transmits the purchase request signal to the physical-sales server 1005, first through the communication control unit 1032 and then through the network interface 1033, together with the service-cession ID data and the like which has been transmitted from the physical-sales server 1005, which is temporarily stored in the authentication-information storage unit 1038 and the validation term of which has been extended.

In Step SP1046, the control unit 1090 of the physical-sales server 1005 receives the purchase request signal, the service-cession ID data and the like from the client terminal 1002, first through the network interface 1093 and then through the communication control unit 1092. The control unit 1090 supplies the service-cession ID data and the like to the authentication-process unit 1095.

Controlled by the control unit 1090, the authentication-process unit 1095 compares the service-cession ID data and the like, which have been transmitted from the client terminal 1002, with the service-cession ID data and the like that are temporarily stored in the authentication-information storage unit 1097. Thus, the authentication-process unit 1095 carries out the process of authenticating the user of the client terminal 1002.

The authentication-process unit 1095 may determine that the user who has operated the client terminal 1002, demanding that the package-media information be downloaded into the terminal 1002, is a legal user. In this case, the control unit 1090 goes to the next step, Step SP1047.

In Step SP1047, the control unit 1090 transmits charge information to the charging server 1008, first though the communications control unit 1092 and then through the network interface 1093. The charge information will be used to deliver the package medium to the user of the client terminal 1002 and to charge the amount for the package medium the use is to buy. Upon receipt of the charge information, the charging server 1008 performs the process of charging the user for the purchase of the package media.

Further, the control unit 1090 causes the authentication-process unit 1095 to extend the validation term of the service-cession ID data and the like, which have been issued to the client terminal 1002.

In Step SP1048, the control unit 1090 generates purchase-completion page information and transmits the same to the client terminal 1002, first through the communication control unit 1092 and then through the network interface 1093, together with the service-cession ID data and like whose validation term has been extended by the authentication-process unit 1095. It should be noted that the purchase-completion page information shows that the user has bought the package medium.

In Step SP1049, the control unit 1023 of the client terminal 1002 receives the purchase-completion page information from the physical-sales server 1005, first through the network interface 1033 and then through the communications control unit 1092, together with the service-cession ID data and the like whose validation term has been extended. The control unit 1023 supplies the purchase-completion page information to the page-information generating unit 1036. At the same time, the control unit 1023 supplies the service-cession ID data and the like transmitted from the physical-sales server 1005 to the authentication-process unit 1037.

Controlled by the control unit 1023, the authentication-process unit 1037 writes the service-cession ID data and the like which have been transmitted from the physical-sales server 1005 and whose validation term has been extended, over the service-cession ID data and the like whose validation term has not been extended, and that are stored in the authentication-information storage unit 1038. Namely, the authentication-process unit 1037 updates, in the storage unit 1038, the service-cession ID data and the like to those the validation term of which has been extended.

The page-information generating unit 1036 generates video data from the purchase-completion page information received from the control unit 1023. The video data thus generated is supplied to the display control unit 1024. The display control unit 1024 performs digital-to-analog conversion on the video data, generating an analog video signal. The analog video signal is supplied to the display unit 1025.

The control unit 1023 causes the display unit 1025 to display the purchase-completion page that is represented by the analog video signal.

Thus, the client terminal 1002 utilizes the physical-sales service of the physical-sales server 1005, enabling the user to purchase any package media that he or she wants.

Figure 21:
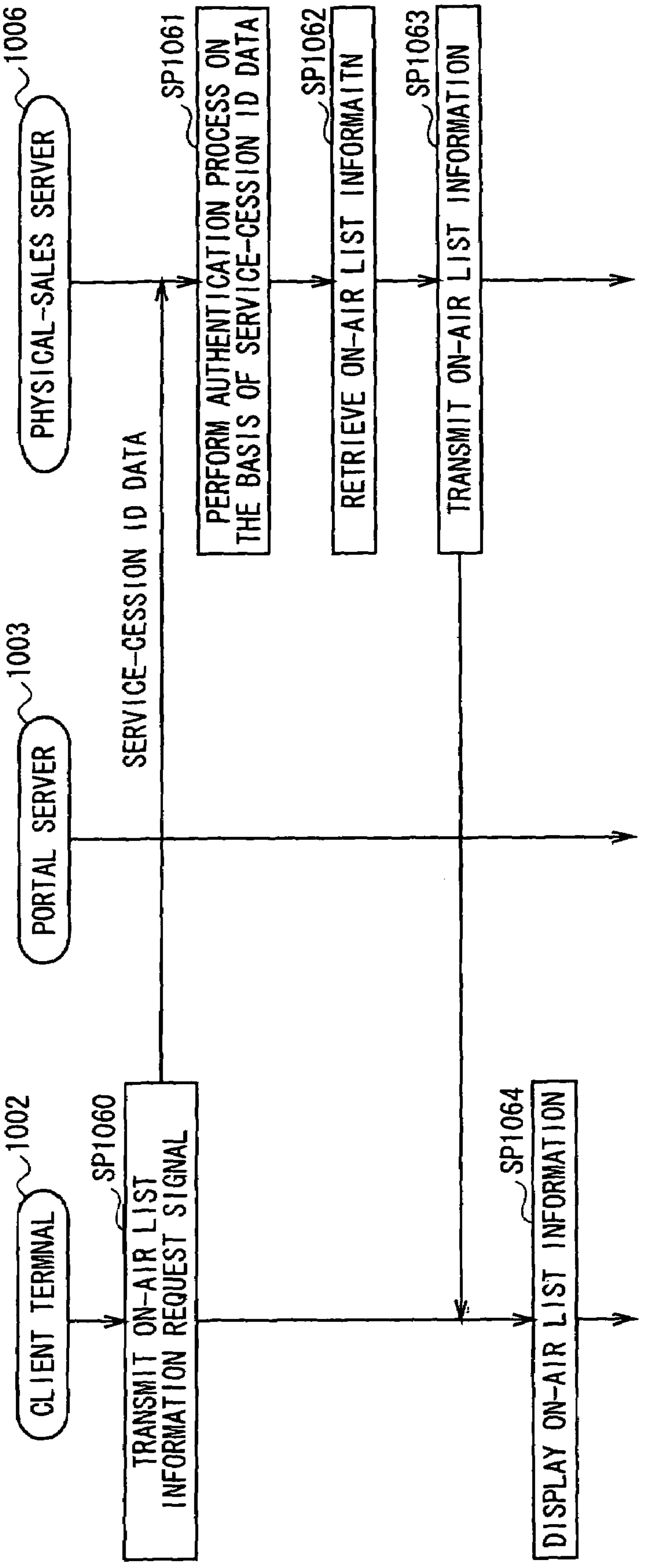
FIG. 21 is a sequence chart representing the sequence (1) of the service of providing the radio-broadcasting information (on-air list information)

(3-7-3-3) Sequence of Process of Providing the On-Air List Information Distributing Service The sequence of process of providing the radio-broadcasting information distributing service will be described with reference to FIG. 21, in which the client terminal 1002 receives on-air list information distributing service, as radio broadcasting information distributing service provided by the radio-broadcasting information distributing server 1006.

In Step SP1060, the control unit 1023 of the client terminal 1002 generates an on-air list information request signal that requests the desired on-air list information be downloaded into the client terminal 1002. The control unit 1023 generates this request signal in response to a control command input at the input-processing unit 1021 when a retrieval key is input in the input box on the page of on-air list information retrieval, which is displayed by the display unit 1025 and the control command corresponding to a character string showing the input retrieval key is then input.

The control unit 1023 transmits the on-air list information request signal to the radio-broadcasting information distributing server 1006, first through the communications control unit 1032 and then through the network interface 1033, together with the service-cession ID data and the like. It should be noted that the service-cession ID data and the like have been issued by the radio-broadcasting information distributing server 1006 and are temporarily stored in the authentication-information storage unit 1038.

In Step SP1061, the control unit 1110 of the radio-broadcasting information distributing server 1006 receives the on-air list information request signal, the service-cession ID data and the like from the client terminal 1002, first through the network interface 1113 and then through the communications control unit 1112. The control unit 1110 supplies the service-cession ID data and the like thus received to the authentication-process unit 1115.

Controlled by the control unit 1110, the authentication-process unit 1115 compares the service-cession ID data and the like received from the client terminal 1002, with the service-cession ID data and the like that are temporarily stored in the authentication-information storage unit 1120. Thus, the authentication-process unit 1115 performs the process of authenticating the user of the client terminal 1002.

The authentication-process unit 1115 may determine that the user who has operated the client terminal 1002 to request for the on-air list information is a legal one. In this case, the control unit 1110 goes to the next step, i.e., Step SP1062.

In Step SP1062, the retrieval unit 1118 retrieves, from the on-air list information storage unit 1117, that part of the on-air list information which meets the retrieval condition defined by the retrieval key contained in the on-air list information request signal.

When the retrieval unit 1118 retrieves said part of the on-air list information, the control unit 1110 causes the authentication-process unit 1115 to extend the validation term of the service-cession ID data and the like that have been issued to the client terminal 1002. The control unit 1110 then goes to the next step, i.e., Step SP1063.

In Step SP1063, the control unit 1110 reads the on-air list information retrieved by the retrieval unit 1118, from the on-air list information storage unit 1117. The control unit 1110 then supplies the on-air list information to the client terminal 1002, first through the communication control unit 1112 and then through the network interface 1113, along with the service-cession ID data and the like whose validation term has been extended by the authentication-process unit 1115.

In Step SP1064, the control unit 1023 of the client terminal 1002 receives the on-air list information from the radio-broadcasting information distributing server 1006, first through the network interface 1033 and then through the communications control unit 1032, together with the service-cession ID data and the like whose validation term has been extended. The control unit 1023 transmits the on-air list information to the page-information generating unit 1036. At the same time, the control unit 1023 transmits the service-cession ID data and the like received from the radio-broadcasting information distributing server 1006, to the authentication-process unit 1037.

Controlled by the control unit 1023, the authentication-process unit 1037 writes the service-cession ID data and the like which have been transmitted from the radio-broadcasting information distributing server 1006 and whose validation term has been extended, over the service-cession ID data and the like that are stored in the authentication-information storage unit 1038. That is, the authentication-process unit 1037 updates, in the storage unit 1038, the service-cession ID data and the like to those the validation term of which has been extended.

The page-information generating unit 1036 generates video data from the on-air list information supplied to it from the control unit 1023. The video data thus generated is supplied to the display control unit 1024. The display control unit 1024 performs digital-to-analog conversion on the video data, generating an analog video signal. The analog video signal is supplied to the display unit 1025. The display unit 1025 displays the on-air list information represented by the analog video signal.

Thus, the client terminal 1002 utilizes the radio-broadcasting information distributing service provided by the radio-broadcasting information distributing server 1006, enabling the user to obtain any on-air list information he or she wants.

Figure 22:
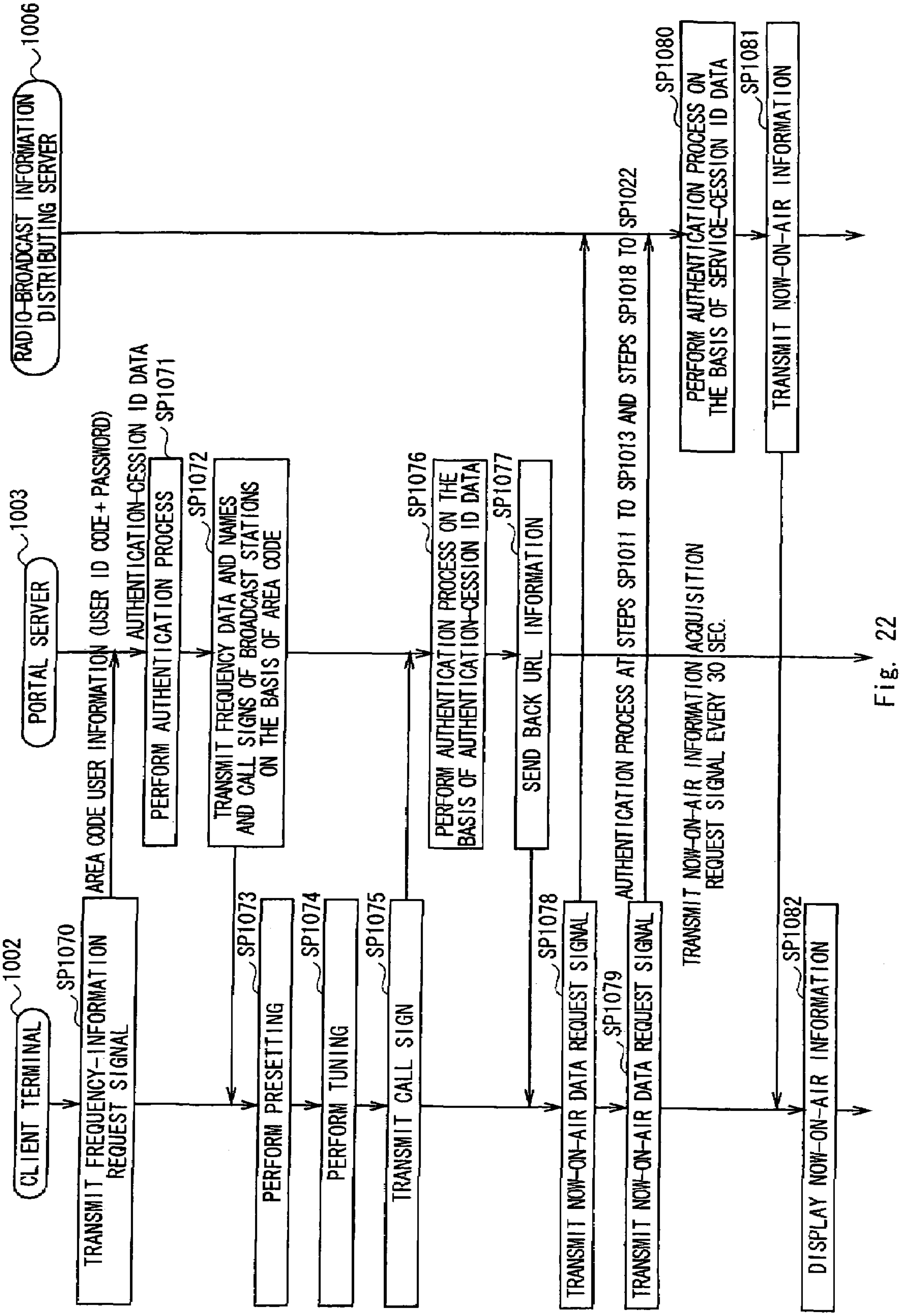
FIG. 22 is a sequence chart representing the sequence (2) of the service of providing the radio-broadcasting information (now-on-air information).

(3-7-3-4) Sequence of Process of Providing the Now-On-Air Information Distributing Service The sequence of process of providing the radio-broadcasting information distributing service will be described with reference to FIG. 22, in which the client-terminal 1002 receives now-on-air information distributing service, as radio-broadcasting information distributing service distributed from the radio-broadcasting information distributing server 1006.

The radio-broadcasting information distributing server 1006 that provides now-on-air information is installed in each radio station (that is, for each call sign).

In the initial state, the client terminal 1002 may not store the URL information about the radio-broadcasting information distributing server 1006 of each radio station.

Therefore, the sequence of the radio-broadcasting information distributing service providing process will be described on the assumption that the portal server 1003 manages the URL information about the radio-broadcasting information distributing server 1006 of each radio station, in association with the call sign of the radio station.

It is also assumed that, in the sequence of the radio-broadcasting information distributing service providing process, the authentication-information storage unit 1038 does not store the authentication-cession ID data or the like when the client terminal 1002 requests that the portal server 1003 should give it the broadcast frequency information so that it may automatically preset the broadcast frequency of each radio station. Hence, the client terminal 1002 first transmits the user ID code, the user password and the like to the portal server 1003.

In Step SP1070, the control unit 1023 of the client terminal 1002 receives an operation command that the user has input at the input-processing unit 1021 to automatically preset the broadcast frequency of each radio station. In response to the operation command, the control unit 1023 transmits a frequency-information request signal to the portal server 1003, first through the communications control unit 1032 and then through the network interface 1033. The frequency-information request signal, which requests for the frequency information representing the broadcast frequency of the radio station, is transmitted together with the area code input by the user and the user ID codes, the user password, and the like stored in the authentication-information storage unit 1038.

In Step SP1071, the control unit 1050 of the portal server 1003 receives the frequency-information request signal, the area code, the user ID code, the user password and the like, all transmitted from the client terminal 1002, first through the network interface 1053 and then through the communications control unit 1052. The control unit 1050 supplies the user ID code, the user password and the like, which have been received from the client terminal 1002, to the authentication-process unit 1056.

Controlled by the control unit 1050, the authentication-process unit 1056 compares the user ID code, the user password and the like, all received from the client terminal 1002, with the client information that is registered in the client database unit 1054. The unit 1056 thus carries out the process of authenticating the user of the client terminal 1002.

The authentication-process unit 1056 may determine that the user of the client terminal 1002 is a legal one. Then, the unit 1056 determines that the frequency-information request signal transmitted from the client terminal 1002 is justifiable. In this case, under the control of the control unit 1050, the unit 1056 issues an authentication-cession ID data and the like, which identifies the communication condition between the client terminal 1002 and the portal server 1003. The authentication-cession ID data and the like, thus issued, are temporarily stored in the authentication-information storage unit 1057.

When the authentication-process unit 1056 determines that the user of the client terminal 1002 is a legal one, the control unit 1050 goes to the next step, i.e., Step SP1072.

In Step SP1072, the control unit 1050 extracts the frequency data item, radio-station name and call sign, which correspond to the area code, from the frequency data items, radio-station names and call signs, which are stored in the frequency-information unit 1058 in the form of a list, in accordance with the area code received from the client terminal 1002. Namely, the control unit 1050 retrieves the frequency data item, the radio-station name and the call sign, in the form of a list.

The control unit 1050 transmits the list of frequency data items, radio-station names and call signs, which have been read from the frequency-information storage unit 1058, to the client terminal 1002, first through the communications control unit 1052 and then through the network interface 1053. The list is transmitted to the client terminal 1002, together with the authentication-cession ID data and the like that the authentication-process unit 1056 has issued in Step SP1071 to the client terminal 1002.

In Step SP1073, the control unit 1023 of the client terminal 1002 receives the frequency data items, the names of radio stations, the call-sign list, the authentication-cession ID data, and the like from the portal server 1003, first through the network interface 1033 and then through the communications control unit 1032. The control unit 1023 supplies the authentication-cession ID data and the like received from the portal server 1003, to the authentication-process unit 1037. Further, the control unit 1023 supplies the frequency data items, the names of radio stations, and the call-sign list, received also from the client terminal 1002, to the display control unit 1024.

Controlled by the control unit 1023, the authentication-process unit 1037 writes the authentication-cession ID data and the like transmitted from the portal server 1003 into the authentication-information storage unit 1038. Thus, the storage unit 1038 temporarily stores the authentication-cession ID data and the like.

The display control unit 1024 supplies the frequency data items, the names of radio stations, and the call-sign list, all received from the control unit 1023, to the display unit 1025. The display unit 1025 thus displays the list of the frequency data items, radio-station names and call signs.

When a selection command is input at the input-processing unit 1021, the control unit 1023 writes the frequency information item, radio-station name and call sign, which are selected by the user, into the storage medium 1029, thus presetting these values. Then, the control unit 1023 goes to the next step, i.e., Step SP1074.

In Step SP1074, the control unit 1023 controls the tuner unit 1031 in accordance with the turning-control command input at the input-processing unit 1021. That is, the control unit 1023 causes the tuner unit 1031 to extract, from the radio broadcast waves, the radio signal broadcast at the broadcast frequency that corresponds to the turning-control command.

The tuner unit 1031 extracts the radio signal broadcast at the broadcast frequency, from the radio broadcast waves received by the broadcast-signal receiving unit 1030 and decodes the radio signal broadcast at that frequency, generating audio data. The audio data thus obtained is supplied to the audio-data control unit 1026.

The audio-data control unit 1026 converts the audio data supplied from the tuner unit 1031, to an analog audio signal. The analog audio signal is supplied to the speaker 1027. The speaker 1027 generates sound from the analog audio signal. The user can therefore listen to the radio program he or she has selected.

In Step SP1075, the radio-broadcast display control unit 1039 is controlled by the control unit 1023, reading the call sign stored in the storage medium 1029 and associated with the frequency information representing the broadcast frequency that corresponds to the tuning-control command. The radio-broadcast display control unit 1039 transmits the call sign to the portal server 1003, together with the authentication-cession ID data and the like that are temporarily stored in the storage unit 1038, first through the communications control unit 1032 and then through the network interface 1033.

In Step SP1076, the control unit 1050 of the portal server 1003 receives the call sign, the authentication-cession ID data, and the like, transmitted from the client terminal 1002, first through the network interface 1053 and then through the communications control unit 1052. The control unit 1050 then supplies the received authentication-cession ID data and the like to the authentication-process unit 1056.

Controlled by the control unit 1050, the authentication-process unit 1056 compares the authentication-cession ID data and the like received from the client terminal 1002, with the authentication-cession ID data and the like that are temporarily stored in the authentication-information storage unit

1057. Thus, the authentication-process unit 1056 carries out the process of authenticating the user of the client terminal 1002.

The authentication-process unit 1056 may determine that the authentication-cession ID data and the like received from the client terminal 1002 are still valid and that the user who has operated the client terminal 1002 to transmit the call sign is a legal one. If this is the case, the control unit 1050 goes to the next step, i.e., Step SP1077.

In Step SP1077, the control unit 1050 selects and retrieves one of the URL data items stored in the URL storage unit 1059, which is associated with the call sign received from the client terminal 1002.

The control unit 1050 causes the authentication-process unit 1056 to extend the validation term of the authentication-cession ID data and the like which have been issued to the client terminal 1002.

The control unit 1050 then reads the URL information retrieved, from the URL storage unit 1059. The control unit 1050 transmits the read URL information to the client terminal 1002 through the communications control unit 1052 and the network interface 1053, together with the authentication-cession ID data and the like whose validation term has been extended.

In Step SP1078, the control unit 1023 of the client terminal 1002 receives the URL information, and the authentication-cession ID data and the like whose validation term has been extended, from the portal server 1003, first through the network interface 1033 and then through the communications control unit 1032. The authentication-cession ID data and the like are supplied to the authentication-process unit 1037, and the ULR information are supplied to the radio-broadcast display control unit 1039.

Controlled by the control unit 1023, the authentication-process unit 1037 writes the authentication-cession ID data and the like which have been transmitted from the portal server 1003 and whose validation term has been extended, over the authentication-cession ID data and the like whose validation term has not been extended and that are stored in the authentication-information storage unit 1038. That is, the authentication-process unit 1037 updates, in the storage unit 1038, the authentication-cession ID data and the like to those the validation term of which has been extended.

Controlled by the control unit 1023, the radio-broadcast display control unit 1039 writes the URL information supplied from the control unit 1023, into, for example, the storage medium 1029. The storage medium 1029 temporarily stores the URL information in association with the call sign.

Controlled by the control unit 1023, the radio-broadcast display control unit 1039 transmits a now-on-air information request signal to the radio-broadcasting information distributing server 1006 in accordance with the URL information temporarily stored in, for example, the storage medium 1029. The now-on-air information request signal is transmitted to the radio-broadcasting information distributing server 1006, first through the communications control unit 1032 and then through the network interface 1033, together with the service-cession ID data and the like that have been transmitted from the radio-broadcasting information distributing server 1006 and are now temporarily stored in the authentication-information storage unit 1038.

In the sequence of the radio-broadcasting information distributing service providing process, the process (Step SP1078) of transmitting the now-on-air information request signal, the service-cession ID data and the like from the client terminal 1002 to the radio-broadcasting information distributing server 1006 corresponds to Step SP1010 that has been described with reference to FIG. 18.

Figure 18:
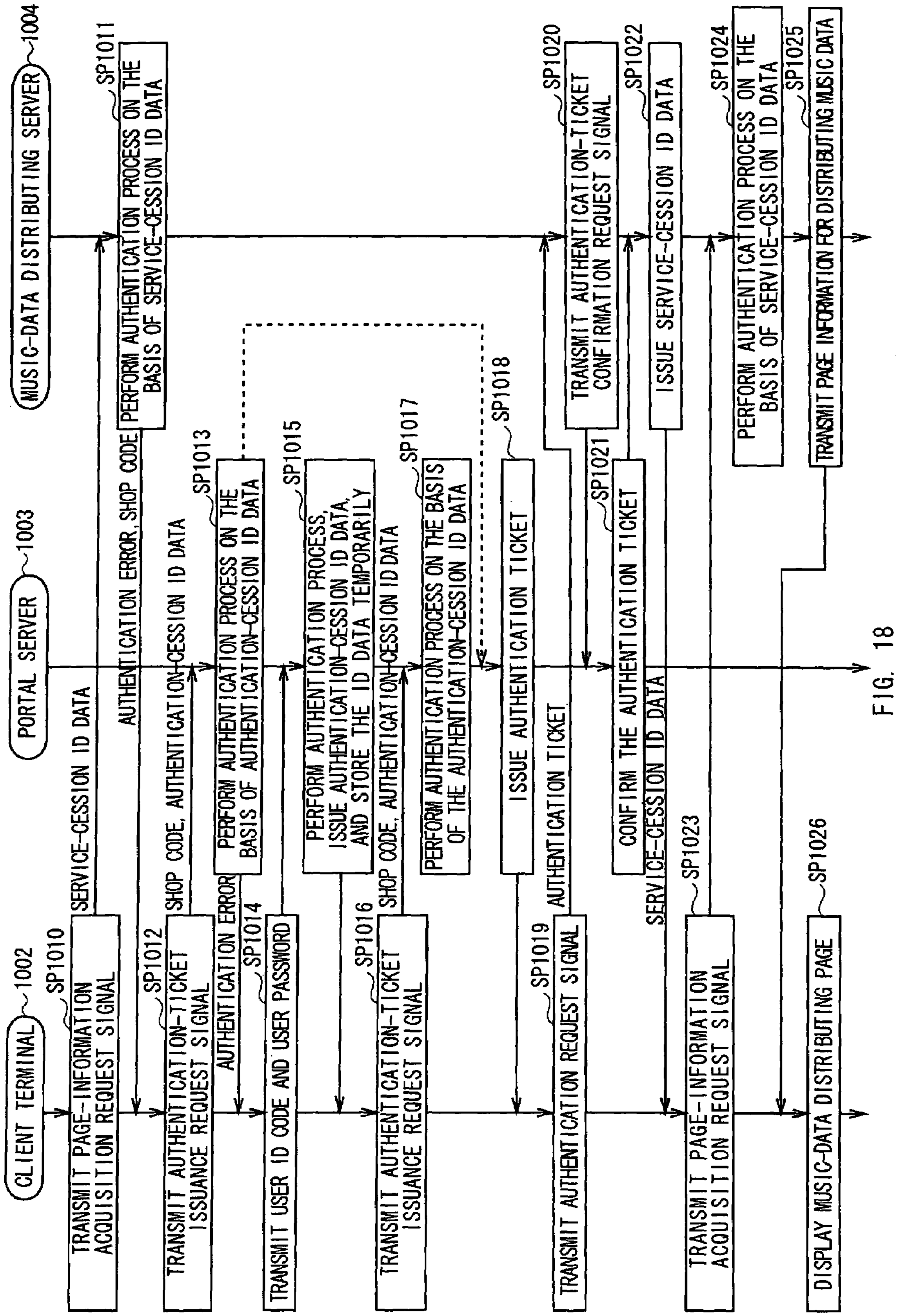
FIG. 18 is a sequence chart illustrating the sequence of authenticating the user, accomplished between the client terminal and the music-data distributing server.

Hence, in the sequence of the radio-broadcasting information distributing service providing process, the process of authenticating the user, which is similar to Steps SP1011 to SP1013 and Steps SP1018 to SP1022 shown in FIG. 18, is carried out in the client terminal 1002, radio-broadcasting information distributing server 1006 and portal server 1003 after the process of Step SP1078. Thereafter, the operation goes to Step SP1079.

In Step SP1079, the control unit 1023 of the client terminal 1002 controls the radio-broadcast display control unit 1039, causing the unit 1039 to transmit the now-on-air information request signal to the radio-broadcasting information distributing server 1006 in accordance with the URL information temporarily stored in, for example, the storage medium 1029. The now-on-air information request signal is transmitted to the server 1006, first through the communication control unit 1032 and then through the network interface 1033, together with the service-cession ID data and the like that have been received from the radio-broadcasting information distributing server 1006 and are now temporarily stored in the authentication-information storage unit 1038.

In Step SP1080, the control unit 1110 of the radio-broadcasting information distributing server 1006 receives the now-on-air information request signal, the service-cession ID data and the like from the client terminal 1002, first through the network interface 1113 and then through the communications control unit 1112. The control unit 1110 supplies the service-cession ID data and the like thus received to the authentication-process unit 1115.

Controlled by the control unit 1110, the authentication-process unit 1115 compares the service-cession ID data and the like received from the client terminal 1002, with the service-cession ID data and the like that are temporarily stored in the authentication-information storage unit 1120. Thus, the authentication-process unit 1115 carries out the process of authenticating the user of the client terminal 1002.

The authentication-process unit 1115 may determine that the user of the client terminal 1002 is a legal one. In this case, the unit 1115 determines that now-on-air information request signal transmitted from the client terminal 1002 is justifiable.

When the authentication-process unit 1115 determines that the user of the client terminal 1002 is a legal one, the control unit 1110 causes the authentication-process unit 1115 to extend the validation term of the service-cession ID data and the like issued to the client terminal 1002. The control unit 1110 then goes to the next step, i.e., Step SP1081.

In Step SP1081, the control unit 1110 reads the now-on-air information from the now-on-air information storage unit 1119. The control unit 1110 then transmits the now-on-air information to the client terminal 1002, first through the communications control unit 1112 and then through the network interface 1113, along with the service-cession ID data and the like whose validation term has been extended by the authentication-process unit 1115.

In Step SP1082, the control unit 1023 of the client terminal 1002 receives the now-on-air information, and the service-cession ID data and the like, whose validation term has been extended, from the radio-broadcasting information distributing server 1006, first through the network interface 1033 and then through the communications control unit 1032. The control unit 1023 supplies the service-cession ID data and the like to the authentication-process unit 1037, and the now-on-air information to the radio-broadcast display control unit 1039.

Controlled by the control unit 1023, the authentication-process unit 1037 writes the service-cession ID data and the like which have been transmitted from the radio-broadcasting information distributing server 1006 and whose validation term has been extended, over the service-cession ID data and the like that are temporarily stored in the authentication-information storage unit 1038 and whose validation has not been extended. That is, the authentication-process unit 1037 updates, in the storage unit 1038, the service-cession ID data and the like to those the validation term of which has been extended.

The radio-broadcast display control unit 1039 supplies the now-on-air information received from the control unit 1023, to the display unit 1025 through the display control unit 1024. The display unit 1025 displays the now-on-air information about the radio programs that the client terminal 1002 is receiving at the moment.

In the sequence of the radio-broadcasting information distributing service providing process, the client terminal 1002 thereafter repeats the process of transmitting the now-on-air information request signal in Step SP1079 at specific intervals (e.g., 30 seconds). Moreover, the radio-broadcasting information distributing server 1006 performs Steps SP1080 and SP1081 in response at the request of the client terminal 1002.

Thus, the display unit 1025 of the client terminal 1002 can display the now-on-air information, which is updated from time to time and which shows the name, on-air start time and on-air end time of each radio program and also the title of the music being broadcast in the program, the name of the artist who plays the music, the on-air start time of the music, and the like.

In the second embodiment, the client terminal 1002 can acquire the now-on-air information from any radio station, and the display unit 1025 of the terminal 1002 displays this information, even if the broadcast station is not tuned in Step SP1074. This is because the client terminal 1002, portal server 1003 and radio-broadcasting information distributing server 1006 cooperate, performing Steps SP1075 to SP1082, one after another, for any radio station that is preset in the client terminal 1002 in Step SP1073.

Configured as described above, the service-providing system 1000 according the second embodiment, that offers service relating to music, can achieve the same advantages as the first embodiment.

(4) Other Embodiments

In the first and second embodiments described above, the information (i.e., radio broadcast information) about all radio stations is acquired as preset information. The present invention is not limited to the first and second embodiments, nonetheless. For example, the information about only the radio station selected by the user may be acquired, not about all radio stations registered in the preset information.

In the second embodiment described above, the control unit 1050 extracts, in Step S1072, the frequency data item, radio-station name and call sign, which correspond to the area code, from the frequency data items, radio-station names and call signs, which are stored in the client database unit 1054 in the form of a list, in accordance with the area code received from the client terminal 1002. The invention is not limited to this method. Rather, the user-set information may be registered in, for example, the client database unit 1054 in advance. The area where the user lives is then determined from the information (postal code, address, phone number, etc.) about the area, which is contained in the user-set information. Then, the frequencies assigned to the radio stations existing in the area and the names and call signals of these radio stations are retrieved and read in the form of a list. In this case, the client terminal 1002 need not transmit the area code to the portal server 1003.

In the first and second embodiments described above, the terminal apparatus 10 and the client terminal 1002 can receive the radio programs broadcast by radio stations. Nonetheless, they may receive the radio programs broadcast via the Internet or by broadcast satellites and acquire the related information and radio broadcast information. Moreover, they may receive television programs broadcast by television stations. Further, they may receive the various types of broadcast information about the television programs, from a server on a network.

In the first and second embodiments, the processes may be performed in accordance with data-processing programs describing the processes. These programs may be executed by a computer. Thus, the computer can perform the processes.

The programs describing the processes that should be carried out in the first and second embodiments may be recorded in a computer-readable recording medium. The computer-readable recording medium may be a magnetic recording apparatus, an optical disc, a magneto-optical recording medium, a semiconductor memory, and the like. The magnetic recording apparatus may be a hard disc drive (HDD), a flexible disc (FD), magnetic tape, and the like. The optical disc may be a DVD, a DVD-RAM, a CD-ROM, a CD-R (Recordable)/RW (Rewritable), and the like. The magneto-optical recording medium may be an MO (Magneto-Optical disc).

To execute a program, the computer reads the program recorded in a portable recording medium or receives the program from a server computer. The computer then stores the program into the storage apparatus incorporated in it. The computer reads the program from the storage apparatus and executes a process in accordance with the program. The computer may execute the process un accordance with the program it has read directly from the portable recording medium. In addition, the computer can perform the processes described in any program that has been transferred to it from the server computer.

In the first embodiment, the hardware circuit blocks, function-circuit blocks and program modules are incorporated in the terminal apparatus 10. In the second embodiment, the hardware circuit blocks, function-circuit blocks and program modules are incorporated in the client terminal 1002. Nevertheless, they may be incorporated into terminals of other types, such as mobile telephones, personal computers and the like, other than the terminal apparatus 10 and the client terminal 1002. Then, any other terminal having such blocks and modules can perform the same processes as the terminal apparatus 10 or the client terminal 1002 does.

In the second embodiment, the client terminal 1002, i.e., a data-processing apparatus, comprises the tuner unit 1031 used as receiving means, the audio-data control unit 1026 used as reproducing means, the control unit 1023 used as setting means, the communications control unit 1032 used as communications control means, the display unit 1025 used as display means, and the control unit 1023 used as control means. The present invention is not limited to this configuration. The data-processing apparatus can be constituted by receiving means, reproducing means, setting means, communications control means, display means and control means of other circuit components.

INDUSTRIAL APPLICABILITY

The present invention can be used not only in a network system that provides service relating to music, but also in various network systems that provides, for example, video contents.

EXPLANATION OF REFERENCE NUMERALS

1 . . . DATA-PROCESSING APPARATUS; 2 . . . BROADCAST STATION, 3 . . . NETWORK, 4 . . . BROADCAST-STATION SERVER, 10 . . . TERMINAL APPARATUS, 11 . . . BROADCAST-SIGNAL RECEIVING MEANS, 11B . . . TUNER UNIT, 12 . . . BROADCAST-SIGNAL REPRODUCING MEANS, 13 . . . SETTING MEANS, 14 . . . PRESET-INFORMATION STORING MEANS, 15 . . . CONTROL MEANS, 16 . . . COMMUNICATIONS CONTROL MEANS, 17 . . . DISPLAY MEANS, 17A . . . DISPLAY DEVICE, 41 . . . BROADCAST-STATION SERVER, 46 . . . INTEGRATED SERVICE SERVER, 101 . . . CPU, 104 . . . RAM, 105 . . . HDD, 1000 . . . SERVICE-PROVIDING SYSTEM, 1002 . . . CLIENT TERMINAL, 1003 . . . PORTAL SERVER, 1006 . . . RADIO-BROADCASTING INFORMATION DISTRIBUTING SERVER, 1023 . . . CONTROL UNIT, 1026 . . . AUDIO-DATA CONTROL UNIT, 1029 . . . STORAGE MEDIUM, 1031 . . . TUNER UNIT, 1032 . . . COMMUNICATIONS CONTROL UNIT, 1037 . . . AUTHENTICATION-INFORMATION STORAGE UNIT, NT1000 . . . NETWORK

The invention claimed is:

1. A data-processing apparatus configured to receive a broadcast signal and be connected to a network on which broadcast stations disclose content-related information related to broadcast contents, comprising:

receiving means for receiving the broadcast signal of a prescribed frequency assigned to each of the broadcast stations;

reproducing means for reproducing the broadcast signal received by the receiving means;

setting means for setting a frequency for the broadcast signal that can be received and for recording frequency information about the frequency set, in a predetermined recording medium;

communications control means for acquiring the content-related information through the network by transmitting a request including broadcast station ID data identifying the broadcast station from which the broadcast signal is received by the receiving means, said content-related information including information corresponding to the broadcast signal identified in the request and information corresponding to a different broadcast station than the broadcast station identified in the request;

display means for displaying predetermined information; and control means for causing the display means to display a list of broadcast stations corresponding to at least one frequency set, in accordance with the frequency information set by the setting means, for acquiring the content-related information disclosed by the broadcast station selected from the list, and for causing the display means to display the content-related information.

2. The data-processing apparatus according to claim 1, wherein the setting means records broadcast-station information containing broadcast station ID data identifying the broadcast station corresponding to the frequency and the name of the broadcast station, in association with the frequency information.

3. The data-processing apparatus according to claim 2, wherein the control means is connected to the network, transmits the broadcast station ID data identifying the broadcast station selected by the communications control means, to an information-providing apparatus which provides information about a source of the content-related information distributed by the broadcast station, receives information about the broadcast station from the source, and collects the content-related information in accordance with the information about the source.

4. The data-processing apparatus according to claim 1, wherein the control means acquires information about a source of the content-related information distributed by all broadcast stations that correspond to the frequencies of broadcast signals which can be received, acquires the content-related information in accordance with the information about the source, and records the number-related information acquired, in the predetermined recording medium.

5. A data-processing method for use in a data-processing apparatus configured to receive a broadcast signal and be connected to a network on which broadcast stations disclose content-related information related to broadcast contents, comprising the steps of:

setting a frequency for any of the broadcast signal for the broadcast stations, which can be received, and recording frequency information about the frequency set, in a predetermined recording medium;

displaying a list of broadcast stations corresponding to at least one frequency set, on predetermined display means, in accordance with the frequency information, while the broadcast signal selected is being received or not being received;

acquiring content-related information disclosed by a broadcast station selected from the list displayed, through the network, by transmitting a request including broadcast station ID data identifying the broadcast station from which the broadcast signal can be received, said content-related information including information corresponding to the broadcast signal identified in the request and information corresponding to a different broadcast station than the broadcast station identified in the request; and displaying the content-related information acquired, on the display means.

6. The data-processing method according to claim 5, wherein:

the data-processing apparatus is configured to communicate with an authentication server which has an authentication function and a related-information provision server which provides the content-related information; and in the step of acquiring the related information through the network, the data-processing apparatus comprises the steps of:

transmitting request information to the related-information provision server, together with a service-cession ID for a cession with the related-information provision server, said request information requesting for information related to the contents in a broadcast program being received;

receiving information indicating an authentication error and service-identifying information identifying the related-information provision server, from the related-information provision server;

transmitting, to the authentication server, an authentication-ticket issuance request information requesting for issuance of an authentication ticket for accessing the related-information provision server, together with the authentication-cession ID for a cession with the authentication server;

receiving an authentication ticket issued from the authentication server when the authentication server authenticates the data-processing apparatus;

transmitting authentication request information to the related-information provision server, together with the authentication ticket;

receiving the service-cession ID when the related-information provision server authenticates the data-processing apparatus;

transmitting request information for requesting for the related information, to the related-information provision server, together with the service-cession ID received; and receiving the related information which the related-information provision server transmits in response to the request information upon authenticating the data-processing apparatus.

7. The data-processing method according to claim 6, wherein the data-processing apparatus comprises the steps of:

receiving information indicating an authentication error and transmitting an user ID and a password to the authentication server, when the authentication server fails to authenticate the data-processing apparatus;

receiving the authentication-cession ID for a cession with the authentication server, when the authentication server authenticates the user ID and the password; and transmitting the authentication ticket issuance request information to the authentication server, together with the authentication-cession ID.

8. A computer program product having computer readable instructions stored on a computer readable medium that when executed by a processor perform a process for receiving broadcast signals and data processing by connecting to a network on which broadcast stations disclose content-related information related to broadcast contents, said process includes the steps of:

setting the frequency of any one of the broadcast signals of predetermined frequencies, which can be received by the data-processing apparatus, and recording, in a prescribed recording medium, frequency information representing the frequency set;

displaying a list of broadcast stations corresponding to at least one frequency set, on predetermined display means, in accordance with the frequency information, while the broadcast signal selected is being received or not being received;

acquiring content-related information disclosed by a broadcast station selected from the list displayed, through the network, by transmitting a request including broadcast station ID data identifying the broadcast station from which the broadcast signal can be received, said content-related information including information corresponding to the broadcast signal identified in the request and information corresponding to a different broadcast station than the broadcast station identified in the request; and displaying the content-related information acquired, on the display means.

9. The data-processing apparatus according to claim 1, wherein said control means repeatedly acquires the content-related information disclosed by the broadcast station at a predetermined time interval.

10. The method of claim 5, wherein said acquiring step is repeated at a predetermined interval.

* * * * *